United States Patent [19]

Oki et al.

[11] Patent Number: 5,577,030

[45] Date of Patent: Nov. 19, 1996

[54] DATA COMMUNICATION ROUTING METHOD AND DEVICE

[75] Inventors: Eiji Oki; Naoaki Yamanaka, both of Tokyo, Japan

[73] Assignee: Nippon Telegraph and Telephone Corporation, Tokyo, Japan

[21] Appl. No.: 521,986

[22] Filed: Aug. 31, 1995

[51] Int. Cl.$^6$ .................................................. H04L 12/44
[52] U.S. Cl. ........................................... 370/54; 370/58.2
[58] Field of Search ............................. 340/825.03, 826; 370/14, 53, 54, 58.2, 68.1, 94.3

[56] References Cited

U.S. PATENT DOCUMENTS

| | | | |
|---|---|---|---|
| 5,386,413 | 1/1995 | McAuley et al. | 370/54 |
| 5,444,694 | 8/1995 | Millet et al. | 370/94.3 |
| 5,499,237 | 3/1996 | Richetta et al. | 370/54 |

OTHER PUBLICATIONS

"Special Issue on Optical Signal Processing and Its Applications to Telecommunications", IEICE Tansactions on Communications, vol. E78–B No. 5 May 25, 1995.

*Primary Examiner*—Benedict V. Safourek
*Attorney, Agent, or Firm*—Cushman, Darby & Cushman

[57] ABSTRACT

A device and method for designing a reliable communication network using disjoint paths with no shared links or nodes. An adjacency matrix is copied to a temporary adjacency matrix, and when it has been confirmed by matrix calculation that there is a path or paths between the origin and destination nodes, a path is obtained backwards and links in the path are deleted. The search for a path is repeated using the resulting temporary adjacency matrix. In this way, the actual number of disjoint paths is never overestimated. Rapid calculation is possible by means of a super-computer.

30 Claims, 42 Drawing Sheets passed link A'(1,3)    passed link A'(3,4)

$$A'^2 = \begin{bmatrix} 010001000100 \\ 001000000000 \\ 000110000000 \\ 000000000001 \\ 000000000001 \\ 000000101000 \\ 000000010000 \\ 000000000001 \\ 000000000001 \\ 000000000010 \\ 000000001000 \\ 000000000000 \end{bmatrix} \begin{bmatrix} 011001000100 \\ 001000000000 \\ 000110000000 \\ 000000000001 \\ 000000000001 \\ 000000101000 \\ 000000010000 \\ 000000000001 \\ 000000000001 \\ 000000000010 \\ 000000001000 \\ 000000000000 \end{bmatrix} = \begin{bmatrix} 001110101010 \\ 001000000000 \\ 000110000000 \\ 000000000001 \\ 000000000001 \\ 000000101000 \\ 000000010000 \\ 000000000001 \\ 000000000001 \\ 000000000010 \\ 000000001000 \\ 000000000000 \end{bmatrix}$$

R2(1,4) = 3 passed link A'(4,12)

$$A'^3 = \begin{bmatrix} 001110101010 \\ 000110000000 \\ 000000000002 \\ 000000000000 \\ 000000000000 \\ 000000010001 \\ 000000000001 \\ 000000000000 \\ 000000000000 \\ 000000001000 \\ 000000000001 \\ 000000000000 \end{bmatrix} \begin{bmatrix} 011001000100 \\ 001000000000 \\ 000110000000 \\ 000000000001 \\ 000000000001 \\ 000000101000 \\ 000000010000 \\ 000000000001 \\ 000000000001 \\ 000000000010 \\ 000000001000 \\ 000000000000 \end{bmatrix} = \begin{bmatrix} 000110011003 \\ 001000000002 \\ 000000000000 \\ 000000000000 \\ 000000000000 \\ 000000000001 \\ 000000000000 \\ 000000000000 \\ 000000000000 \\ 000000000001 \\ 000000000000 \\ 000000000000 \end{bmatrix}$$

FIG.12 passed node
p = 4

$$A'^2 = \begin{bmatrix} 0\,0\,1\,\text{\textcircled{1}}\,1\,0\,1\,0\,1\,0\,1\,0 \\ 0\,0\,0\,1\,1\,0\,0\,0\,0\,0\,0\,0 \\ 0\,0\,0\,0\,0\,0\,0\,0\,0\,0\,0\,2 \\ 0\,0\,0\,0\,0\,0\,0\,0\,0\,0\,0\,0 \\ 0\,0\,0\,0\,0\,0\,0\,0\,0\,0\,0\,0 \\ 0\,0\,0\,0\,0\,0\,0\,1\,0\,0\,0\,1 \\ 0\,0\,0\,0\,0\,0\,0\,0\,0\,0\,0\,1 \\ 0\,0\,0\,0\,0\,0\,0\,0\,0\,0\,0\,0 \\ 0\,0\,0\,0\,0\,0\,0\,0\,0\,0\,0\,0 \\ 0\,0\,0\,0\,0\,0\,0\,1\,0\,0\,0 \\ 0\,0\,0\,0\,0\,0\,0\,0\,0\,0\,0\,1 \\ 0\,0\,0\,0\,0\,0\,0\,0\,0\,0\,0\,0 \end{bmatrix}$$

m = 12

$$A' = \begin{bmatrix} 0\,1\,1\,0\,0\,1\,0\,0\,0\,1\,0\,\text{\textcircled{0}} \\ 0\,0\,1\,0\,0\,0\,0\,0\,0\,0\,0\,0 \\ 0\,0\,0\,1\,1\,0\,0\,0\,0\,0\,0\,0 \\ 0\,0\,0\,0\,0\,0\,0\,0\,0\,0\,0\,\text{\textcircled{1}} \\ 0\,0\,0\,0\,0\,0\,0\,0\,0\,0\,0\,1 \\ 0\,0\,0\,0\,0\,0\,1\,0\,1\,0\,0\,0 \\ 0\,0\,0\,0\,0\,0\,0\,1\,0\,0\,0\,0 \\ 0\,0\,0\,0\,0\,0\,0\,0\,0\,0\,0\,1 \\ 0\,0\,0\,0\,0\,0\,0\,0\,0\,0\,0\,1 \\ 0\,0\,0\,0\,0\,0\,0\,0\,0\,0\,1\,0 \\ 0\,0\,0\,0\,0\,0\,0\,0\,1\,0\,0\,0 \\ 0\,0\,0\,0\,0\,0\,0\,0\,0\,0\,0\,0 \end{bmatrix}$$

FIG.15 (a)
k = 1 passed node
p = 3

$$A' = \begin{bmatrix} 0\,1\,\text{\textcircled{1}}\,0\,0\,1\,0\,0\,0\,1\,0\,0 \\ 0\,0\,1\,0\,0\,0\,0\,0\,0\,0\,0\,0 \\ 0\,0\,0\,1\,1\,0\,0\,0\,0\,0\,0\,0 \\ 0\,0\,0\,0\,0\,0\,0\,0\,0\,0\,0\,1 \\ 0\,0\,0\,0\,0\,0\,0\,0\,0\,0\,0\,1 \\ 0\,0\,0\,0\,0\,0\,1\,0\,1\,0\,0 \\ 0\,0\,0\,0\,0\,0\,0\,1\,0\,0\,0 \\ 0\,0\,0\,0\,0\,0\,0\,0\,0\,0\,0\,1 \\ 0\,0\,0\,0\,0\,0\,0\,0\,0\,0\,0\,1 \\ 0\,0\,0\,0\,0\,0\,0\,0\,0\,0\,1\,0 \\ 0\,0\,0\,0\,0\,0\,0\,1\,0\,0\,0 \\ 0\,0\,0\,0\,0\,0\,0\,0\,0\,0\,0\,0 \end{bmatrix}$$

m = 4

$$A' = \begin{bmatrix} 0\,1\,1\,\text{\textcircled{0}}\,0\,1\,0\,0\,0\,1\,0\,0 \\ 0\,0\,1\,0\,0\,0\,0\,0\,0\,0\,0\,0 \\ 0\,0\,0\,\text{\textcircled{1}}\,1\,0\,0\,0\,0\,0\,0\,0 \\ 0\,0\,0\,0\,0\,0\,0\,0\,0\,0\,0\,0 \\ 0\,0\,0\,0\,0\,0\,0\,0\,0\,0\,0\,1 \\ 0\,0\,0\,0\,0\,0\,1\,0\,1\,0\,0\,0 \\ 0\,0\,0\,0\,0\,0\,0\,1\,0\,0\,0\,0 \\ 0\,0\,0\,0\,0\,0\,0\,0\,0\,0\,0\,1 \\ 0\,0\,0\,0\,0\,0\,0\,0\,0\,0\,0\,1 \\ 0\,0\,0\,0\,0\,0\,0\,0\,0\,0\,1\,0 \\ 0\,0\,0\,0\,0\,0\,0\,0\,1\,0\,0\,0 \\ 0\,0\,0\,0\,0\,0\,0\,0\,0\,0\,0\,0 \end{bmatrix}$$

FIG.15 (b)
k = 1

$$A' = \begin{bmatrix} 0 & 1 & 0 & 1 & 0 & 0 \\ 0 & 0 & 1 & 0 & 0 & 0 \\ 0 & 0 & 0 & 0 & 0 & 1 \\ 0 & 0 & 1 & 0 & 1 & 0 \\ 0 & 0 & 0 & 0 & 0 & 1 \\ 0 & 0 & 0 & 0 & 0 & 0 \end{bmatrix} \quad A'^2 = \begin{bmatrix} 0 & 0 & 2 & 0 & 1 & 0 \\ & & & & & \\ & & & & & \\ \end{bmatrix} \quad A'^3 = \begin{bmatrix} 0 & 0 & 0 & 0 & 0 & 3 \\ & & & & & \\ & & & & & \\ \end{bmatrix}$$

FIG.23 (a)

$$A'^2 = \begin{bmatrix} 0 & 0 & \textcircled{2} & 0 & \textcircled{1} & 0 \\ & & & & & \\ \end{bmatrix} \quad A' = \begin{bmatrix} 0 & 1 & 0 & 1 & 0 & 0 \\ 0 & 0 & 1 & 0 & 0 & 0 \\ 0 & 0 & 0 & 0 & 0 & \textcircled{1} \\ 0 & 0 & 1 & 0 & 1 & 0 \\ 0 & 0 & 0 & 0 & 0 & \textcircled{1} \\ 0 & 0 & 0 & 0 & 0 & 0 \end{bmatrix}$$

$$A = \begin{bmatrix} 0 & 1 & 1 & 0 & 0 & 1 & 0 & 0 & 0 & 1 & 0 & 0 \\ 0 & 0 & 1 & 0 & 0 & 0 & 0 & 0 & 0 & 0 & 0 & 0 \\ 0 & 0 & 0 & 1 & 1 & 0 & 0 & 0 & 0 & 0 & 0 & 0 \\ 0 & 0 & 0 & 0 & 1 & 0 & 0 & 0 & 0 & 0 & 0 & 1 \\ 0 & 0 & 0 & 0 & 0 & 0 & 0 & 0 & 0 & 0 & 0 & 1 \\ 0 & 0 & 0 & 0 & 0 & 0 & 1 & 0 & 1 & 0 & 0 & 0 \\ 0 & 0 & 0 & 0 & 0 & 0 & 0 & 1 & 0 & 0 & 0 & 0 \\ 0 & 0 & 0 & 0 & 0 & 0 & 0 & 0 & 0 & 0 & 0 & 1 \\ 0 & 0 & 0 & 0 & 0 & 0 & 0 & 0 & 0 & 0 & 0 & 1 \\ 0 & 0 & 0 & 0 & 0 & 0 & 0 & 0 & 0 & 0 & 1 & 0 \\ 0 & 0 & 0 & 0 & 0 & 0 & 0 & 0 & 1 & 0 & 0 & 0 \\ 0 & 0 & 0 & 0 & 0 & 0 & 0 & 0 & 0 & 0 & 0 & 0 \end{bmatrix}$$

5,577,030

DATA COMMUNICATION ROUTING METHOD AND DEVICE

BACKGROUND OF THE INVENTION

1. Field of the Invention

The present invention pertains to a device and method for selecting routes between nodes in a communication network, and in particular, to a routing device and method for setting disjoint paths between nodes.

2. Description of the Related Art

Providing many disjoint paths between nodes is widely practiced in order to improve communication network reliability. Disjoint paths between nodes include link disjoint paths and node disjoint paths. A link disjoint path is a path from an origin node to a destination node which does not share any links. A node disjoint path is a path from an origin node to a destination node which does not share any nodes. A node disjoint path is of necessity a link disjoint path. When designing a communication network with optimum reliability, it is necessary to rapidly calculate the link disjoint paths or node disjoint paths (hereinafter, when both of these are signified, the term "disjoint path" will simply be used) required for a given network. When this is done, considerations of delay and so forth dictate that a limit for the number of links passed (hereinafter termed the "hop limit") is usually assigned to the disjoint paths between nodes. However, when the number of nodes is large, an enormous amount of calculation is required to find disjoint paths within a given hop limit, and as a result, it becomes difficult to obtain disjoint paths accurately and efficiently.

A known communication system design method calculates the number of paths between nodes on the basis of a matrix calculation. This method is explained with reference to FIGS. 42(a)–45. FIGS. 42(a) and 42(b) show a graph of a communication network and its adjacency matrix, respectively. FIG. 43 is a flowchart showing an example of a procedure for setting disjoint paths in this conventional system. FIG. 44 shows a situation where nodes or links are shared. FIGS. 45(a)–45(b) show link disjoint paths and node disjoint paths. FIG. 42(a) illustrates a communication network, and FIG. 42(b) illustrates an N×N adjacency matrix A (where N is the number of nodes) which represents the communication network in FIG. 42(a). $A(i,j)$ is the $(i,j)$ element of adjacency matrix A, and is defined as follows. $A(i,j)=1$ if there is a link between node i and node j, and $A(i,j)=0$ if there is no such link. Using this adjacency matrix A, the number of paths with a hop number of 1 between nodes is given by $A^1$. The $(i,j)$ element of $A^1$ indicates the number of paths whereby node j can be reached from node i in 1 hop. Accordingly, the number of paths with hop limit L between nodes (i.e., the number of paths where the number of passed links is within L) can be expressed by the following equation:

$$D_L = A^1 + A^2 + \ldots + A^{L-1} + A^L \quad (1)$$

$D_L(i,j)$ is the $(i,j)$ element of $D_L$ and expresses the number of paths with hop limit L between nodes i and j. To calculate Equation 1, the algorithm shown in FIG. 43 is followed.

However, when the number of paths with hop limit L=4 from an origin node (node 1) to a destination node (node 12) is obtained for the graph in FIG. 42, it is found that there are 7 paths as shown in FIG. 44. The number of disjoint paths is important for the design of reliable communication networks, and the actual number of link disjoint paths is 4 (see FIG. (45a)), while there are in fact 3 node disjoint paths (see FIG. (45b)). Despite the fact that the paths shown in FIG. 44 share links and nodes, the conventional network treats each path as a separate path, and therefore, overestimates the actual number of disjoint paths.

Thus, when the number of disjoint paths with a particular hop limit is calculated for the conventional network and because the calculation in accordance with Equation 1 does not detect the sharing of links and nodes, there is the possibility that the actual number of disjoint paths will be overestimated. Accordingly, when an optimum network is designed using the above described conventional approach, there is a danger that the number of disjoint paths included in the optimized network will be fewer than the number of disjoint paths required. In other words, the network cannot be designed with guaranteed reliability.

An object of the present invention is to provide a routing method and device for the design of high-reliability communication networks, the routing method and device being capable of selecting disjoint paths with no shared links or nodes. It is a further object of this invention to provide a routing method and device capable of selecting disjoint paths rapidly.

SUMMARY OF THE INVENTION

According to a first aspect, this invention provides a routing method for determining paths between nodes, where a plural number N of nodes are connected by links and an upper limit has been set for the number of links that are to be passed.

This invention is characterized in that it comprises: a first step of establishing an adjacency matrix by exclusively assigning a number from 1 to N to each node and setting the row i, column j element of an N, row N column matrix to "1" when there is a link connecting the node with number i ($1 \leq i \leq N$) and the node with number j ($1 \leq j \leq N$); a second step of copying this adjacency matrix to a temporary adjacency matrix and deciding whether or not there is a path or paths between desired nodes in accordance with matrix calculation for powers of this temporary adjacency matrix up to the aforementioned upper limit; a third step wherein, when the existence of a path or paths between desired nodes has been confirmed by the second step, their number is counted and elements corresponding to links participating in a counted path are deleted from the aforementioned temporary adjacency matrix; and the procedure from the aforementioned second step on the basis of the matrix produced by the third step is repeated.

Because the above method makes it possible to avoid setting paths which share nodes or links, a reliable communication network comprising disjoint paths can be designed.

It is desirable to take the matrix formed for each power of the aforementioned temporary adjacency matrix as a respective passed nodes information matrix; and when the existence of a path or paths between desired nodes has been confirmed, to determine the route of this path or paths by means of these past nodes information matrices.

Alternatively, when the existence of a path or paths between desired nodes has been confirmed as the result of power calculations, it is also feasible to determine the route of this path by: 1) obtaining an immediately previous passed node from the product of this power calculation result and the inverse of the temporary adjacency matrix; 2) using this product as a new power calculation result and again obtaining an immediately previous passed node from the product of this and the inverse of the temporary adjacency matrix; and 3) repeating this procedure.

In the aforementioned third step, the value of the aforementioned temporary adjacency matrix elements corresponding to the aforementioned participating links that are to be deleted are changed to "0". The aforementioned participating links are links which form part of a path, the existence of which was confirmed by the aforementioned second step.

Alternatively, the aforementioned participating links are all links connected to nodes contained within a path, the existence of which was confirmed by the aforementioned second step. This enables the calculation for obtaining paths to be performed rapidly and without error.

The aforementioned third step can also include setting the required number of paths to a predetermined number, and stopping the repetitions in accordance with the required number of paths corresponding to the predetermined number. Because this avoids unnecessary repetitions, it facilitates efficient network design.

It is also feasible to store the calculation process for the aforementioned matrix power calculation, and when the existence of a path or paths between desired nodes has been confirmed as the result of a power calculation (power K), to determine the rome of this path by: obtaining an immediately previous passed node by means of the immediately previous calculation result (power K−1) and the aforementioned temporary adjacency matrix; again obtaining an immediately previous passed node by means of the immediately previous calculation result for this passed node and the aforementioned temporary adjacency matrix; and repeating this procedure. This enables the procedure for determining the route of a path to be simplified and sped up.

The aforementioned matrix power calculation which calculates paths between node i and node j can also be performed for row i elements only. This also enables the matrix calculation to be simplified and sped up. Only a calculation process for performing the aforementioned matrix power calculation with the row i elements may be stored.

When there are two or more candidates for selection as the aforementioned immediately previous passed node, the node with fewest entering links connected to it should be selected. If there are two or more candidates for selection as the aforementioned immediately previous passed node and the number of entering links connected to these nodes is equal, any one of these candidates may be selected. The routes of the paths can also be determined for each predetermined hop number.

When there are two or more paths reaching from an origin node to a destination node, the path with the smallest total number of entering links for its passed nodes should be selected. The routes of the paths can also be selected for each predetermined hop number. This makes it possible to select passed nodes such that the path in question cannot easily be used as another path.

According to a second aspect, this invention pertains to a routing device for determining paths between nodes, where a plural number N of nodes are connected by links and an upper limit has been set for the number of those links that are to be passed.

This invention is characterized in that it has: a means which inputs the aforementioned adjacency matrix, copies this adjacency matrix and stores it as a temporary adjacency matrix; a means which decides whether or not there is a path or paths between desired nodes in accordance with matrix calculation for powers of this temporary adjacency matrix up to the aforementioned upper limit; and a means which, when the existence of a path or paths between desired nodes has been confirmed by this deciding means, counts their number, deletes from the aforementioned temporary adjacency matrix elements corresponding to links participating in this path, and repeats the procedure, using this matrix as the input to the aforementioned deciding means.

Because the above device makes it possible to avoid setting paths which share nodes or links, a reliable communication network comprising disjoint paths can be designed.

There is also a means which stores passed node information in accordance with the matrix formed for each power of the aforementioned temporary adjacency matrix; and a means which, when the existence of a path or paths between desired nodes has been confirmed, determines the route of a path in accordance with this storing means.

There may also be a means which, when the existence of a path or paths between desired nodes has been confirmed by the aforementioned deciding means, determines the route of a path by: obtaining an immediately previous passed node from the product of this power calculation result and the inverse of the temporary adjacency matrix; using this product as a new power calculation result and again obtaining an immediately previous passed node from the product of this and the inverse of the temporary adjacency matrix; and repeating this procedure.

The aforementioned inputting procedure should include a procedure which changes to "0" the value of elements of the aforementioned temporary adjacency matrix that correspond to aforementioned participating links that are to be deleted. The aforementioned participating links may be links which form part of a path the existence of which has been confirmed by the aforementioned deciding means. The aforementioned participating links can also be all links connected to nodes contained within a path the existence of which has been confirmed by the aforementioned deciding means. This enables the calculation for obtaining paths to be performed rapidly and without error.

The aforementioned repeating means can also include a means for setting the required number of paths, and can have a means which stops the repetitions in accordance with the aforementioned required number of paths set by this setting means. Because this avoids unnecessary repetitions, it facilitates efficient network design.

There may also be a means which stores the calculation process for the aforementioned matrix power calculation, and a means which, when the existence of a path or paths between desired nodes has been confirmed as the result of a power calculation (power K), determines the route of this path by: obtaining an immediately previous passed node by means of the immediately previous calculation result (power K−1) and the aforementioned temporary adjacency matrix; again obtaining an immediately previous passed node by means of the immediately previous calculation result for this passed node and the aforementioned temporary adjacency matrix; and repeating this procedure. This enables the procedure for determining the route of a path to be simplified and sped up.

The aforementioned matrix power calculation which calculates paths between node i and node j can also be performed for the row i elements only. This enables the matrix calculation to be simplified and sped up. A means which stores a calculation process for performing the aforementioned matrix power calculation with row i elements only may also be provided.

There should be included a means which, when there are two or more candidates for selection as the aforementioned immediately previous passed node, selects the node with the fewest entering links connected to it. There should be included a means which, when there are two or more candidates for selection as the aforementioned immediately previous passed node and the number of entering links connected to these nodes is equal, selects any one of these candidates. The routes of the paths can also be determined for each predetermined hop number.

When there are two or more paths from an origin node to a destination node, the path with the smallest total number of entering links for its passed nodes should be selected. The routes of the paths can also be selected for each predetermined hop number. This makes it possible to select passed nodes such that the path in question cannot easily be used as another path.

According to this invention, when the adjacency matrix has been copied to the temporary adjacency matrix and it has been confirmed by means of matrix calculation that there is a path or paths between the origination and destination nodes, a path is obtained in the reverse direction and links in that path are deleted. In other words, because corresponding elements of the temporary adjacency matrix are changed from "1" to "0", and the path search is performed again from the temporary adjacency matrix, the actual number of disjoint paths is never overestimated. Because this invention is based on matrix calculation, faster processing can be achieved by using a super-computer equipped with vector processors.

In other words, given an adjacency matrix and a restriction on the number of passed links (a hop limit), this invention performs link disjoint path or node disjoint path calculation for each pair of nodes. The adjacency matrix is copied to a temporary adjacency matrix. Powers of the temporary adjacency matrix up to and including the hop limit are calculated by matrix calculation, and the existence of a path or paths between nodes is decided according to whether an element of a power of the temporary adjacency matrix is equal to or greater than 1.

If an element is "0", there is no path. If there is no path, the multiplication of the adjacency matrix by itself is continued provided that the power to which the adjacency matrix is raised does not exceed the hop limit. When the hop limit is exceeded, the calculation of the number of disjoint paths between those nodes is terminated and disjoint paths between a new pair of nodes are calculated.

If an element is equal to or greater than "1", there is a path or paths. If there is a path or paths, the number of paths is counted and a backwards search is made for a relevant path. A path is obtained from passed nodes information matrices. The passed nodes information matrices are formed by the process of obtaining powers of the temporary adjacency matrix. In the case of link disjoint paths, passed links are deleted from the passed nodes that have been obtained; while in the case of node disjoint paths, links connected to passed nodes are deleted. Deleting links means changing relevant elements of the temporary adjacency matrix from "1" to "0". After the temporary adjacency matrix has been changed, the calculation of powers of the temporary adjacency matrix is repeated. This enables link and node disjoint paths to be calculated by rapid approximation calculations that do not overestimate the actual number of disjoint paths.

When the existence of a path or paths between desired nodes has been confirmed as the result of a power calculation, the route of the path may also be determined by: obtaining an immediately previous passed node from the product of this power calculation result and the inverse of the temporary adjacency matrix; using this product as a new power calculation result and again obtaining an immediately previous passed node from the product of this and the inverse of the temporary adjacency matrix; and repeating this procedure. This makes it unnecessary to store the matrix calculation process each time, which economizes on memory.

In terms of matrix calculation, deleting a link may be carried out by setting to "0" the value of a temporary adjacency matrix element corresponding to a participating link that is to be deleted. A participating link can be a link which forms part of a path the existence of which has been confirmed. Participating links can also be all links connected to nodes contained within a path the existence of which has been confirmed. In the former case, a path disjoint link is deleted; while in the latter case, node disjoint links are deleted.

The number of paths required may also be preset, and the calculation terminated when the required number of paths has been met. This saves time spent performing unnecessary calculations.

Although a description has been given above for a method whereby it is unnecessary to store the matrix calculation process each time, thereby economizing on memory, the converse is also useful: namely, to use memory to simplify the calculations that determine paths.

When the calculation process for the matrix power calculation has been stored and the existence of a path or paths between desired nodes has been confirmed as the result of a power calculation (power K), the route of this path can also be determined by: obtaining an immediately previous passed node by means of the immediately previous calculation result (power K–1) and the temporary adjacency matrix; again obtaining an immediately previous passed node by means of the immediately previous calculation result for this passed node and the temporary adjacency matrix; and repeating this procedure.

The aforementioned matrix power calculations for calculating paths between node i and node j may also be performed for row i elements Only. This has the advantage of enabling the calculation to be performed more rapidly than when rows other than i are used as well. Paths may also be determined by storing a calculation process for matrix power calculation with row i elements only.

In order to select passed nodes such that the path in question cannot easily be used as another path, when there are two or more candidates for selection as an immediately previous passed node, the node with fewest entering links connected to it should be selected. If there are two or more candidates for selection as an immediately previous passed node and the number of entering links connected to these nodes are equal, any one of these candidates may be selected. When paths are long, the routes of the paths may be determined for each predetermined hop number. When there are two or more paths reaching from an origin node to a destination node, the path with the smallest total number of entering links for its passed nodes should be selected. Here again, the routes of the paths may be selected for each predetermined hop number, for example if the paths are long. This makes it possible to select passed nodes such that the path in question cannot easily be used as another path.

As has now been explained, use of this invention for designing reliable communication networks makes possible the rapid selection of disjoint paths with no shared links or nodes.

Further objects and characteristics of the present invention, as well as the function of the related elements of structure, and the economies of manufacture will become more apparent upon consideration of the following description and the appended claims with reference to the accompanying drawings all of which form a part of the specification, wherein like reference numerals designate corresponding parts of the various features.

BRIEF DESCRIPTION OF THE DRAWINGS

FIG. 6 is a conceptual diagram showing an example of retracing a link disjoint path and deleting passed links by means of passed nodes information matrices;

FIG. 12 is a conceptual diagram showing an example of retracing a node disjoint path and deleting links connected to passed nodes by means of passed nodes information matrices;

FIG. 15(a)–15(b) are conceptual diagrams showing an example of retracing a link disjoint path, searching for passed nodes, and deleting passed links;

FIGS. 23(a)–23(b) show the results of calculating powers of a temporary adjacency matrix, for purposes of explaining an eighth embodiment of this invention;

DETAILED DESCRIPTION OF THE PRESENTLY PREFERRED EMBODIMENTS

First Embodiment

A first embodiment of this invention will be explained with reference to FIG. 1, which shows an algorithm for obtaining link disjoint paths with hop limit L between nodes according to said first embodiment. Refer to FIG. 42(a) for the configuration of the communication network.

This invention is a routing method for determining paths between nodes, where twelve nodes 1–12, for example, are connected by links and an upper limit has been set for the number of passed links.

This invention is characterized in that it comprises: a first step (S1) of establishing an adjacency matrix A by exclusively assigning a number from 1 to 12 to each node 1–12 and setting the row i, column j element of a 12 row, 12 column matrix to "1" when there is a link connecting a node with number i ($1 \leq i \leq N$) and a node with number j ($1 \leq j \leq N$); a second step of copying this adjacency matrix A to a temporary adjacency matrix A' (S3) and deciding (S6) whether or not there is a path or paths between desired nodes in accordance with matrix calculation for powers of this temporary adjacency matrix up to the aforementioned upper limit; a third step wherein, if the existence of a path or paths between desired nodes has been confirmed by the second step, their number is counted in step (S9) and elements corresponding to links participating in a counted path are deleted from the aforementioned temporary adjacency matrix (S10); and a repetition of the procedure from the aforementioned second step on the basis of the matrix produced by the third step. In FIG. 1, A'(i,j) is the i,j element of the temporary adjacency matrix and dij is the number of disjoint paths between nodes i and j.

Figure 3:
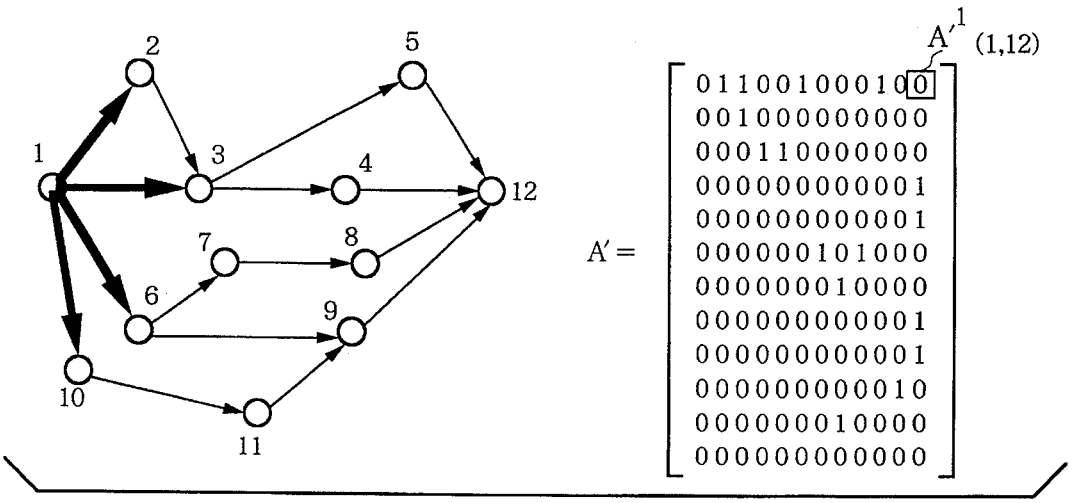
FIGS. 3(a)–3(c) are conceptual diagrams showing an example of obtaining link disjoint paths with hop limit L between nodes.
Figure 3:
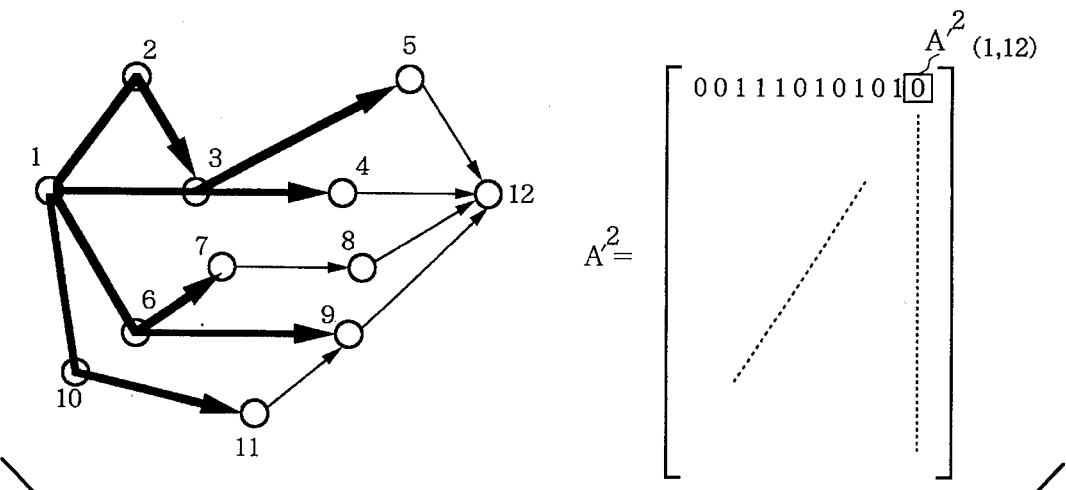
Figure 3:
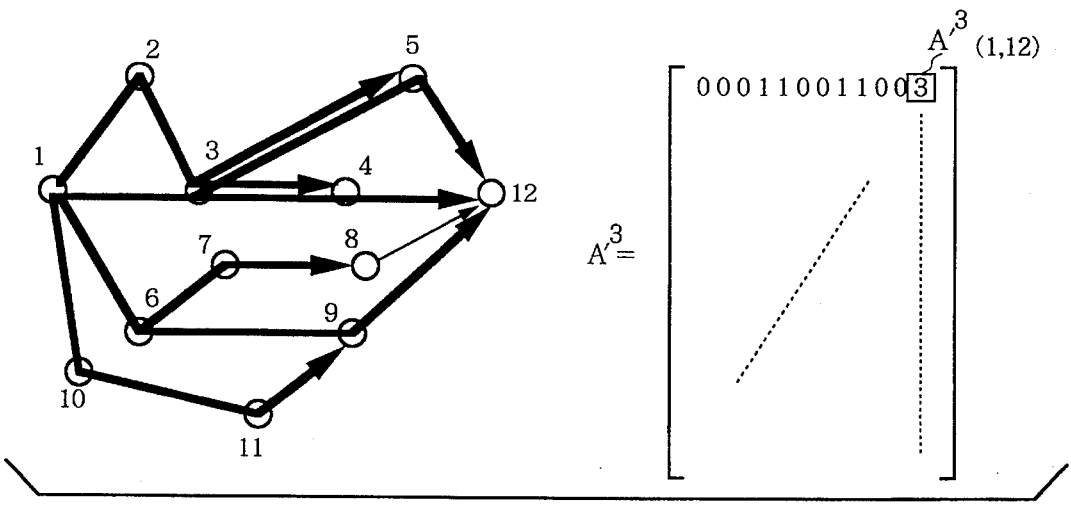
Figure 4:
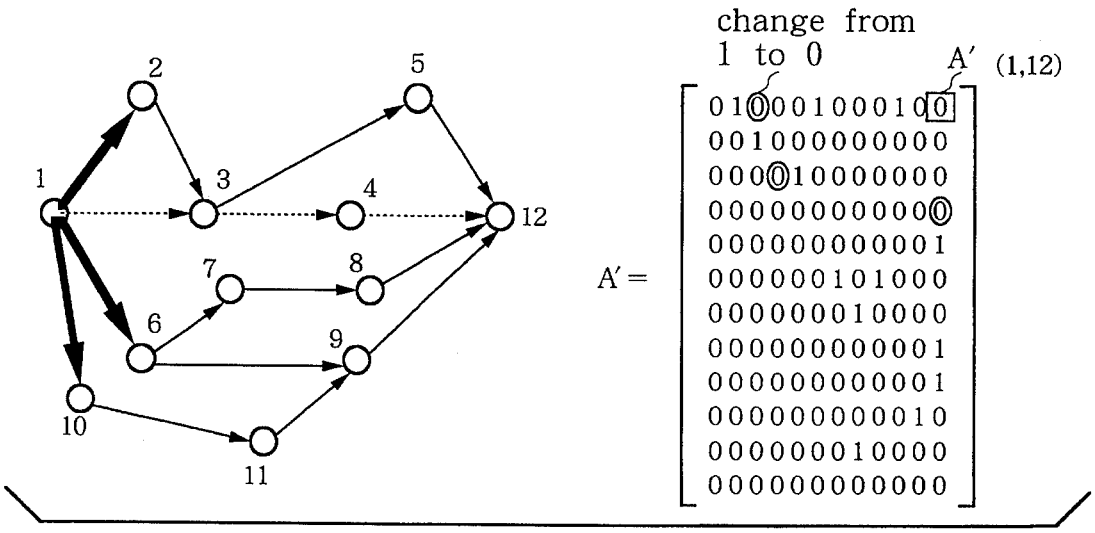
FIGS. 4(a)–4(c) are conceptual diagrams showing an example of obtaining link disjoint paths with hop limit L between nodes.
Figure 4:
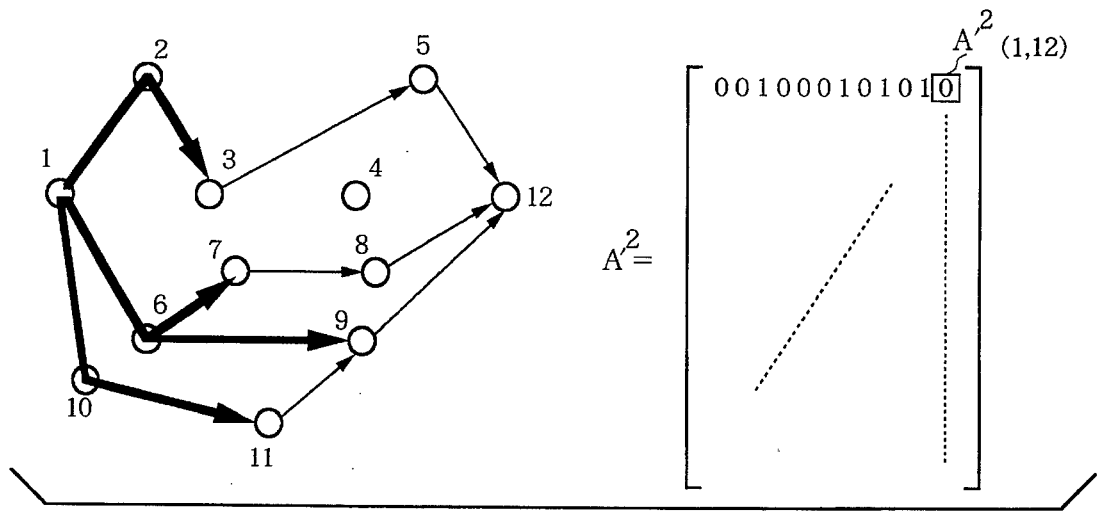
Figure 4:
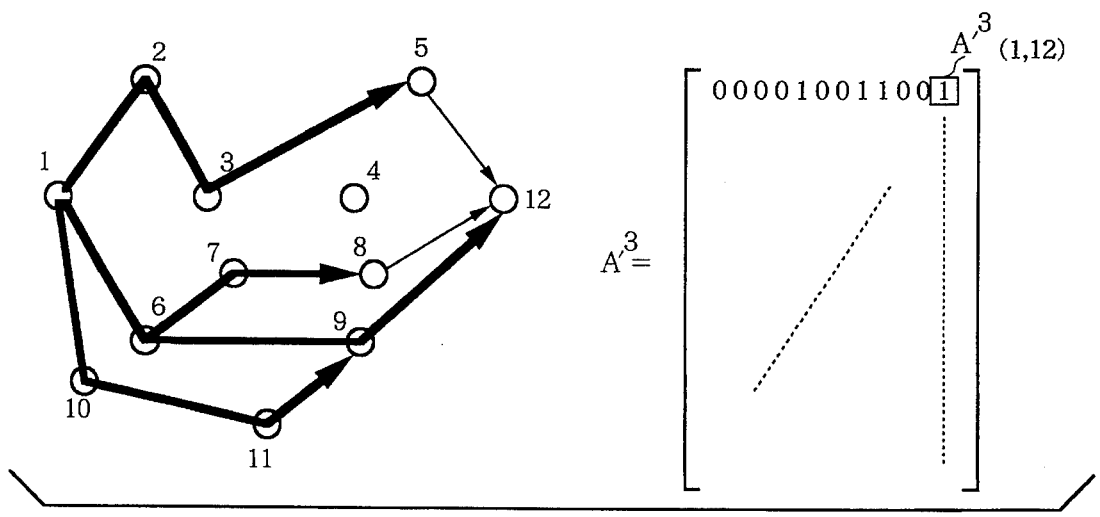
Figure 5:
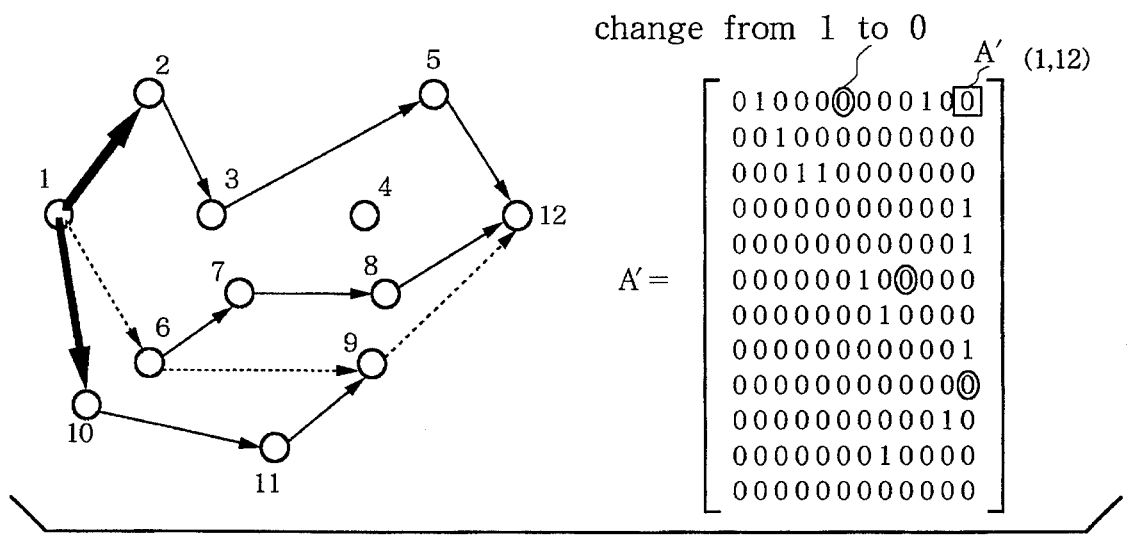
FIGS. 5(a)–5(b) are conceptual diagrams showing an example of obtaining link disjoint paths with hop limit L between nodes.
Figure 5:
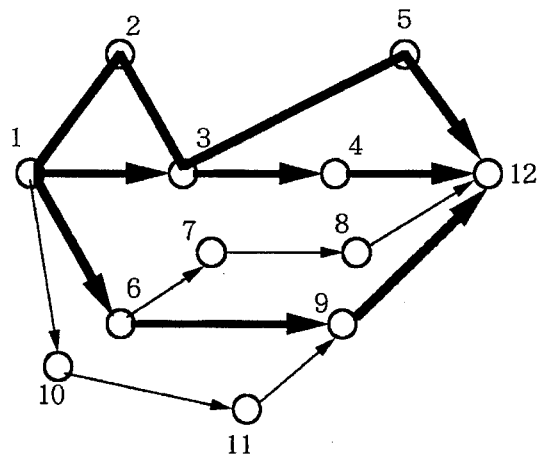

The first embodiment of this invention illustrates a method for obtaining link disjoint paths with a hop limit between nodes by matrix calculation. FIG. 2 shows an algorithm for retracing a link disjoint path and deleting passed links. FIGS. 3–5 are conceptual diagrams showing examples of obtaining link disjoint paths with hop limit L between nodes. FIG. 6 is a conceptual diagram showing an example of retracing a link disjoint path and deleting passed links on the basis of passed nodes information matrices. A more detailed explanation will now be given, with reference to FIG. 1, of the method for obtaining link disjoint paths with hop limit L.

Figure 42:
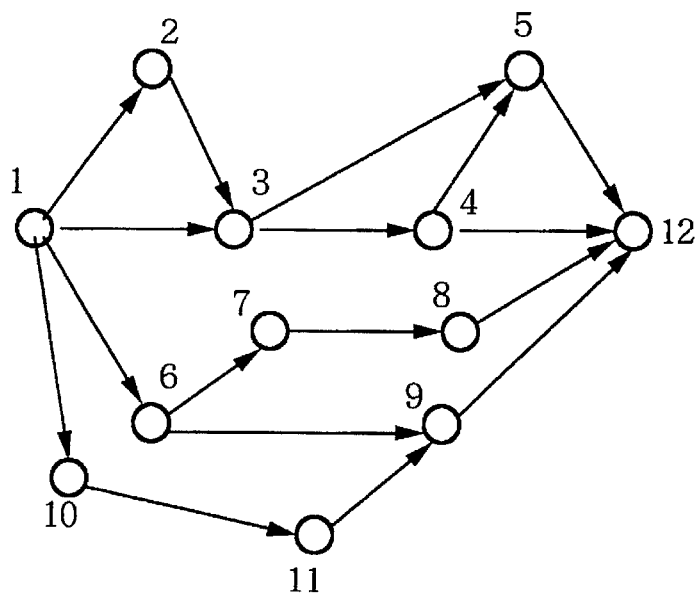
FIG. 42(a)–42(b) show a communication network and its adjacency matrix.
Figure 43:
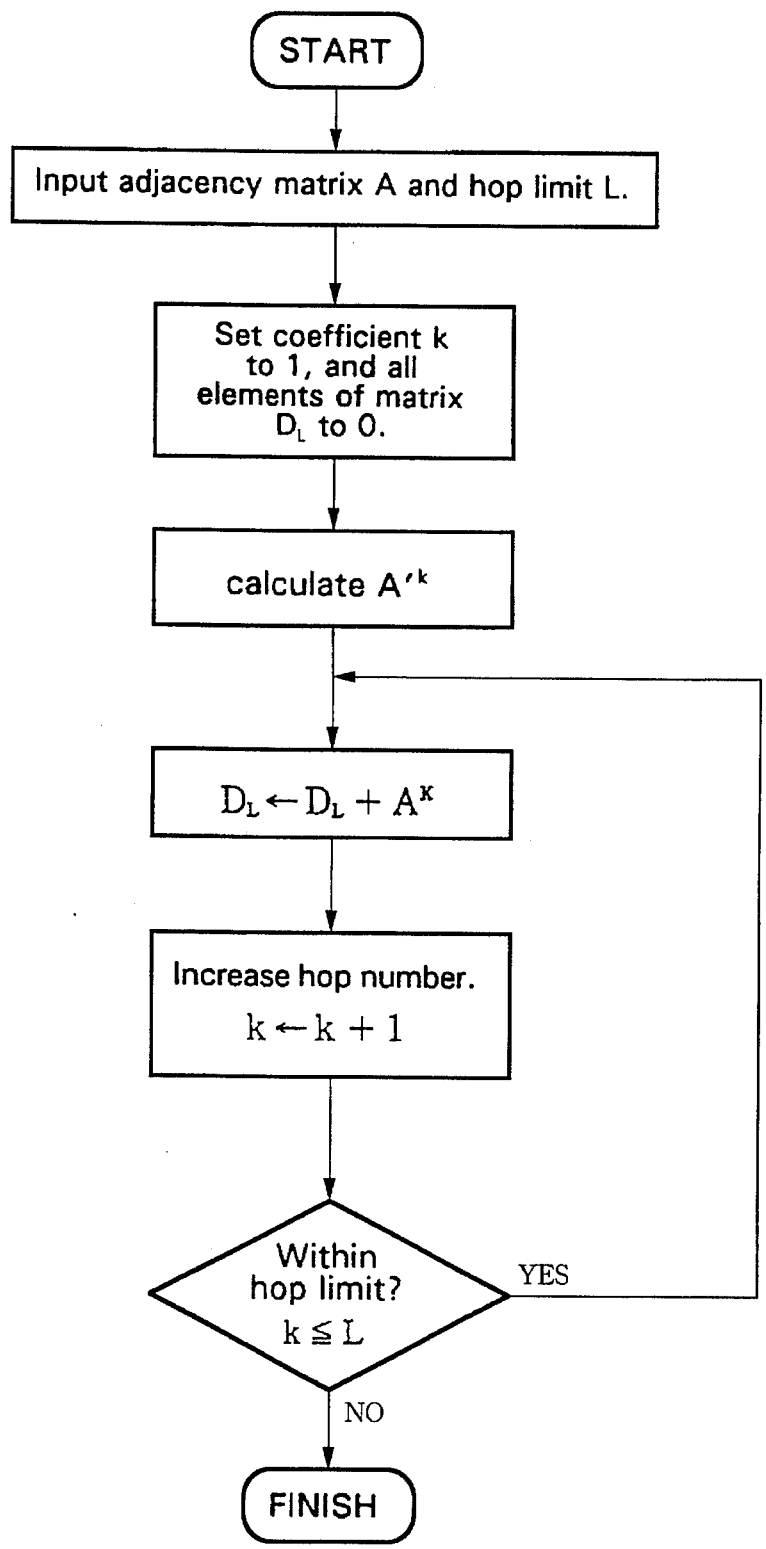
FIG. 43 is a flowchart showing an example of a conventional procedure for setting disjoint paths.
Figure 44:
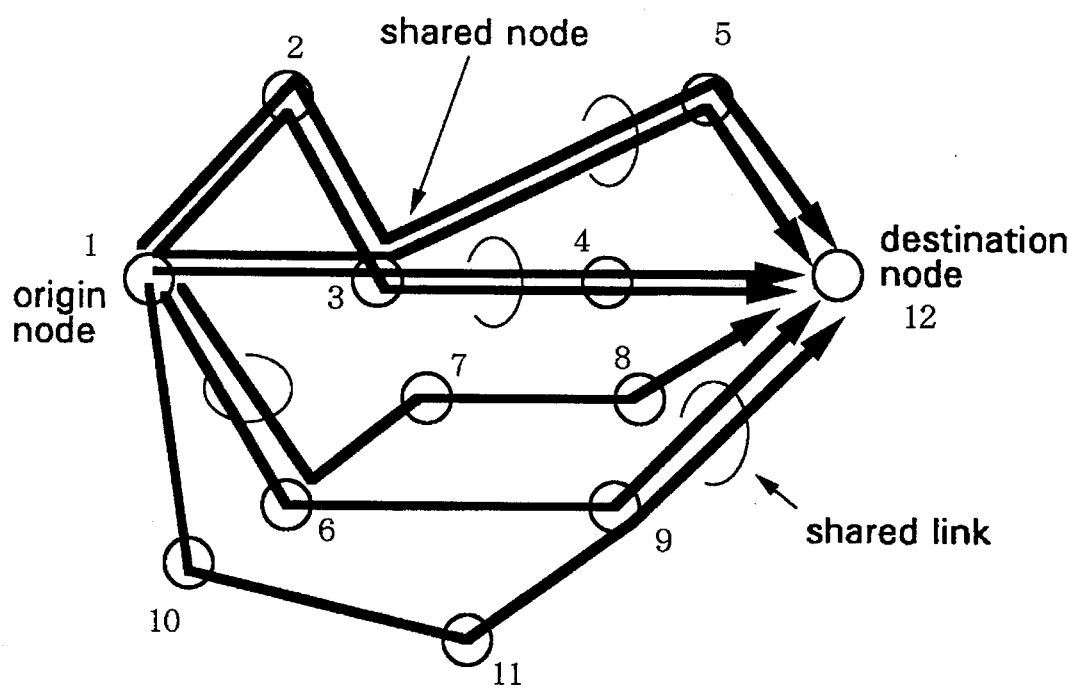
FIG. 44 shows the situation where nodes or links are shared.

(S1) Input the communication network of the sort shown in FIG. 42 to a routing device, and represent this network using an adjacency matrix A. A(i,j), the (i,j) element of adjacency matrix A, is defined as follows. If there is a link between node i and node j, A(i,j)=1; and if there is no such link, A(i,j)=0. A hop limit L is also input.

(S2) Calculate the link disjoint paths between nodes i and j (there are N×(N−1) node pairs, where N is the number of nodes) and decide whether the link disjoint paths between all nodes have been calculated. If so, terminate the processing. If not, proceed to step S3.

(S3) Initialize dij, the number of link disjoint paths between nodes, to "0" and copy adjacency matrix A to temporary adjacency matrix A'.

(S4) Set hop number k (the number of passed links) to k=1.

(S5) If k≠1, calculate $A'^k = A'^{k-1} \times A'$. If k=1, $A'^1 = A'$, so no calculation is required.

(S6) Decide whether there is a path or paths which can reach destination node j from origin node i in k hops. For example, $A'^k(u,w)$, the (u,w) element of $A'^k$, indicates the number of paths which can reach node w from node u in k hops. Whether there is a path that can reach node j from node i is decided on the basis of whether the $A'^k(i,j)$ element is equal to or greater than "1". If $A'^k(i,j) \geq 1$ is true, there is a path that reaches in k hops, so proceed to step S9. If it is not true, proceed to S7.

(S7) Increase hop number k by 1.

(S8) Decide whether hop number k, which has been increased by 1 in step S7, is still within hop limit L: in other words, decide whether k≤L. If this is true, return to step S5 and search for paths with k hops. If it is not true, infer that the search for link disjoint paths with hop limit L between nodes i and j has been finished, return to step S2 and search for link disjoint paths between new nodes.

(S9) Count the number of link disjoint paths.

(S10) Search backwards for a path that has reached node j from node i in k hops. Delete passed links of the path that has been searched backwards, i.e., change from "1" to "0" those elements of A' that represent the passed links. An example of these algorithms will be explained with reference to FIG. 2(a).

($S10_1$) Set m to j, where m is a node reached in k hops.

($S10_2$) In paths which reach node m from node i in k hops, define passed nodes reached in k−1 hops as $R_k(i,m)$ and call $R_k(i,m)$ the passed nodes information matrix. $R_k(i,m)$ is produced when $A'^k$ is calculated. $A'^k(i,m)$ is calculated as follows:

$$A'^k(i,m) = \sum_{p=1}^{N} A'^{k-1}(i,p) A'^k(p,m) \qquad (2)$$

However, when $A'^{k-1}(i,p) \geq 1$ and $A'^k(p,m) \geq 1$, it will also be the case that $A'^k(i,m) \geq 1$. Changing p from "1" to "N", select one arbitrary p satisfying $A'^k(i,p) \geq 1$ and $A'^k(p,m) \geq 1$, then set $R_k(i,m)=p$. For example, changing p from "1" to "N", select the first p which satisfies $A'^{k-1}(i,p) \geq 1$ and $A'^k(p,m) \geq 1$. On the basis of the passed nodes information matrix $R_k(i,m)$, delete the link from node $R_k(i,m)$ to node m as shown in FIG. 2(b), i.e., change $A'(R_k(i,m), m)$ from "1" to "0". Next, although the node reached by the k hop is currently m and the node reached by the k−1 hop is $R_k(i,m)$, decrease k by 1 and take $R_k(i,m)$ as the new m.

($S10_3$) Decide if k≥2. If this is true, return to step $S10_2$. If it is false, i.e., if k=1, proceed to step $S10_4$.

($S10_4$) When k=1, a link passed in one hop is a link between nodes i and m, and therefore set A'(i,m)=0.

When the operations of step S10 are completed, return to step S4 and use the altered temporary adjacency matrix to make a new search for paths between nodes i and j within L hops. This completes the explanation of the algorithms for obtaining link disjoint paths with hop limit L.

Next, taking the network shown in FIG. 42 as an example and setting hop limit L=4, the method for obtaining link disjoint paths according to this invention will be explained with reference to FIGS. 3–5.

FIG. 3(a) shows paths that can be traversed in one hop, with the origin node set to node 1 and the destination node set to node 12. Nodes that can be reached in one hop are nodes 2, 3, 6 and 10. These correspond respectively to elements A'(1,2), A'(1,3), A'(1,6) and A'(1,10) of the adjacency matrix being "1". Because A'(1,12)="0", it is decided that there is no path between nodes 1 and 12 which can be traversed in one hop. The hop number is increased by 1 so that k=2. Because k (=2)≦L (=4), A'$^2$ is calculated. FIG. 3(b) shows paths that can be traversed in two hops. Because A'$^2$(1,12)=0, it is decided that there is no path between nodes 1 and 12 which can be traversed in two hops. The hop number is again increased by 1 so that k=3. Because k (=3)≦L (=4), A'$^3$ is calculated. FIG. 3(c) shows paths that can be traversed in three hops. A'$^3$(1,12)=3, and it will be seen that there are three paths, indicated by bold arrows in FIG. 4(a), whereby node 12 can be reached from node 1 in three hops. One of these paths is selected from passed nodes information matrices (in the example given in FIG. 4(a), the selected path is 1→3→4→12) and passed links are deleted as shown in FIG. 4(a) by the dashed arrows. That is to say, elements of the temporary adjacency matrix that correspond to passed links are changed from "1" to "0".

Figure 1:
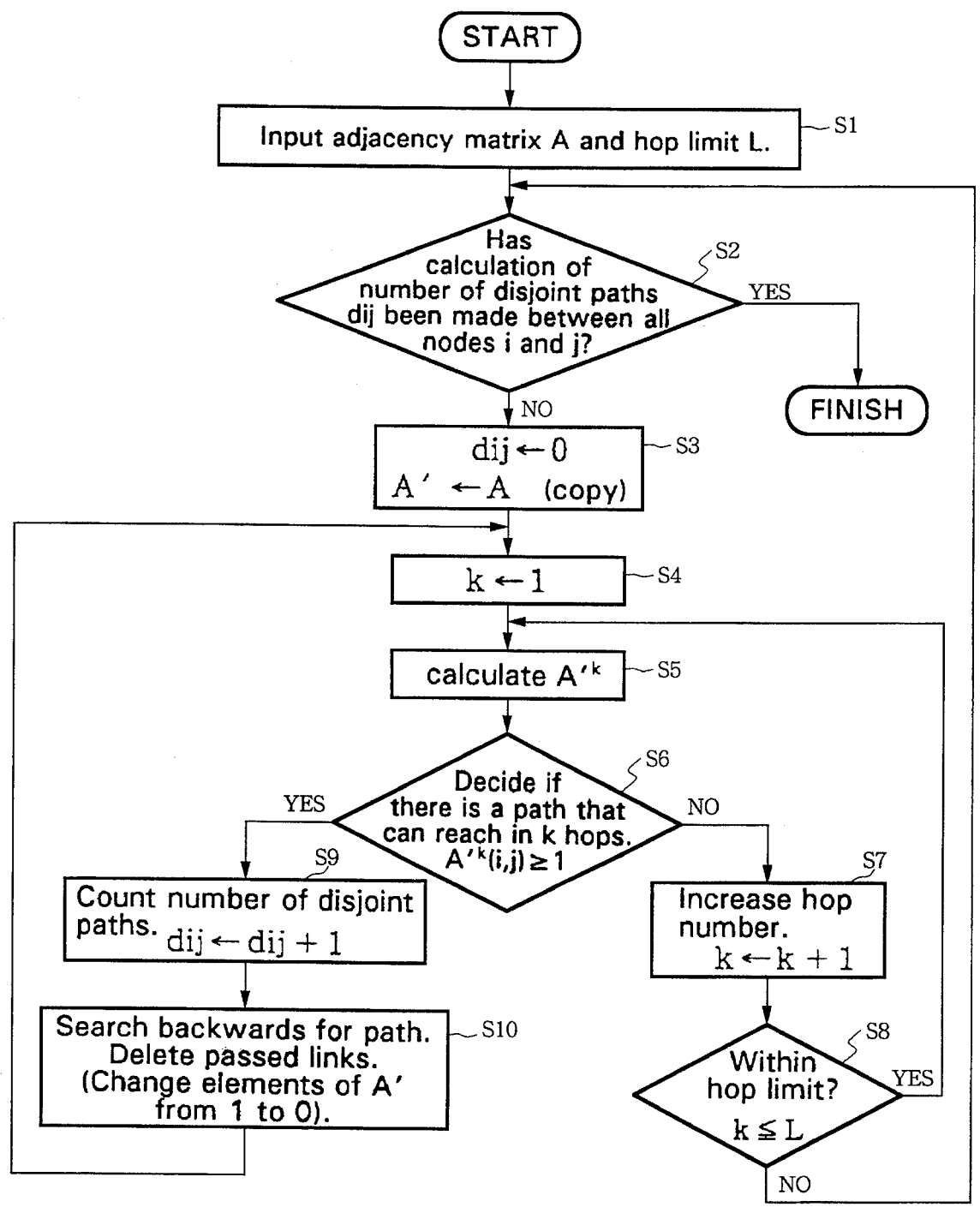
FIG. 1 shows an algorithm for obtaining link disjoint paths with hop limit L between nodes according to a first embodiment of this invention.
Figure 2:
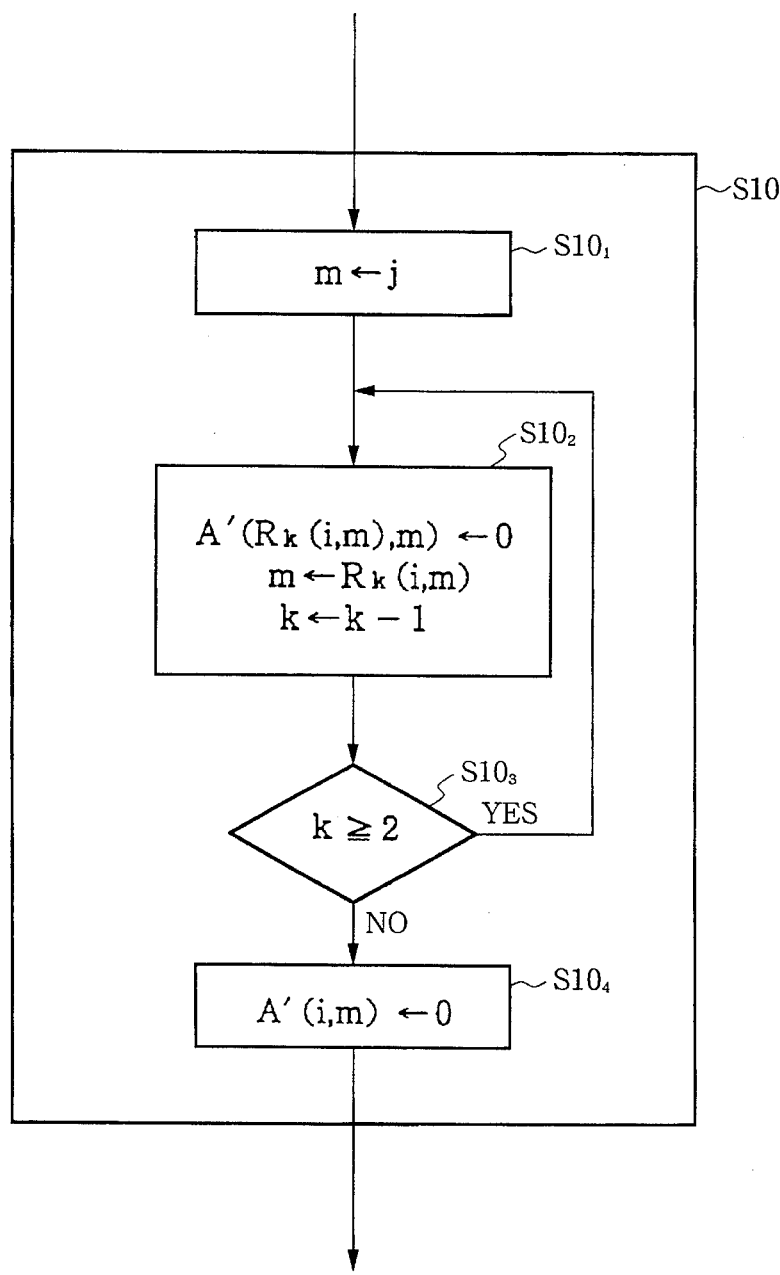
FIGS. 2(a)–2(b) show an algorithm for retracing a link disjoint path and for deleting passed links.
Figure 2:
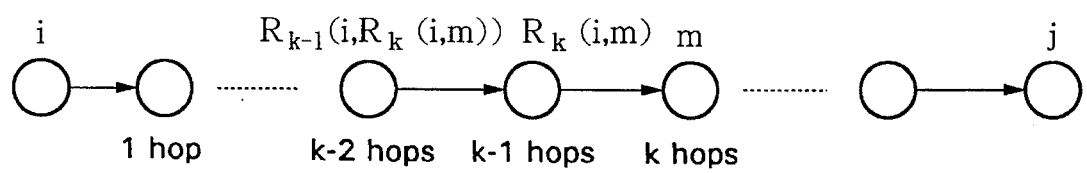

FIG. 6 shows the operation of step S10 in FIG. 1 (i.e., to FIG. 2). In the present example, i=1, j=12 and k=3. Setting m=12, the passed nodes information matrix $R_k(i,m)$ becomes $R_3(1,12)$=4. $R_3(1,12)$ is a p which satisfies A'$^2$(1, p)≧1 and A'(p, 12)≧1. Given $R_3(1,12)$=4, A'(4,12) is changed from "1" to "0". Next, setting k=2 and m=4, the passed nodes information matrix $R_k(i,m)$ will be $R_2(1,4)$=3. $R_2(1,4)$ is the p which satisfies A'(1,p)≧1 and A'(p,4)≧1. Given $R_2(1,4)$=3, A'(3,4) is changed from "1" to "0". Because k<2 if k is decreased by 1, A'(1,3) is also changed from "1" to "0".

The altered temporary adjacency matrix A' is then used to search again for paths within L (=4) hops. In the same way, as shown in FIG. 4(a), (b) and (c), provided that k≦L, hop number k is incremented by 1 until A'$^k$(1,12)≧1. In FIG. 4(c), A'$^3$(1,12)=1, which means that a path 20 that can reach the destination node in three hops has been found. Passed links are obtained in reverse direction from passed nodes information matrices, and passed links are deleted as shown in FIG. 5(a). That is to say, elements of the temporary adjacency matrix corresponding to passed links are changed from "1" to "0".

Using similar calculations to those described above, a total of three link disjoint paths is subsequently obtained as shown in FIG. 5(b), in accordance with the algorithm given in FIG. 1.

In this first embodiment of the invention, the temporary adjacency matrix is used to search, one path at a time, for paths within the hop limit; and a path that has been found has its passed links deleted by using passed nodes information matrices to change from "1" to "0" elements of the temporary adjacency matrix that correspond to passed links. The altered temporary adjacency matrix is then used to search again for an additional path between the origin and destination nodes.

Figure 45:
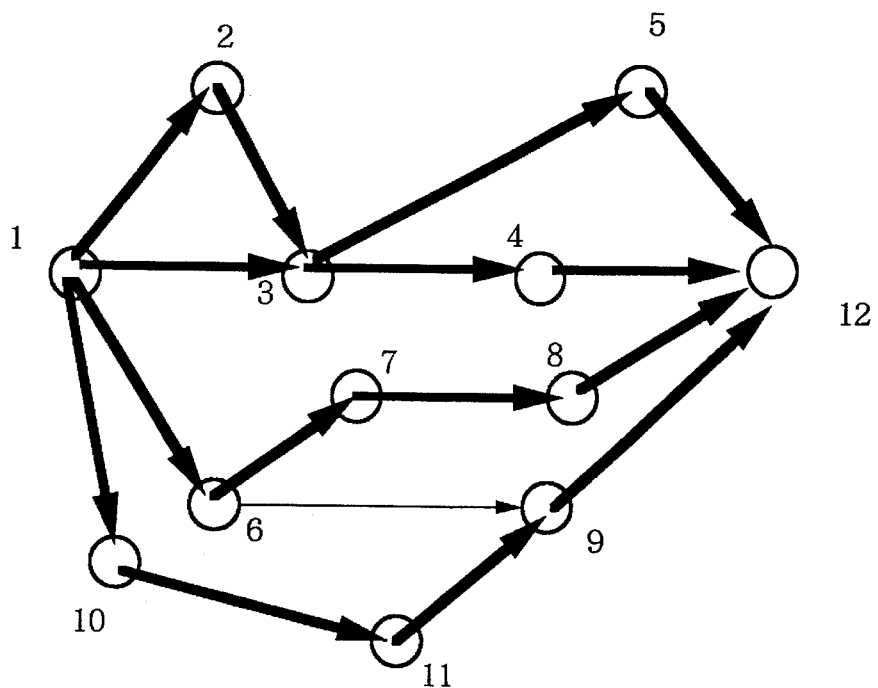
FIGS. 45(a)–45(b) illustrate link disjoint paths and node disjoint paths.
Figure 45:
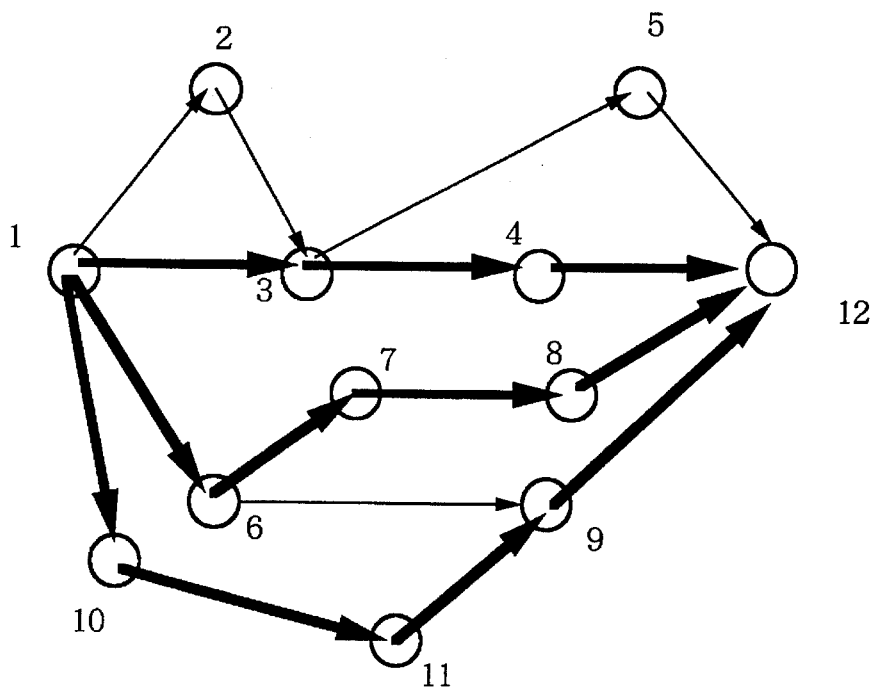

In the example of the network shown in FIG. 42, the number of link disjoint paths is 4, as shown in FIG. 45(a). Although the method according to this invention is an approximation calculation, the actual number of link disjoint paths is never overestimated. Accordingly, use of the method according to this invention enables communication networks to be designed with guaranteed reliability.

Because the method according to this invention is based on matrix calculation, rapid calculation are possible by using a super-computer equipped with vector processors.

Second Embodiment

Figure 7:
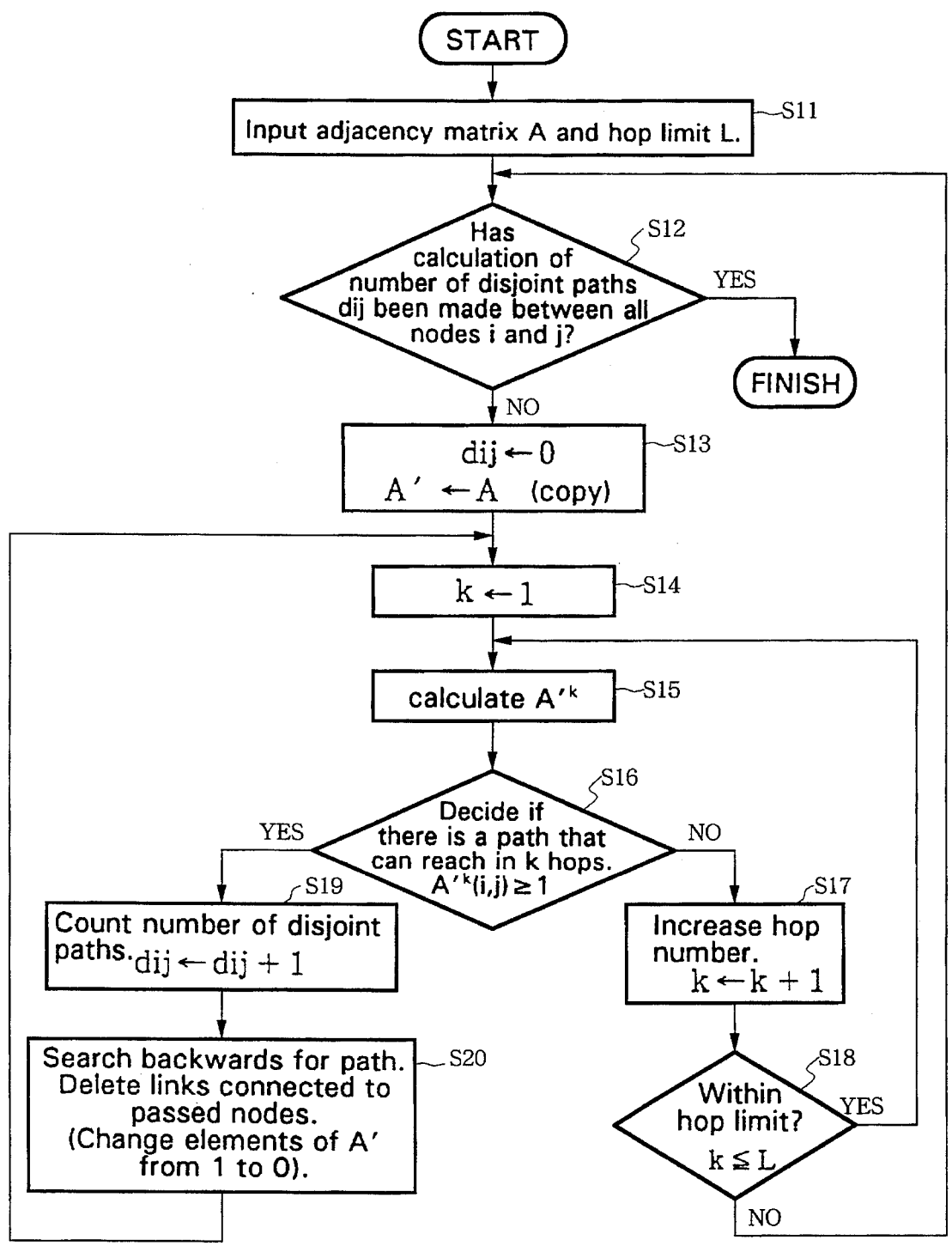
FIG. 7 shows an algorithm for obtaining node disjoint paths with hop limit L between nodes according to a second embodiment of this invention.
Figure 8:
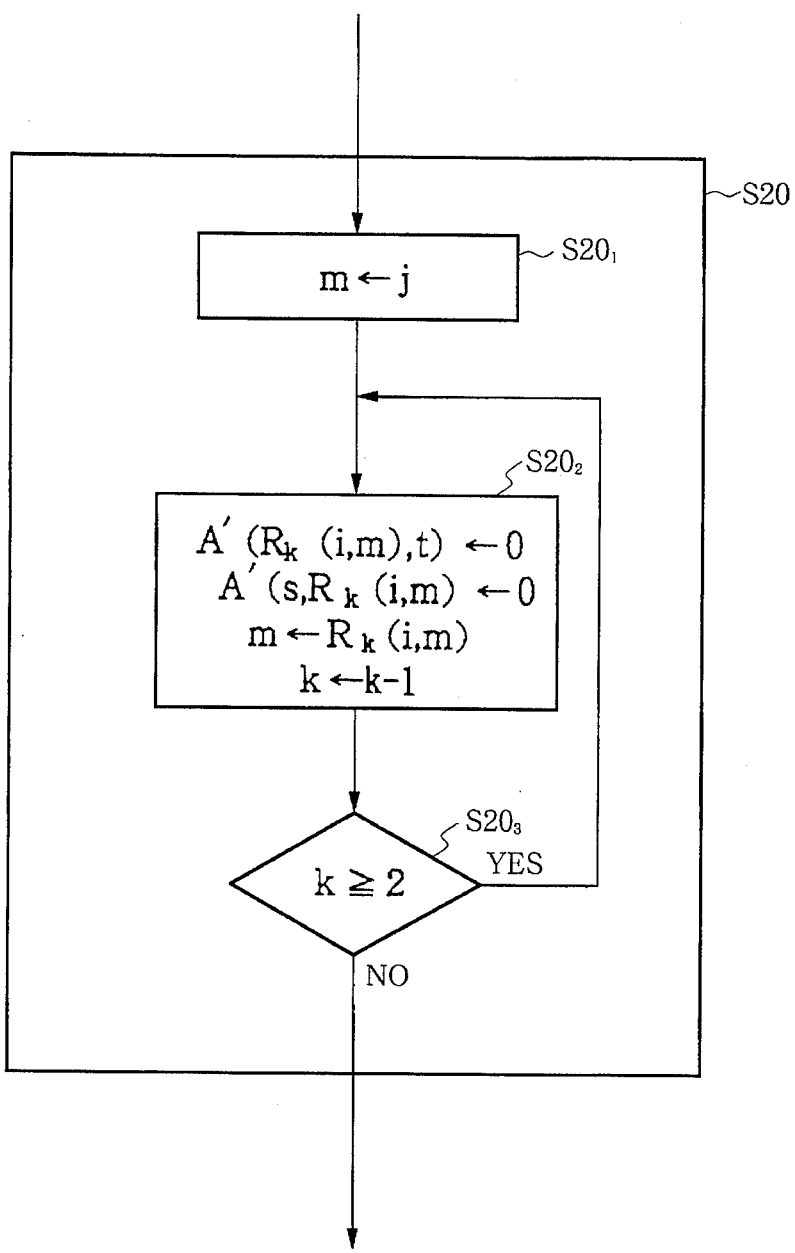
FIG. 8(a)–8(b) show an algorithm for retracing a node disjoint path and deleting links connected to passed nodes.
Figure 8:
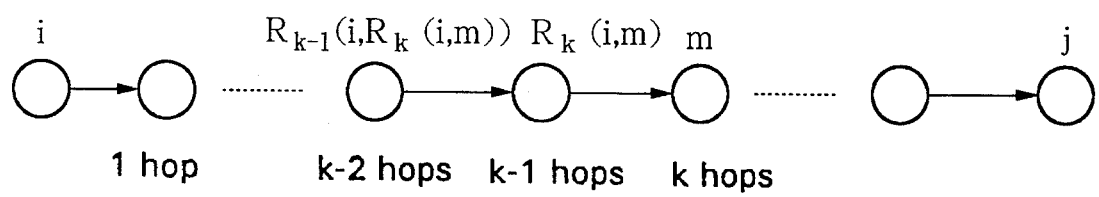
Figure 9:
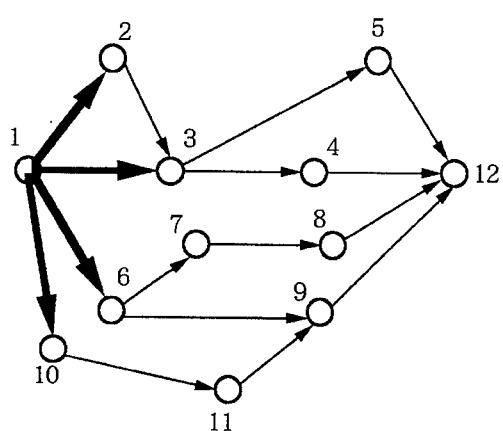
FIG. 9(a)–9(c) are conceptual diagrams showing an example of obtaining node disjoint paths with hop limit L between nodes.
Figure 9:
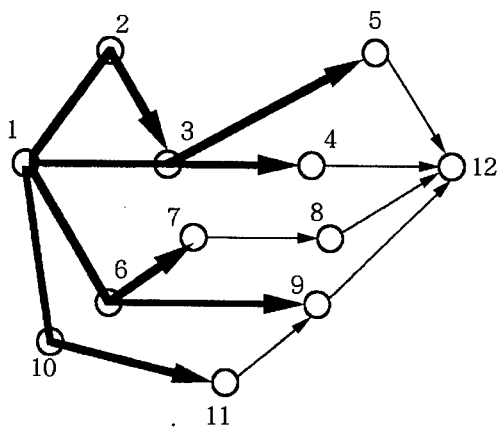
Figure 9:
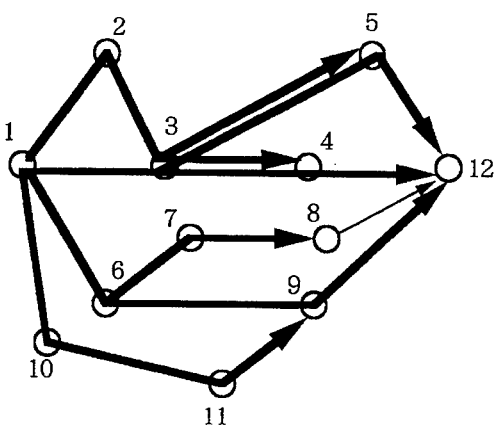
Figure 10:
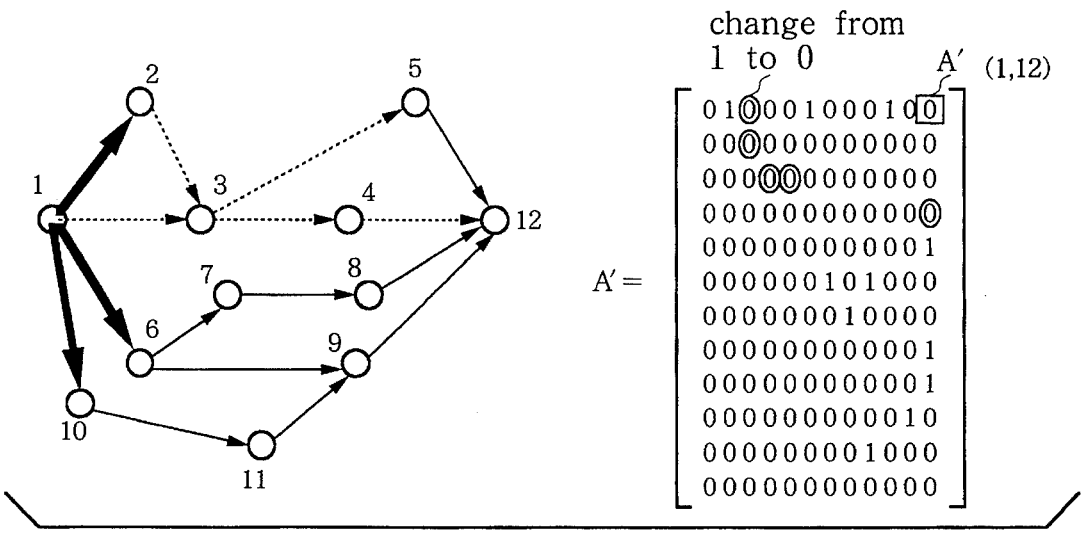
FIG. 10(a)–10(c) are conceptual diagrams showing an example of obtaining node disjoint paths with hop limit L between nodes.
Figure 10:
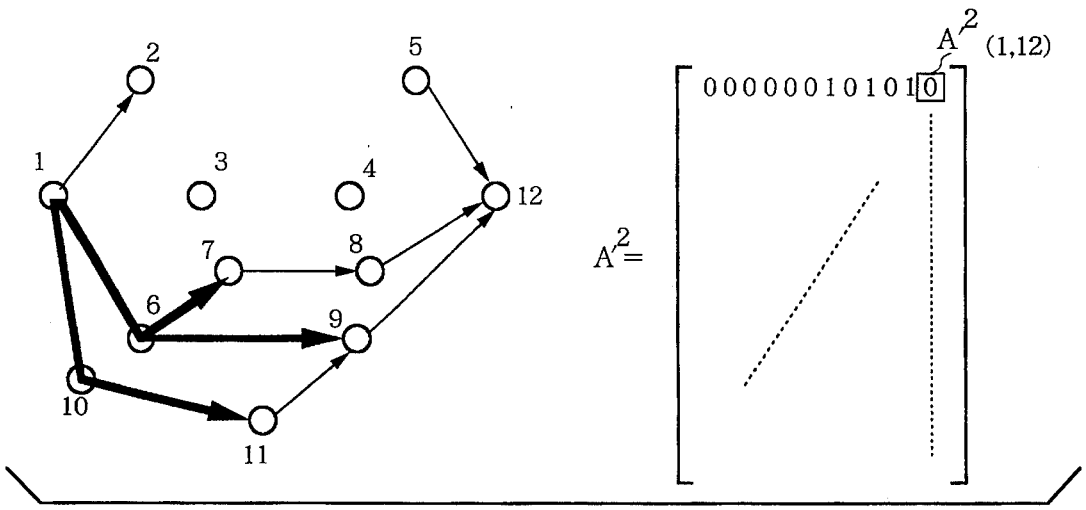
Figure 10:
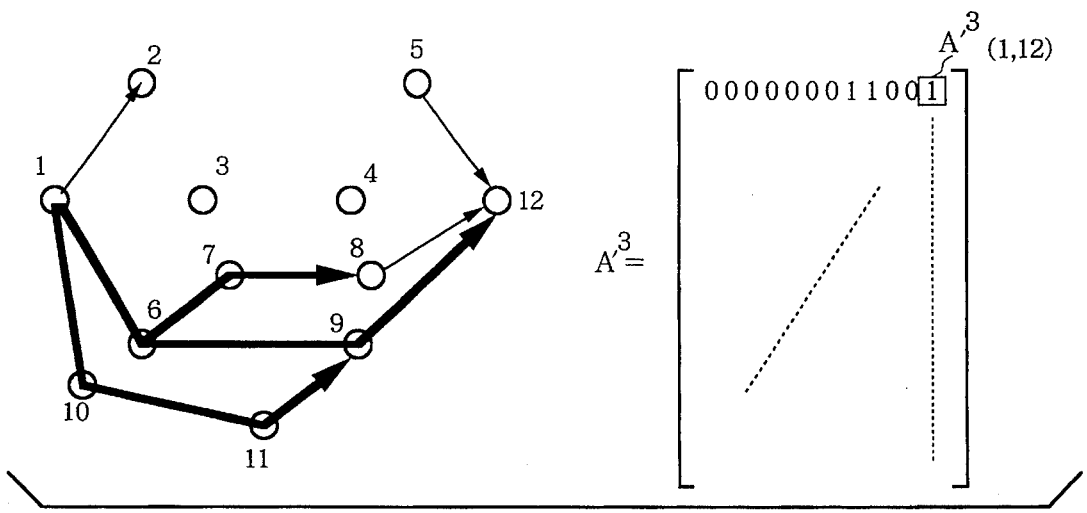
Figure 11:
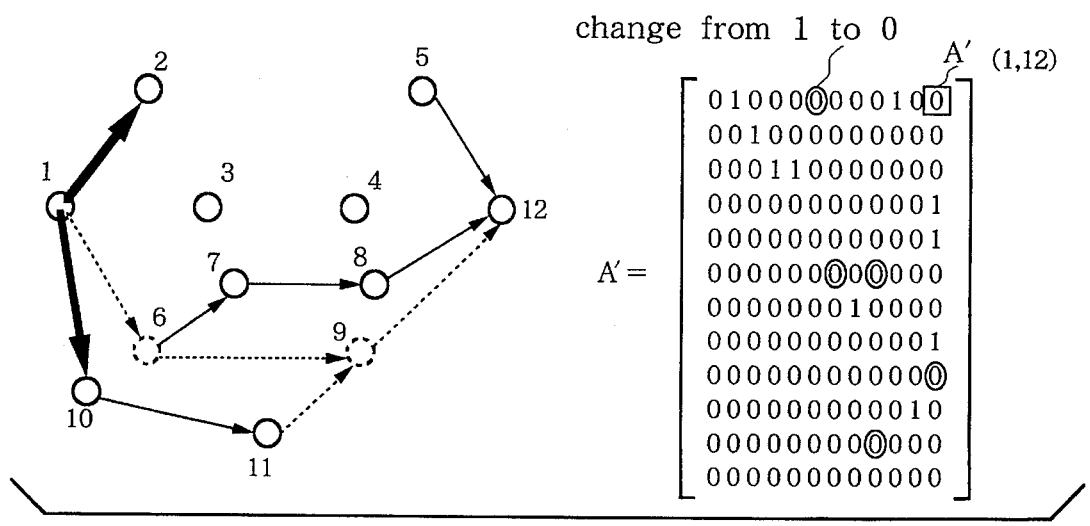
FIG. 11(a)–11(b) are conceptual diagrams showing an example of obtaining node disjoint paths with hop limit L between nodes.
Figure 11:
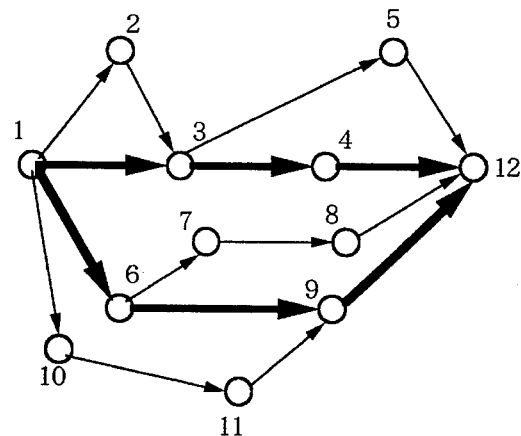
Figure 12:
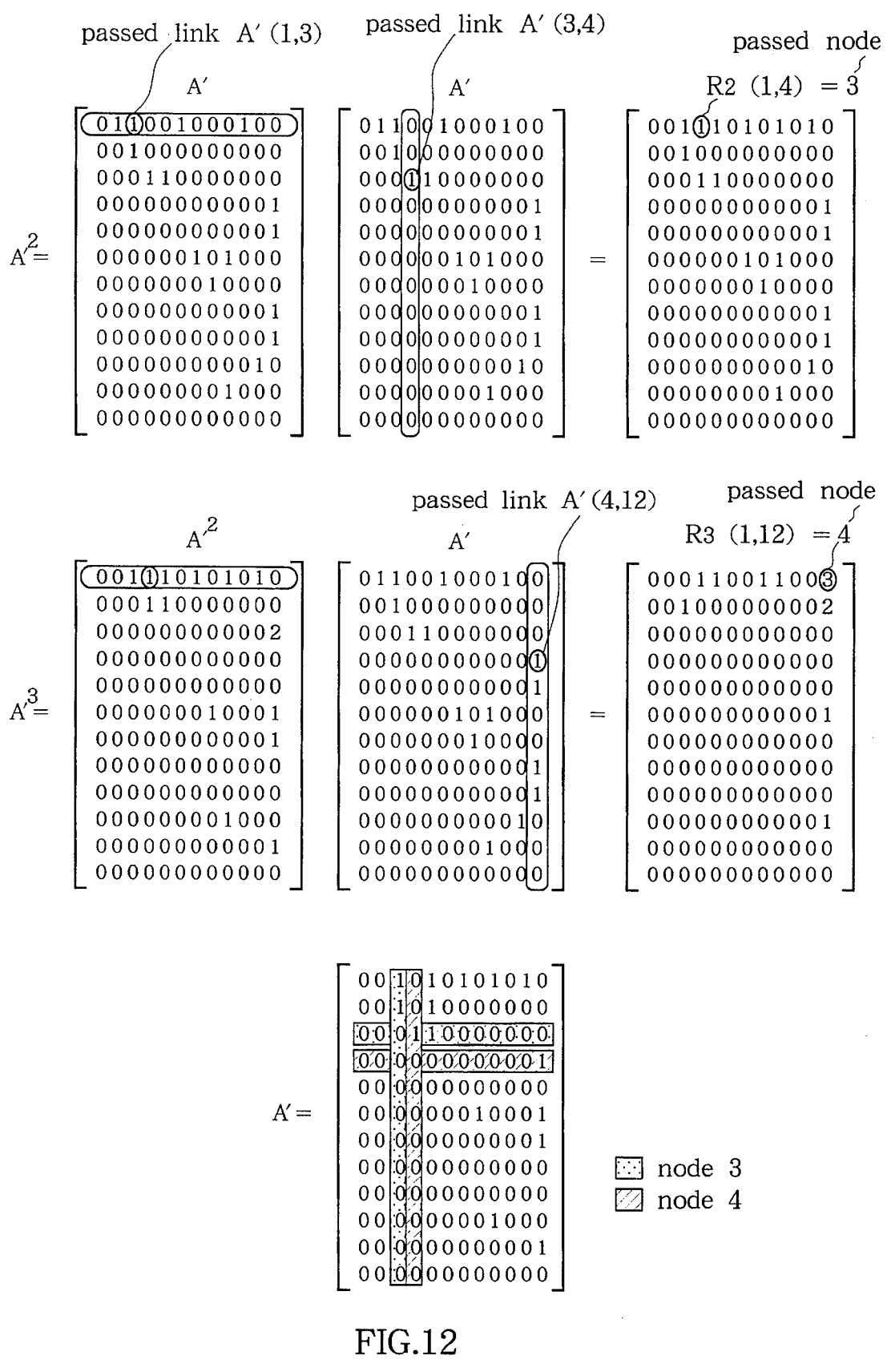

A second embodiment of this invention provides a method for obtaining node disjoint paths with a hop limit between nodes by matrix calculation. FIG. 7 shows an algorithm for obtaining node disjoint paths with hop limit L between nodes according to the second embodiment of this invention. FIG. 8 shows an algorithm for retracing node disjoint paths and deleting links connected to passed nodes. FIGS. 9–11 are conceptual diagrams showing an example of obtaining node disjoint paths with hop limit L between nodes. FIG. 12 is a conceptual diagram showing an example of retracing a node disjoint path and using passed nodes information matrices to delete links connected to passed nodes. An explanation will now be given, with reference to FIG. 7, of the method for obtaining node disjoint paths with hop limit L.

The operations from steps S11 to S19 are the same as the operations in steps 51–59 explained in the first embodiment of this invention. The feature that distinguishes the method for obtaining node disjoint paths from the method for obtaining link disjoint paths is step S20. The operation of step S20 will now be explained.

(S20) Search backwards for a path that reaches node j from node i in k hops. Delete links connected to the passed nodes of the path that has been searched backwards. That is to say, change from "1" to "0" elements of temporary adjacency matrix A' which represent the relevant links. An example of these algorithms will be explained with reference to FIG. 8(a).

(S20$_1$) Set m to j.

(S20$_2$) In paths which reach node m from node i in k hops, define nodes reached by the k–1 hop as $R_k(i,m)$ and call $R_k(i,m)$ the passed nodes information matrix. $R_k(i,m)$ is produced when A'$^k$ is calculated. A'$^k$(i,m) is calculated as follows:

$$A'^k(i,m) = \sum_{p=1}^{N} A'^{k-1}(i,p) A'^k(p,m) \quad (2)$$

and when A'$^{k-1}$(i,p)>1 and A'$^k$(p,m)≧1, it will also be the case that A'$^k$(i,m)≧1. Changing p from "1" to "N", select one arbitrary p which satisfies A'$^{k-1}$(i,p)≧1 and A'$^k$(p,m)≧1, then set $R_k(i,m)$=p. For example, changing p from "1" to "N", select the first p which satisfies A'$^{k-1}$(i,p)≧1 and A'$^k$(p,m)≧1. As shown in FIG. 8(b), delete links connected to node $R_k(i,m)$ on the basis of the passed nodes information matrix $R_k(i,m)$. That is to say, for all integers s and t such that 1≦s≦N and 1≦t≦N, if A'($R_k(i,m)$,t) or A'(s,$R_k(i,m)$) is "1", change it to "0". Next, although the node reached by the k hop is currently m and the node reached by the k–1 hop is $R_k(i,m)$, decrease k by 1 and set $R_k(i,m)$ as the new m.

(S20$_3$) Decide if k≧2m. If this is true, return to step S20$_2$. If this is false, i.e., if k=1, it means that all links connected to passed nodes have been deleted in step S20$_2$.

When the operations of step S20 are completed, return to step S14 and use the altered temporary adjacency matrix to make a new search for paths between nodes i and j within L hops. This completes the explanation of the algorithms for obtaining node disjoint paths with hop limit L.

Next, taking the network shown in FIG. 42 as an example and setting hop limit L=4, the method for obtaining node disjoint paths will be explained with reference to FIGS. 9–11.

FIG. 9(a) shows paths that can be traversed in one hop, with the origin node set to node 1 and the destination node set to node 12. Nodes that can be reached in one hop are nodes 2, 3, 6 and 10. These correspond respectively to elements A'(1,2), A'(1,3), A'(1,6) and A'(1,10) of the adjacency matrix being "1". Because A'(1,12)=0, it is decided that there is no path between nodes 1 and 12 which can be traversed in one hop. The hop number is increased by 1 so that k=2. Because k (=2)≦L (=4), A'$^2$ is calculated. FIG. 9(b) shows paths that can be traversed in two hops. Because $A'^2(1,12)=0$, it is decided that there is no path between nodes 1 and 12 which can be traversed in two hops. The hop number is again increased by 1 so that k=3. Because k (=3)≤L (=4), $A'^3$ is calculated. FIG. 9(c) shows paths that can be traversed in three hops. $A'^3(1,12)=3$, and it will be seen that there are three paths whereby node 12 can be reached from node 1 in three hops. At least one of these paths is selected from passed nodes information matrices (in the example given in FIG. 10(a), one selected path is 1→3→4→12) and links connected to passed nodes are deleted as shown in FIG. 10(a) by the dashed arrows. That is to say, elements of the temporary adjacency matrix that correspond to links connected to passed nodes are changed from "1" to "0".

FIG. 12 shows the operation of step S20 in FIG. 7 (i.e., to FIG. 8). In the present example, i=1, j=12 and k=3. Setting m=12, the passed nodes information matrix $R_k(i,m)$ becomes $R_3(1,12)=4$. $R_3(1,12)$ is a p which satisfies $A'^2(1,p) \geq 1$ and $A'(p,12) \geq 1$. Given $R_3(1,12)=4$, all the column 4 elements and all the row 4 elements of the temporary adjacency matrix that are "1" are changed from "1" to "0". Next, setting k=2 and m=4, the passed nodes information matrix $R_k(i,m)$ will be $R_2(1,4)=3$. $R_2(1,4)$ is the p which satisfies $A'(1,p) \geq 1$ and $A'(p,4) \geq 1$. Given $R_2(1,4)=3$, all the column 3 elements and all the row 3 elements of the temporary adjacency matrix that are "1" are changed from "1" to "0". Because k<2 if k is again decreased by 1, this means that all links connected to passed nodes have already been deleted.

The altered temporary adjacency matrix A' is then used to search again for paths within L (=4) hops. In the same way, as shown in FIG. 10(a), (b) and (c), provided that k≤L, hop number k is incremented by 1 until $A'^k(1,12) \geq 1$. In FIG. 10(c), $A'^3(1,12)=1$, which means that a path 20 that can reach the destination node in three hops has been found. Passed nodes are obtained in reverse direction from passed nodes information matrices, and links connected to passed nodes are deleted as shown in FIG. 11(a) by the dashed arrows. That is to say, elements of the temporary adjacency matrix connected to passed nodes are changed from "1" to "0".

Using similar calculations to those described above, two node disjoint paths are subsequently obtained as shown in FIG. 11(b), in accordance with the algorithm given in FIG. 7.

In this second embodiment of the invention, the temporary adjacency matrix is used to search, one path at a time, for paths within the hop limit; and links connected to nodes of a path that has been found are deleted by using passed nodes information matrices to change elements of the temporary adjacency matrix that participate in the passed nodes from "1" to "0". The altered temporary adjacency matrix is then used to search again for a path.

In the example of the network illustrated in FIG. 42, the number of node disjoint paths is 3, as shown in FIG. 45(b). Although the method according to this invention is an approximation calculation, the actual number of node disjoint paths is never overestimated. Accordingly, use of the method according to this invention enables communication networks to be designed with guaranteed reliability.

Because the method according to this invention is based on matrix calculation, rapid calculation will be possible by using a super-computer equipped with vector processors.

Third Embodiment

Figure 13:
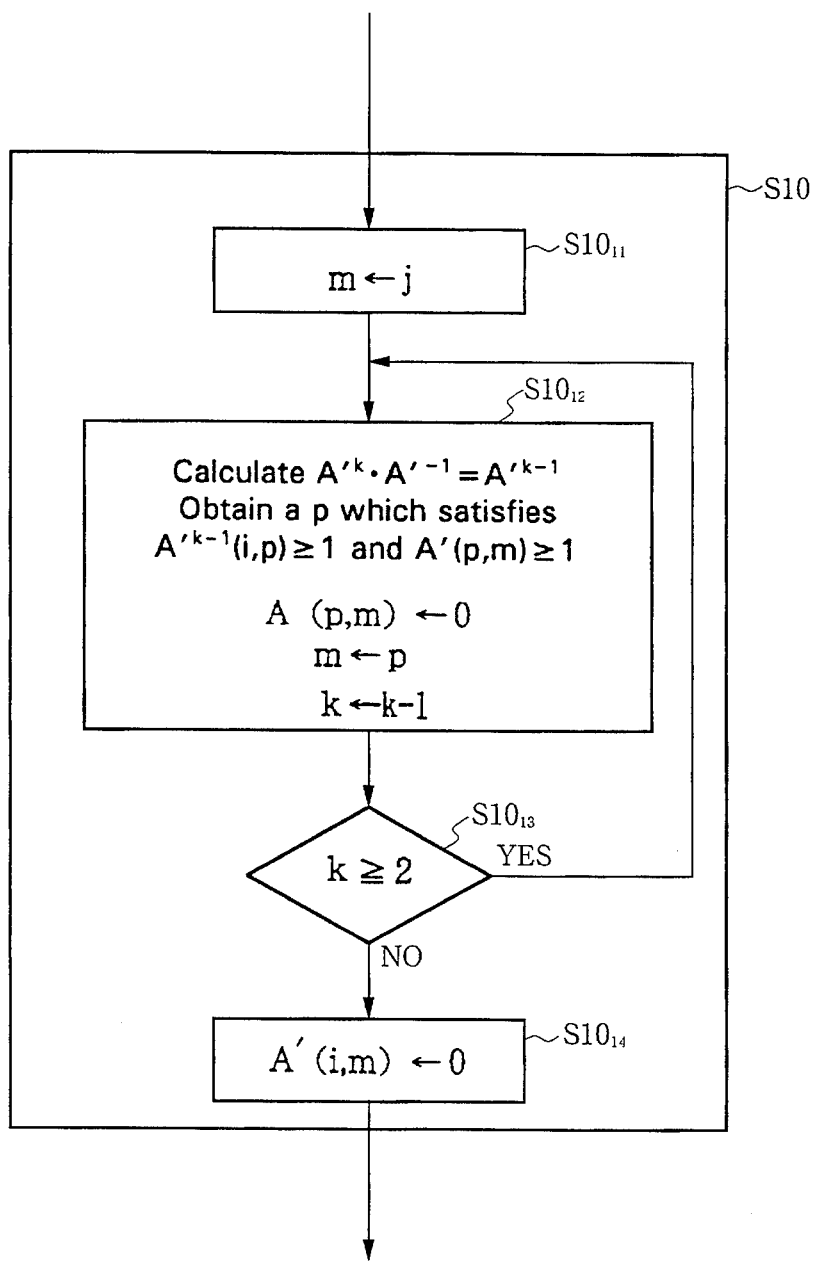
FIG. 13(a)–13(b) show an algorithm for searching backwards for passed nodes on the basis of multiplication of a power of the adjacency matrix by the inverse of the adjacency matrix according to a third embodiment of this invention.
Figure 13:
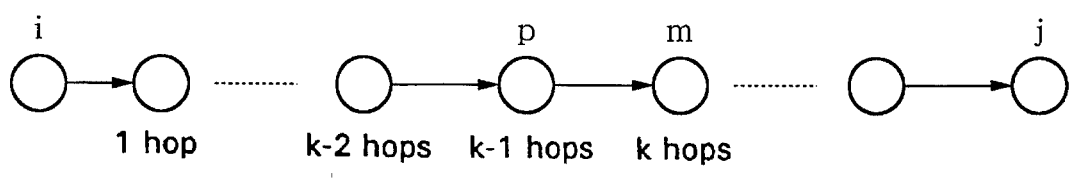

A third embodiment of this invention relates to the part corresponding to step S10 in FIG. 1, which was described in the first embodiment, i.e., it illustrates another method for searching backwards for paths that reach node j from node i in k hops. FIG. 13 shows an algorithm for searching backwards for passed nodes by means of multiplication of a power of the adjacency matrix by the inverse of the adjacency matrix according to the third embodiment. This third embodiment of the invention will be explained using FIG. 13(a). In the first embodiment, passed nodes were stored by means of passed nodes information matrices, but in this third embodiment passed nodes are obtained by calculating the product $(A'^{k-1})$ of a power of the temporary adjacency matrix $(A'^k)$ and the inverse of the temporary adjacency matrix $(A'^{-1})$. Thus, passed node information matrices need not be stored.

($S10_{11}$) Set m to j.

($S10_{12}$) In paths which reach node m from node i in k hops, obtain nodes reached in k−1 hops from the product $(A'^{k-1})$ of a power of the temporary adjacency matrix $(A'^k)$ and the inverse of the temporary adjacency matrix $(A'^{-1})$. When $A'^{k-1}(i,p) \geq 1$ and $A'^k(p,m) \geq 1$, it will be the case that $A'^k(i,m) \geq 1$. Changing p from "1" to "N", select one arbitrary p which satisfies $A'^{k-1}(i,p) \geq 1$ and $A'^k(p,m) \geq 1$. For example, changing p from "1" to "N", select the first p which satisfies $A'^{k-1}(i,p) \geq 1$ and $A'^k(p,m) \geq 1$. Delete the link from node p to node m, i.e., change A'(p,m) from "1" to "0". Next, although the node reached by the k hop is currently m and the node reached by the k−1 hop is p, decrease k by 1 and take p as the new m.

($S10_{13}$) Decide if k≥2. If this is true, return to step $S10_{12}$. If it is false, i.e., if k=1, proceed to $S10_{14}$.

($S10_{14}$) When k=1, a link passed in one hop is a link between nodes i and m, and therefore set A'(i,m)=0.

When the operations of step S10 are completed, return to step S4 in FIG. 1 and use the altered temporary adjacency matrix to make a new search for paths between nodes i and j within L hops.

In this third embodiment of the invention, because passed nodes can be obtained by matrix calculation, it is not necessary to store passed nodes information matrices as in the first embodiment, enabling reductions to made in memory circuits and other hardware.

Fourth Embodiment

Figure 14:
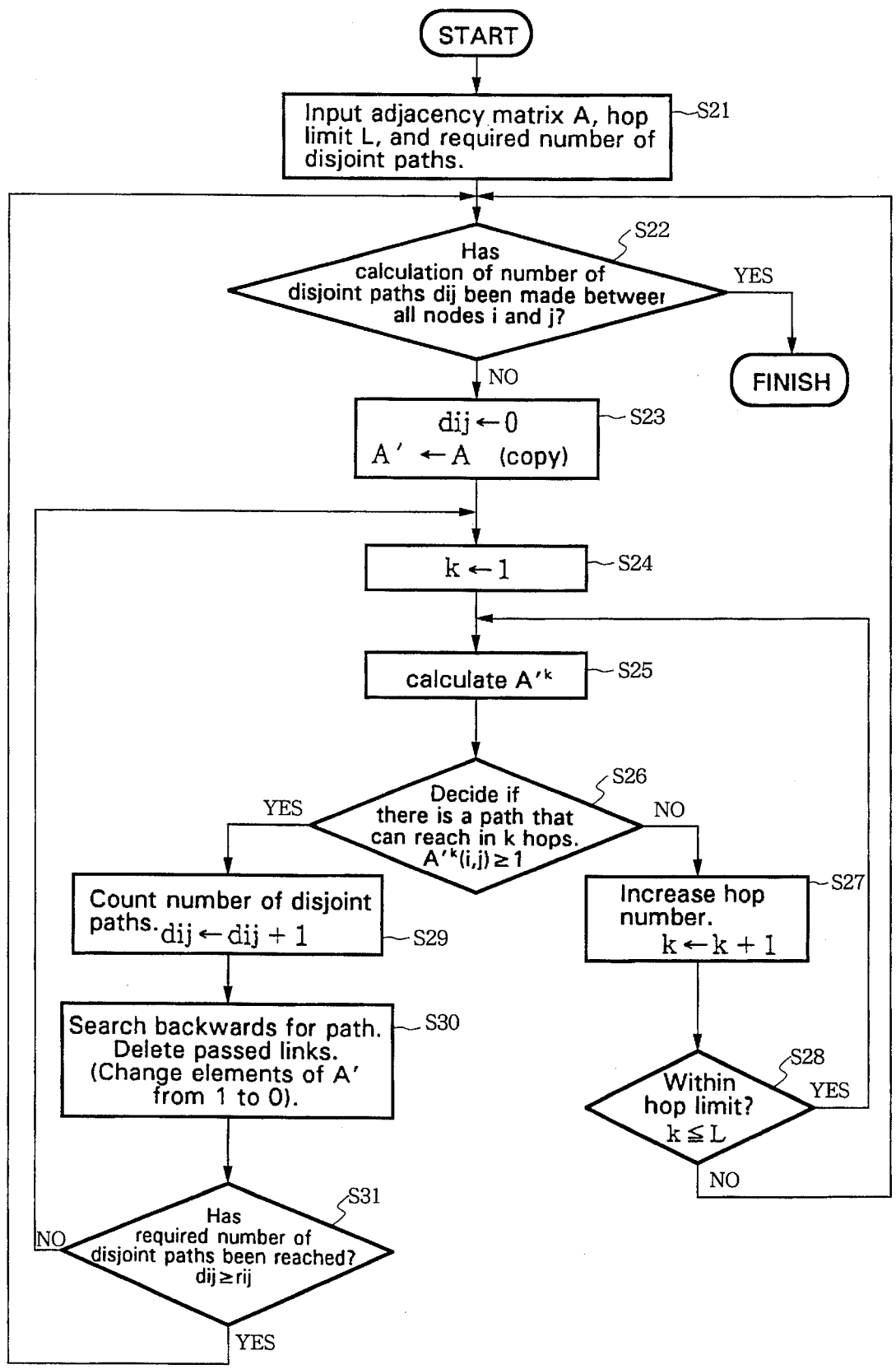
FIG. 14 shows an algorithm for obtaining link disjoint paths with hop limit L between nodes when a required number of link disjoint paths has been given according to a fourth embodiment of this invention.

A fourth embodiment of this invention provides a method for obtaining link disjoint paths by matrix calculation when a hop limit between nodes and the required number of link disjoint paths have been given. FIG. 14 shows an algorithm for obtaining link disjoint paths with hop limit L between nodes when the required number of link disjoint paths has been given according to the fourth embodiment of this invention. The distinguishing feature of this fourth embodiment from the previous embodiments is that when the required number of link disjoint paths is given, decision step S31 in FIG. 14 is added to an algorithm for obtaining link disjoint paths according to FIG. 1.

When a high-reliability communication network is designed, the number of link disjoint paths between nodes is sometimes required in advance. Let the required number of disjoint paths between nodes i and j be $r_{ij}$. A method for obtaining link disjoint paths when the required number of link disjoint paths has been given will be explained with reference to FIG. 14.

(S21) Input adjacency matrix A, hop limit L, and the required number of disjoint paths.

Operations from step (S22) to (S30) are the same steps 51–59 as in the first embodiment of this invention.

(S31) Decide whether dij, the number of disjoint paths between nodes i and j, has reached the required number of link disjoint paths $r_{ij}$. If it has, then because it is unnecessary to search for any more link disjoint paths, return to step S22 and search for link disjoint paths between new nodes. If it has not, return to step S24. In this fourth embodiment of the invention, due to the provision of a decision part such as step S31 in FIG. 14, it is unnecessary to calculate more link disjoint paths than are required, and therefore calculation time can be reduced in comparison with the first embodiment of this invention.

Although this fourth embodiment of the invention has been described with reference to link disjoint paths, it can likewise be implemented in cases where node disjoint paths are to be obtained if step S30 of this fourth embodiment is changed to step S20 of the second embodiment.

Fifth Embodiment

Figure 16:
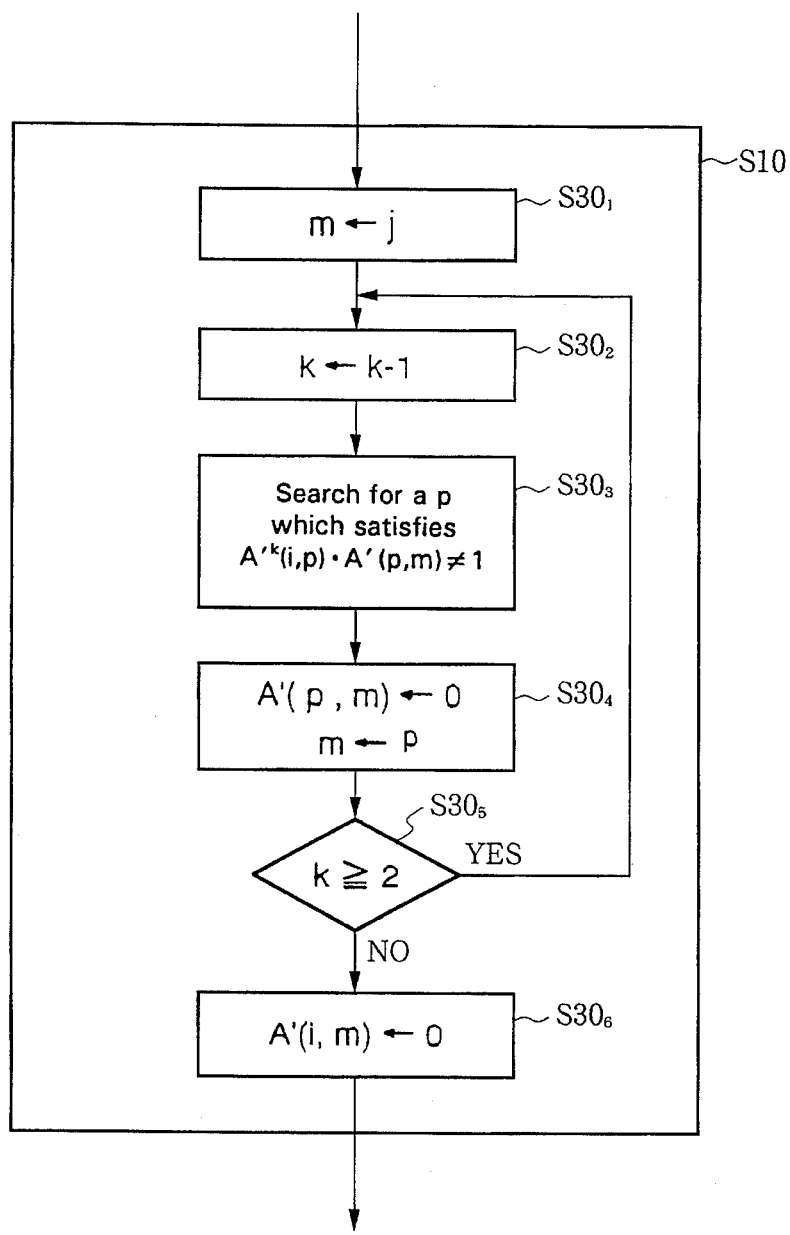
FIG. 16(a)–16(b) show an algorithm for searching backwards for paths and deleting passed links, according to a fifth embodiment of this invention.
Figure 16:
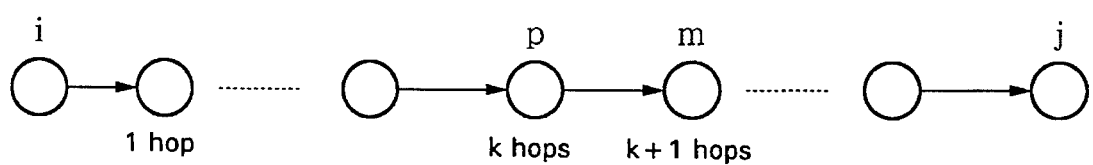

A fifth embodiment of this invention provides a method for obtaining link disjoint paths with a hop limit between nodes by means of matrix calculation. FIGS. 16(a) and 16(b) are conceptual diagrams showing an example of retracing a link disjoint path, searching for passed nodes, and deleting passed links. The method for obtaining link disjoint paths with hop limit L will be explained with reference to FIG. 1 wherein the process illustrated in FIG. 16 is used in step S20 of FIG. 1.

(S1) Input the communication network with a network of the sort shown in FIG. 42, and represent this using adjacency matrix A. The (i,j) element of adjacency matrix A is defined as follows. If there is a link between node i and node j, $A(i,j)=1$; and if there is no such link, $A(i,j)=0$. A hop limit L is also input.

(S2) Calculate the link disjoint paths between nodes i and j (there are $N \times (N-1)$ node pairs, where N is the number of nodes). Now decide whether the link disjoint paths between all nodes have been calculated. If so, terminate the processing. If not so, proceed to S3.

(S3) Initialize $d_{ij}$, the number of link disjoint paths between nodes, to "0". Copy adjacency matrix A to temporary adjacency matrix A'.

(S4) Set hop number k (the number of passed links) to $k=1$.

(S5) If $k \neq 1$, calculate $A'^k = A'^{k-1} \times A'$. If $k=1$, $A'^1 = A'$, so no calculation is required.

(S6) Decide whether there is a path or paths which can reach destination node j from origin node i in k hops. $A'^k(u,w)$, the (u,w) element of $A'^k$, indicates the number of paths which can reach node w from node u in k hops. Whether there is a path that can reach node j from node i should be decided on the basis of whether element $A'^k(i,j)$ is equal to or greater than "1". If $A'^k(i,j) \geq 1$ is true, there is a path that reaches in k hops, so proceed to S9. If it is not true, proceed to S7.

(S7) Increase hop number k by 1.

(S8) Decide whether hop number k which has been increased by 1 in S7 is still within hop limit L, i.e., decide whether $k \leq L$. If this is true, return to S5 and search for paths with k hops. If it is not true, infer that the search for link disjoint paths with hop limit L between nodes i and j has been finished, return to S2, and search for link disjoint paths between new nodes.

(S9) Count the number of link disjoint paths.

(S10) Search backwards for a path that has reached node j from node i in k hops. Delete passed links of the path that has been searched backwards, i.e., change from "1" to "0" those elements of A' that represent the passed links. An example of these algorithms will be explained with reference to FIG. 16. FIG. 16 shows the algorithm used in this fifth embodiment of the invention for searching backwards for paths and deleting passed links.

($S30_1$) Set m to j.
($S30_2$) Decrease the value of k by 1.
($S30_3$) Search for a p which satisfies:

$$A'^k(i,p) \cdot A'(p,m) \neq 0 \qquad (3)$$

This means changing p suitably from 1 to N and selecting one p which satisfies $A'^k(i,p) \geq 1$ and $A'(p,m) \geq 1$. For example, changing p from "1" to "N", select the first p which satisfies Equation 3, i.e., the first p which satisfies $A'^k(i,p) \geq 1$ and $A'(p,m) \geq 1$.

($S30_4$) Delete the link between node p and node m, node p being the node between nodes i and m that is reached in k hops. In other words, change $A'(p,m)$ from "1" to "0". Next, make passed node p the new m and proceed to step $S30_5$.

($S30_5$) Decide if $k \geq 2$. If this is true, return to step $S30_2$. If it is false, i.e., if $k=1$, proceed to $S30_6$.

($S30_6$) When $k=1$, a link passed in one hop is a link between nodes i and m, and therefore set $A'(i,m)=0$.

When the operations of step S10 in FIG. 16 are completed, return to step S4 in FIG. 1 and use the altered temporary adjacency matrix to make a new search for paths between nodes i and j within L hops. This completes the explanation of the algorithm for obtaining link disjoint paths with hop limit L according to the fifth embodiment of the present invention.

Next, taking the network shown in FIG. 42 as an example and setting hop limit $L=4$, the method for obtaining link disjoint paths according to this invention will be explained with reference to FIGS. 3–5. FIG. 3(a) shows paths that can be traversed in one hop, with the origin node set to node 1 and the destination node set to node 12. Nodes that are reached in one hop are nodes 2, 3, 6 and 10. These correspond respectively to elements $A'(1,2)$, $A'(1,3)$, $A'(1,6)$ and $A'(1,10)$ of the adjacency matrix being "1". Because $A'(1,12)="0"$, it is decided that there is no path between nodes 1 and 12 which can be traversed in one hop. The hop number is increased by 1 so that $k=2$. Because $k (=2) \leq L (=4)$, $A'^2$ is calculated. FIG. 3(b) shows paths that can be traversed in two hops. Because $A'^2(1,12)=0$, it is decided that there is no path between nodes 1 and 12 which can be traversed in two hops. The hop number is again increased by 1 so that $k=3$. Because $k (=3) \leq L (=4)$, $A'^3$ is calculated. FIG. 3(c) shows paths that can be traversed in three hops. $A'^3(1,12)=3$, and it will be seen that there are three paths whereby node 12 can be reached from node 1 in three hops. One of these paths is selected from passed nodes information matrices (in the example given in FIG. 3(c), the selected path is $1 \rightarrow 3 \rightarrow 4 \rightarrow 12$) and passed links are deleted as shown in FIG. 4(a). That is to say, elements of the temporary adjacency matrix that correspond to passed links are changed from "1" to "0".

FIG. 15 shows the operation of step S10 in FIG. 16 (i.e., the part corresponding to step S10 in FIG. 1 according to the fifth embodiment of the present invention). In the present example, in FIG. 16, $i=1$, $j=12$ and $k=3$. Setting $m=12$, the value of k is decreased from "3" to "2". It is seen from row $i (=1)$ of $A'^2$ and column $m (=12)$ of A' that a p which satisfies Equation 3 is 4, and therefore, the passed node is set to $p=4$ and element $A'(4,12)$ of the temporary adjacency matrix corresponding to the passed link is changed from "1" to "0". The value $p=4$ is then set for m. Because $k \geq 2$, the value of k is decreased from "2" to "1". It is seen from row $i (=1)$ of A' and column $m (=4)$ of A' that the p which satisfies Equation 3 is 3, and therefore, the passed node is set to $p=3$ and element $A'(3,4)$ of the temporary adjacency matrix corresponding to the passed link is changed from "1" to "0".

The value p=3 is then set for m. Because k=1, the value of A'(i,m), i.e., of A'(1,3), is changed from "1" to "0".

The altered temporary adjacency matrix A' is then used to search again for paths within L (=4) hops. In the same way, as shown in FIG. 4(a), (b) and (c), provided that k≤L, hop number k is incremented by 1 until $A'^k(1,12) \geq 1$. In FIG. 4(c), $A'^3(1,12)=1$, which means that a path that can reach the destination node in three hops has been found. Passed links are obtained in reverse direction from passed nodes information matrices, and passed links are deleted as shown in FIG. 5(a). That is to say, elements of the temporary adjacency matrix corresponding to passed links are changed from "1" to "0". Using similar calculations to those described above, a total of three link disjoint paths is subsequently obtained as shown in FIG. 5(b), in accordance with the algorithm given in FIG. 1.

In this fifth embodiment of the invention, the temporary adjacency matrix is used to search, one path at a time, for paths within the hop limit; and a path that has been found has its passed links deleted by using passed nodes information matrices to change from "1" to "0" elements of the temporary adjacency matrix that correspond to passed links. The altered temporary adjacency matrix is then used to search again for a path.

In the example of the network shown in FIG. 42, the number of link disjoint paths is 4, as shown in FIG. 45(a). Although the method according to this invention is an approximation calculation, the actual number of link disjoint paths is never overestimated. Accordingly, use of the method according to this invention enables communication networks to be designed with guaranteed reliability. Because the method according to this invention is based on matrix calculation, rapid calculation will be possible by using a super-computer equipped with vector processors.

Sixth Embodiment

Figure 17:
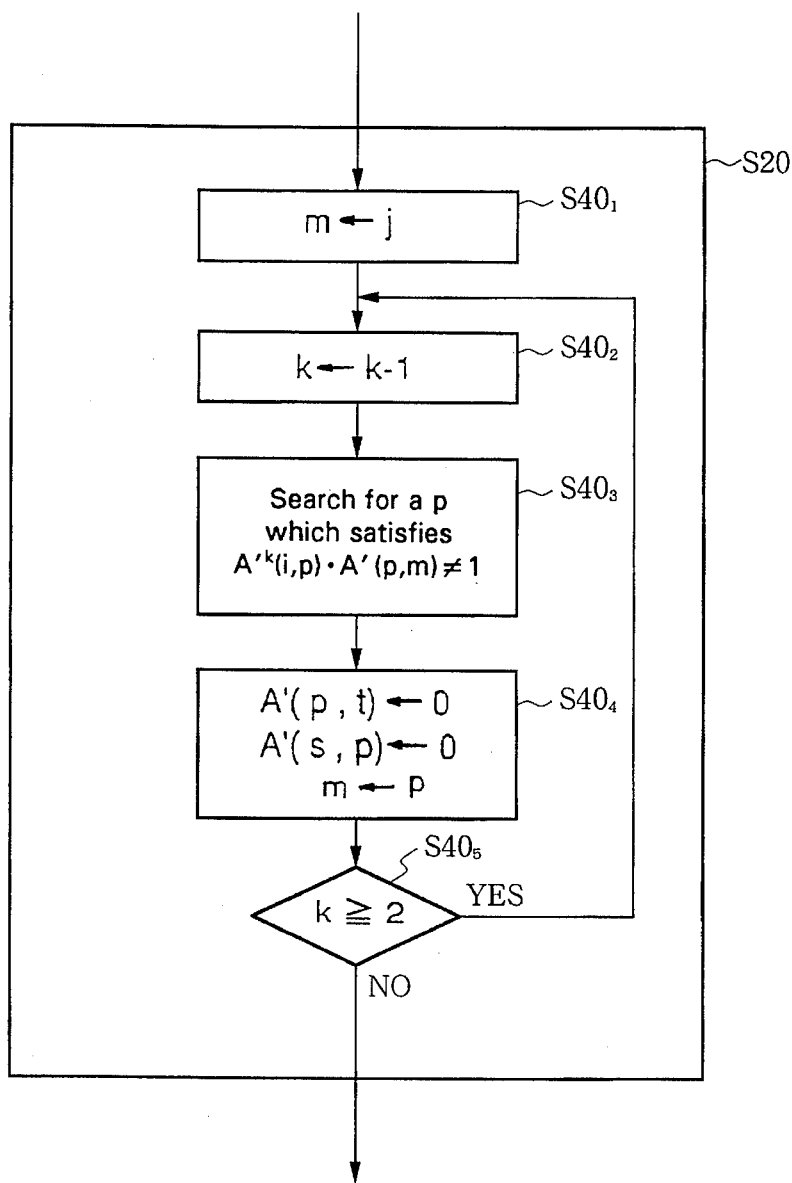
FIGS. 17(a)–17(b) are diagrams showing an algorithm for searching backwards for paths and deleting links connected to passed nodes, according to a sixth embodiment of this invention.
Figure 17:
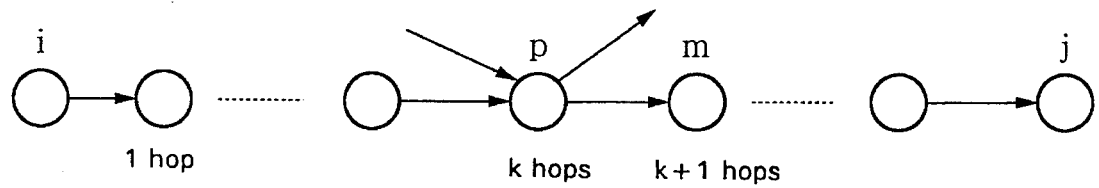
Figure 18:
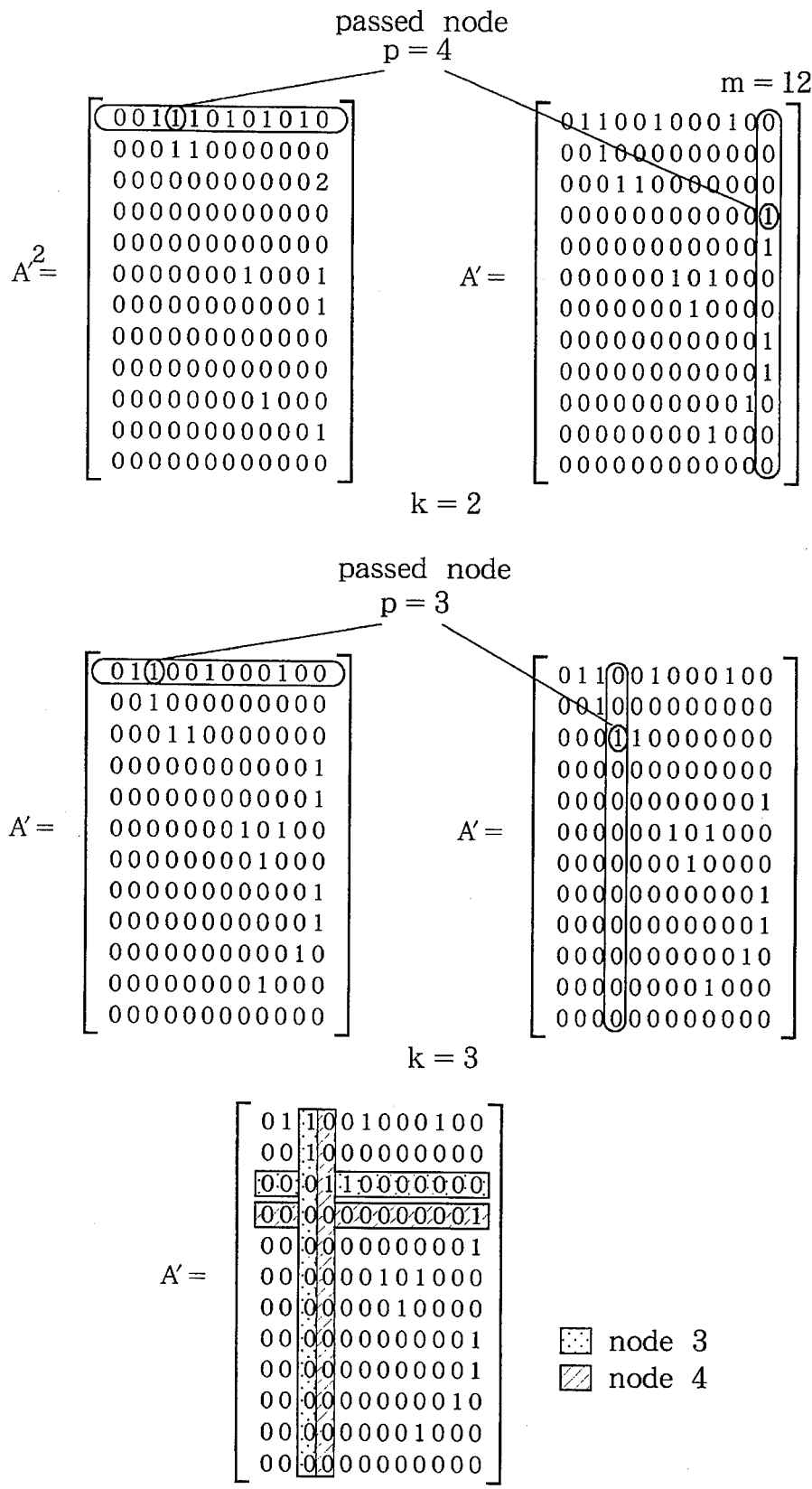
FIG. 18 is a conceptual diagram showing an example of retracing a node disjoint path, searching for passed nodes, and deleting links connected to passed nodes.

A sixth embodiment of this invention gives a method for obtaining node disjoint paths with a hop limit between nodes by means of matrix calculation. FIG. 17 is an explanatory diagram showing an algorithm for retracing node disjoint paths and deleting links connected to passed nodes. FIGS. 9–11 are conceptual diagrams showing an example of obtaining node disjoint paths with hop limit L between nodes. FIG. 18 is a conceptual diagram showing an example of retracing a node disjoint path, searching for passed nodes, and deleting links connected to passed nodes. The method for obtaining node disjoint paths with hop limit L will be explained with reference to FIG. 7.

The operations from steps S11 to S19 are the same as the operations explained in the fifth embodiment of this invention. The feature that distinguishes the method for obtaining node disjoint paths from the method for obtaining link disjoint paths is step S20. The operation of step S20 will now be explained with reference to FIG. 17.

(S20) Search backwards for a path that reaches node j from node i in k hops. Delete links connected to the passed nodes of a path that has been searched backwards. That is to say, change from "1" to "0" elements of temporary adjacency matrix A' which represent the relevant links.

(S40$_1$) Set m to j.
(S40$_2$) Decrease the value of k by 1.
(S40$_3$) Search for a p which satisfies:

$$A'^k(i,p) \cdot A'(p,m) \neq 0 \qquad (3)$$

This means changing p suitably from 1 to N and selecting one p which satisfies $A'^k(i,p) \geq 1$ and $A'(p,m) \geq 1$. For example, changing p from 1 to N, select the first p which satisfies Equation 3, i.e., the first p which satisfies $A'^k(i,p) \geq 1$ and $A'(p,m) \geq 1$.

(S40$_4$) Delete all links connected to node p, which is the node between nodes i and m that is reached in k hops. That is to say, for all integers s and t such that $1 \leq s \leq N$ and $1 < t \leq N$, if A'(p,t) or A'(s,p) is "1", change it to "0". Next, take passed node p as the new m and proceed to S40$_5$.

(S40$_5$) Decide whether $k \geq 2$. If this is true, return to S40$_2$. If it is false, i.e., if k=1, terminate the operation of S20. This completes the explanation of the algorithms for obtaining node disjoint paths with hop limit L.

Next, taking the network shown in FIG. 42 as an example and setting hop limit L=4, the method for obtaining node disjoint paths will be explained with reference to FIGS. 9(a)–11.

FIG. 9(a) shows paths that can be traversed in one hop, with the origin node set to node 1 and the destination node set to node 12. Nodes that can be reached in one hop are nodes 2, 3, 6 and 10. These correspond respectively to elements A'(1,2), A'(1,3), A'(1,6) and A'(1,10) of the adjacency matrix being "1". Because A'(1,12)=0, it is decided that there is no path between nodes 1 and 12 which can be traversed in one hop. The hop number is increased by 1 so that k=2. Because k (=2)≤L (=4), $A'^2$ is calculated. FIG. 9(b) shows paths that can be traversed in two hops. Because $A'^2(1,12)=0$, it is decided that there is no path between nodes 1 and 12 which can be traversed in two hops. The hop number is again increased by 1 so that k=3. Because k (=3)≤L (=4), $A'^3$ is calculated. FIG. 9(c) shows paths that can be traversed in three hops. $A'^3(1,12)=3$, and it will be seen that there are three paths whereby node 12 can be reached from node 1 in three hops. One of these paths is selected from passed nodes information matrices (in the example given in FIG. 10(a), the selected path is 1→3→4→12). Links connected to passed nodes are deleted as shown in FIG. 10(a). That is to say, elements of the temporary adjacency matrix that correspond to links connected to passed nodes are changed from "1" to "0".

FIG. 18 shows the operation corresponding to step S20 in FIG. 7 (i.e., to FIG. 17). This sixth embodiment of the invention is characterized in that it does not use passed nodes information matrix R. Since $A'^2(1,p) \geq 1$ and A'(p,12)≥1, it is decided that p=4. In this sixth embodiment of the invention, passed nodes are obtained after power calculations.

Thus, given p=4, all the column 4 elements and all the row 4 elements of the temporary adjacency matrix that are "1" are changed from "1" to "0". Next, setting k=2 and m=4, and since A'(1,p)≥1 and A'(p,4)≥1, it is decided that p=3. As a result, all the column 3 elements and all the row 3 elements of the temporary adjacency matrix that are "1" are changed from "1" to "0". Because k<2 if k is again decreased by 1, this means that all links connected to passed nodes have already been deleted.

FIG. 18 shows the part that corresponds to step S20 in FIG. 7 (i.e., to FIG. 17). In the present example, i=1, j=12 and k=3 (see FIG. 17). Setting m=12, the value of k is decreased from 3 to 2, and it is found from row i (=1) of $A'^2$ and column m (=12) of A' that a p which satisfies Equation 3 is 4. The passed node is therefore set to p=4 and elements of the temporary adjacency matrix corresponding to links connected to passed node p are changed from "1" to "0". The value p=4 is then set for m. Because k≥2, the value of k is decreased from 2 to 1, and it is found from row i (=1) of A' and column m (=4) of A' that a p which satisfies Equation 3 is 3. The passed node is therefore set to p=3 and elements of the temporary adjacency matrix corresponding to links connected to the passed node are changed from "1" to "0". The value p=3 is then set for m. Because k=1, the operation of S20 is terminated.

The altered temporary adjacency matrix A' is then used to search again for paths within L (=4) hops. In the same way, as shown in FIG. 10(a), (b) and (c), provided that k≦L, hop number k is incremented by 1 until $A'^k(1,12) \geq 1$. In FIG. 10(c), $A'^3(1,12)=1$, which means that a path that can reach the destination node in three hops has been found. Passed nodes are obtained in reverse direction from this, and links connected to the passed nodes are deleted as shown in FIG. 11(a). That is to say, elements of the temporary adjacency matrix that have a connection with passed nodes are changed from "1" to "0".

Using similar calculations to those described above, two node disjoint paths are subsequently obtained as shown in FIG. 11(b), in accordance with the algorithm given in FIG. 7.

In this sixth embodiment of the invention, the temporary adjacency matrix is used to search, one path at a time, for paths within the hop limit; and links connected to nodes of a path that has been found are deleted by using passed nodes information matrices to change elements of the temporary adjacency matrix that participate in the passed nodes from "1" to "0". The altered temporary adjacency matrix is then used to search again for a path.

In the example of the network shown in FIG. 42, the number of node disjoint paths is 3, as shown in FIG. 45(b). Although the method according to this invention is an approximation calculation, the actual number of node disjoint paths is never overestimated. Accordingly, use of the method according to this invention enables communication networks to be designed with guaranteed reliability. Because the method according to this invention is based on matrix calculation, rapid calculation will be possible by using a super-computer equipped with vector processors.

Seventh Embodiment

A seventh embodiment of this invention is an example where, when disjoint paths with a hop limit between node i and node j are obtained by means of matrix calculation, the disjoint paths are obtained not by multiplying the temporary adjacency matrix by itself for all elements, but only for row i elements.

Figure 19:
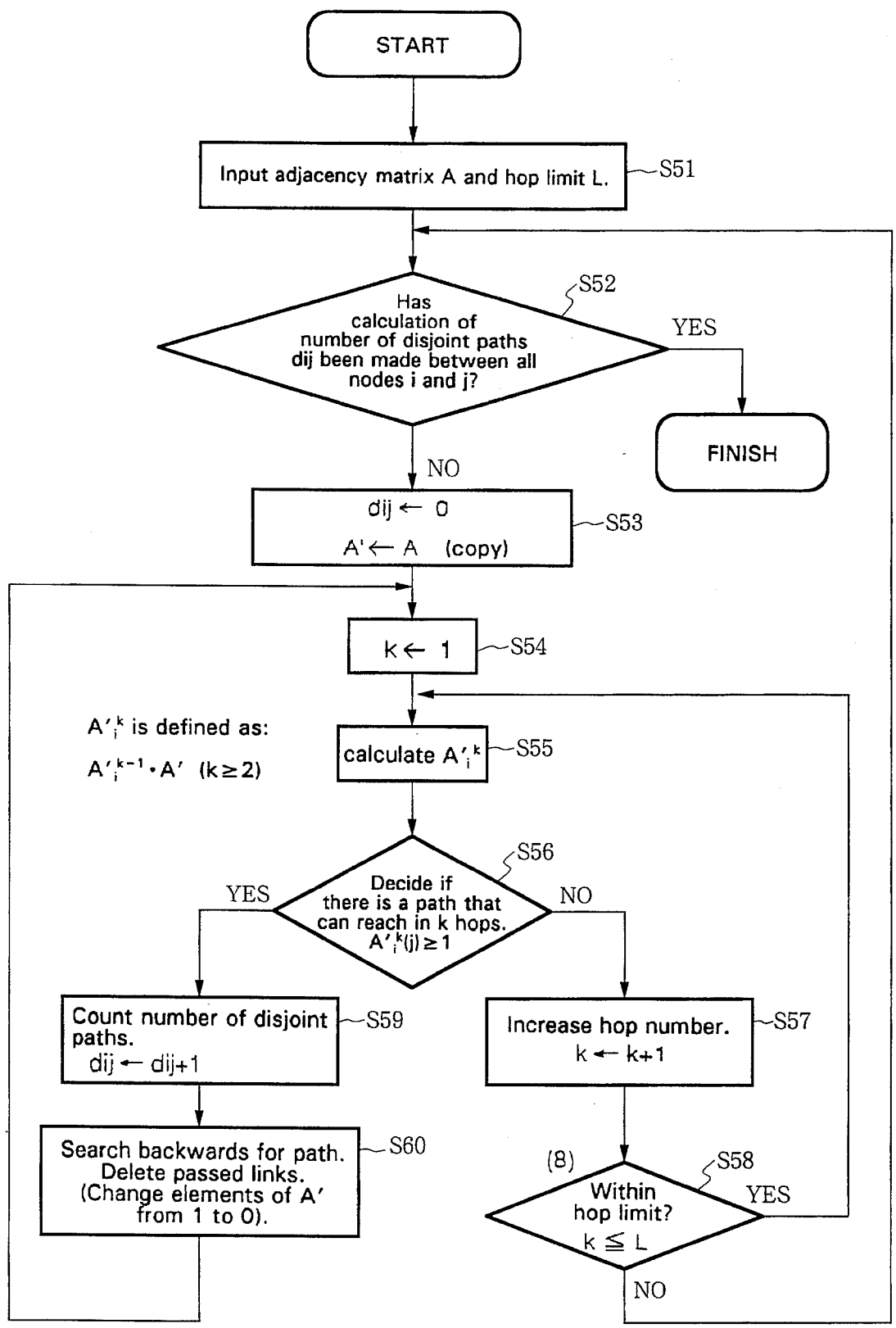
FIG. 19 is an explanatory diagram showing an algorithm for obtaining link disjoint paths with hop limit L between nodes according to a seventh embodiment of this invention.
Figure 20:
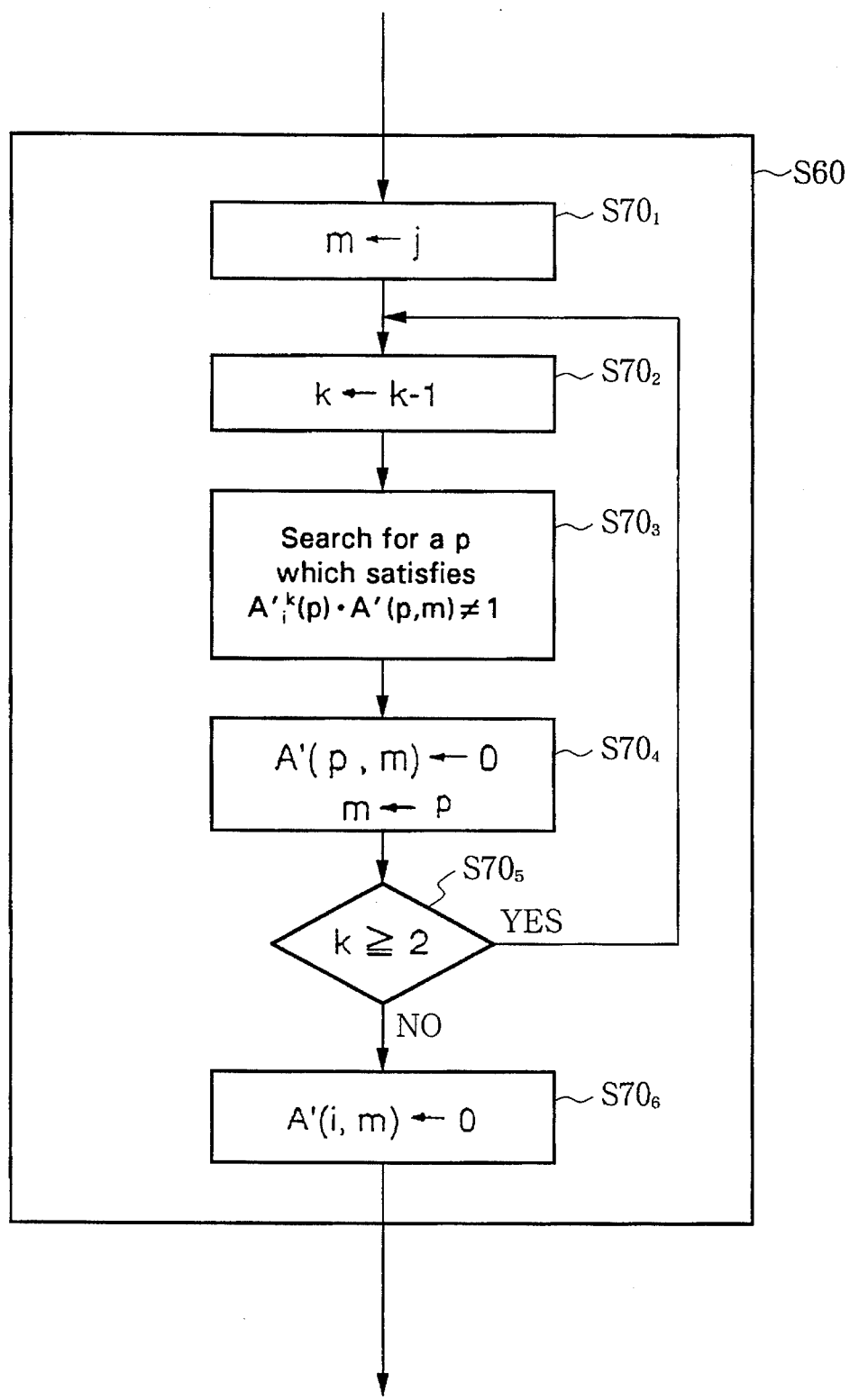
FIG. 20 is an explanatory diagram showing an algorithm for retracing a link disjoint path and deleting links connected to passed nodes according to a seventh embodiment of this invention.
Figure 21:
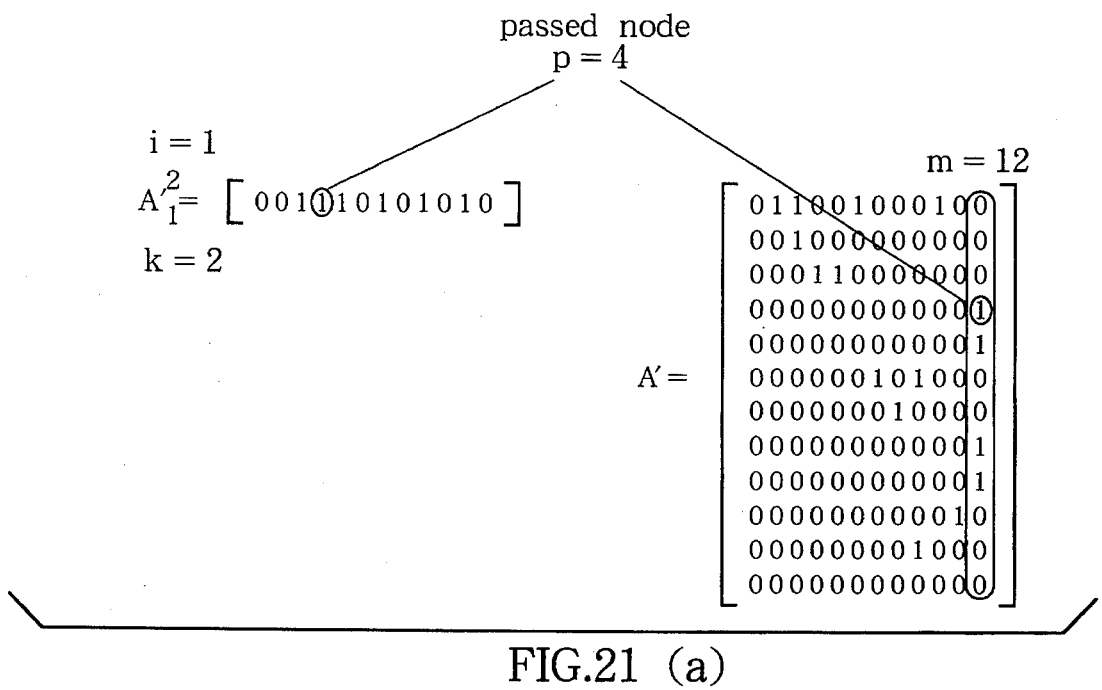
FIGS. 21(a)–21(b) are conceptual diagrams showing an example of retracing a link disjoint path, searching for passed nodes, and deleting links connected to passed nodes.
Figure 21:
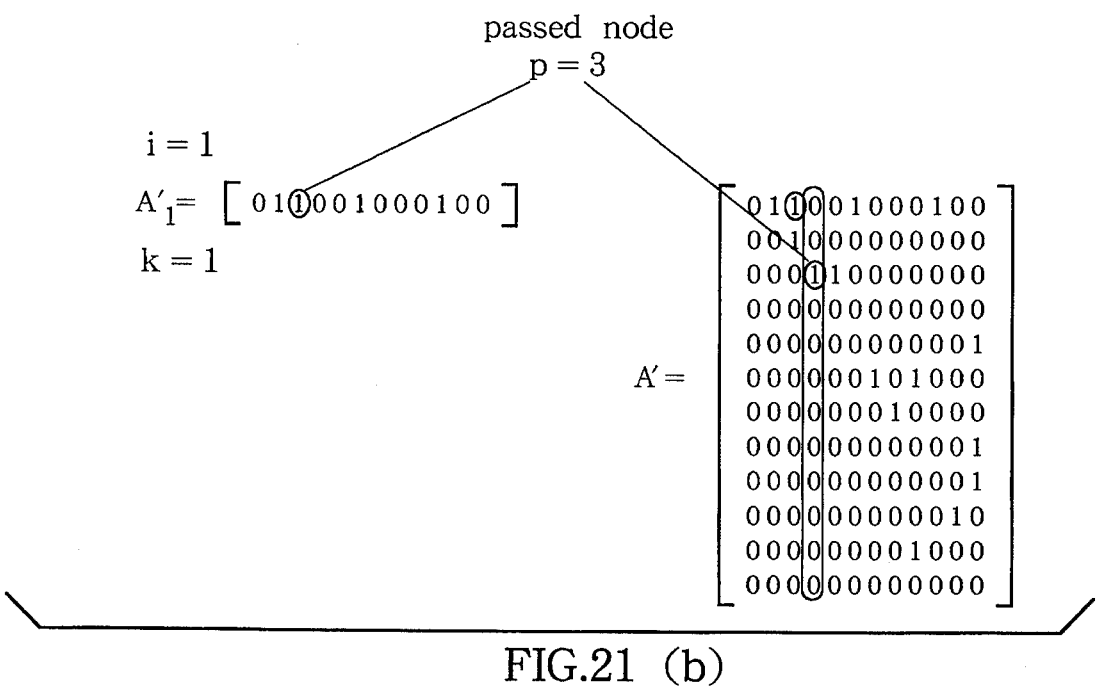

FIG. 19 is an explanatory diagram showing an algorithm for obtaining link disjoint paths with hop limit L between nodes according to this seventh embodiment of the invention. FIG. 20 is an explanatory diagram showing an algorithm for retracing link disjoint paths and deleting passed links according to this seventh embodiment. FIGS. 21(a) and 21(b) are conceptual diagrams showing an example of retracing a link disjoint path, searching for passed nodes, and deleting passed links. The method for obtaining link disjoint paths with hop limit L will be explained with reference to FIG. 19.

Comparing FIG. 19 to FIG. 1, it can be seen that parts in FIG. 19 corresponding to matrix calculating part S5, part S6 which decides whether the destination node can be reached in k hops, and part S10 which searches backwards for paths and deletes participating links are different. In the fifth embodiment of this invention, when disjoint paths between nodes i and j are being obtained, the calculation of the power of the temporary adjacency matrix in step S5 of FIG. 1 is performed on all elements; but all that is necessary in steps S6 and S10 of FIG. 1 where this result is used is simply the row i elements of the result of the power calculation. Accordingly, in the calculation of step S55 of FIG. 19 according to this seventh embodiment, only the row i elements of the power calculation result are calculated. The row vector (1×N) comprising row i of A' will be written $A'_i$. In addition, the row vector (1×N) defined by:

$$A'^k_i = A'^{k-1}_i \cdot A' \quad (k \geq 2) \tag{4}$$

will be written $A'^k_i$. When k=1, $A'^k_i$ will be $A'_i$. In step S56 of FIG. 19, it is decided whether or not $A'^k_i(j)$, which is element j of $A'^k_i$ in Equation 4, is equal to or greater than 1: i.e., whether or not there is a path whereby the destination node can be reached from the origin node in k hops.

The details of the algorithm for step S60 in FIG. 19 are given in FIG. 20. If FIG. 20 is compared with FIG. 16, which illustrates the fifth embodiment of this invention, it will be seen that the only difference is in (step S70₃), i.e., the only difference is between $A'^k_i(p)$ and $A'^k(i,p)$. All the remaining parts of FIG. 20 operate in the same way as explained in connection with FIG. 16. FIGS. 21(a)–21(b) illustrate an example of the operation of FIG. 20 for the network shown in FIG. 42.

In this seventh embodiment of the invention, because matrix multiplication is only performed on necessary elements, calculation is faster than in the fifth embodiment. The operation shown in this seventh embodiment is also applicable to node disjoint path calculation of the sort illustrated in the sixth embodiment of the invention.

Eighth Embodiment

An eighth embodiment of this invention gives a method which, when searching for a passed node in step S30₃ of FIG. 16, selects a passed node when there are two or more ps which satisfy Equation 3, i.e., when there are two or more candidates for the passed node.

FIGS. 22(a)–22(d) illustrate an example of a network and adjacency matrix which serve to explain this eighth embodiment of the invention. The origin node has been set as node 1 and the destination node as node 6. FIGS. 23(a)–23(b) illustrate the results of calculations for powers of the temporary adjacency matrix, and serves to explain this eighth embodiment. Element (1,6) in the third power of the matrix is 3, and it will be seen that there are three paths that reach the destination node in three hops.

As shown in FIG. 23(b), when searching for a passed node in step S30₃ of FIG. 16, there are two or more ps which satisfy Equation 3, namely, p=3 and p=5; i.e., there are two or more candidates for the passed node. FIGS. 22(b) and 22(c) show paths that can be selected between the origin and destination nodes when the passed node has been taken as p=3; while FIG. 22(d) shows the path that is selected between the origin and destination nodes when the passed node has been taken as p=5. When p=3 and the path 1→2→3→6 has been selected, as in FIG. 22(b), there is another disjoint path 1→4→5→6, but when p=3 and the path 1→4→3→6 has been selected, as in FIG. 22(c), there is no other disjoint path and so the actual number of disjoint paths will be underestimated. On the other hand, because path 1→4→5→6 is selected when the passed node is p=5, there will be another disjoint path 1→2→3→6.

Figure 22:
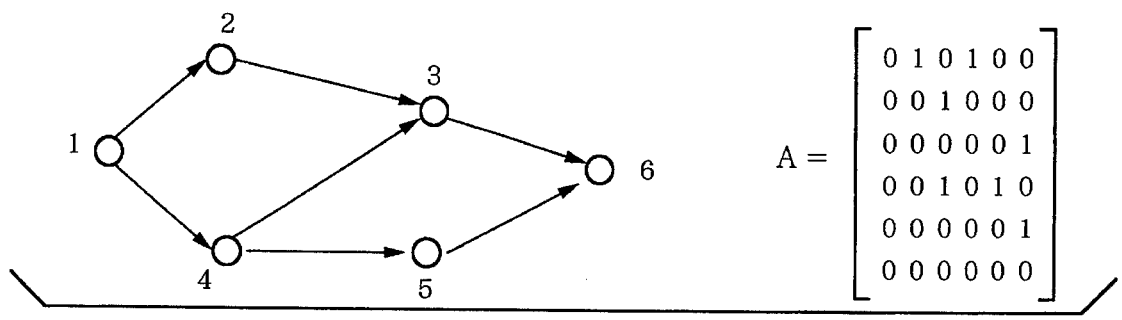
FIGS. 22(a)–22(d) show an example of a node and link network and an adjacency matrix, for purposes of explaining an eighth embodiment of this invention.
Figure 22:
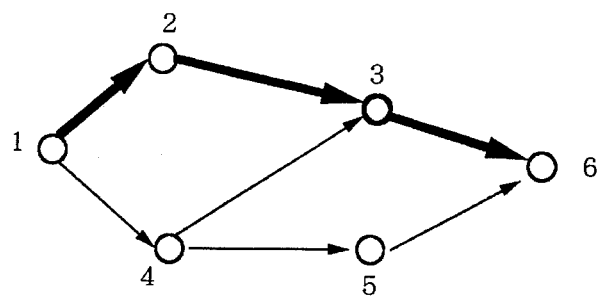
Figure 22:
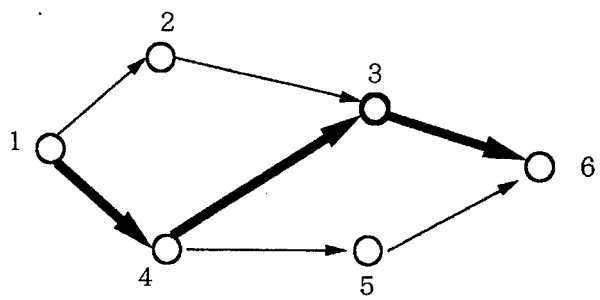
Figure 22:
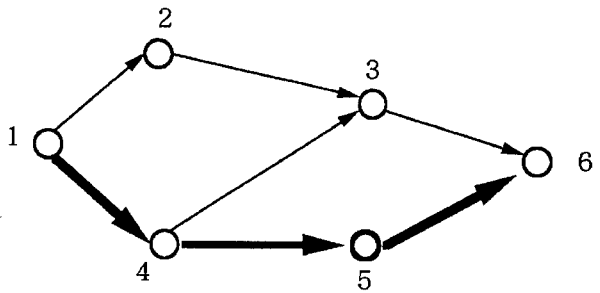

In order to decrease the error between the number of disjoint paths according to this invention and the actual number of disjoint paths, when there are two or more passed node candidates, a passed node is selected so that the probability of overestimating the number of disjoint paths is increased: in the example shown in FIG. 22, p=5 is selected. In FIG. 22, because the number of entering links connected to node 3 is two and the number of entering links connected to node 5 is one, passed node 5, which has the smaller number of entering links connected to it, is selected as the passed node. The number of entering links for a given node q is given by the number of "1"s among the elements of column q of the temporary adjacency matrix.

Figure 24:
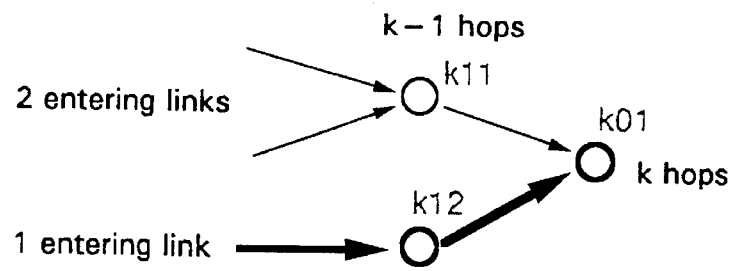
FIG. 24 illustrates the selection of passed nodes, for purposes of explaining an eighth embodiment of this invention.

FIG. 24 illustrates, in general, the selection of passed nodes and serves to explain this eighth embodiment of the invention. Given more than one passed node reached in k−1 hops and therefore, immediately previous to node k01 which is reached in k hops, the passed node with the smallest number of entering links is selected.

When there are a plurality of candidates for a passed node, as in this eighth embodiment of the invention, if the passed node with the smallest number of entering links is selected, the error between the number of disjoint paths according to this invention and the actual number of disjoint paths can be reduced.

Ninth Embodiment

Figure 25:
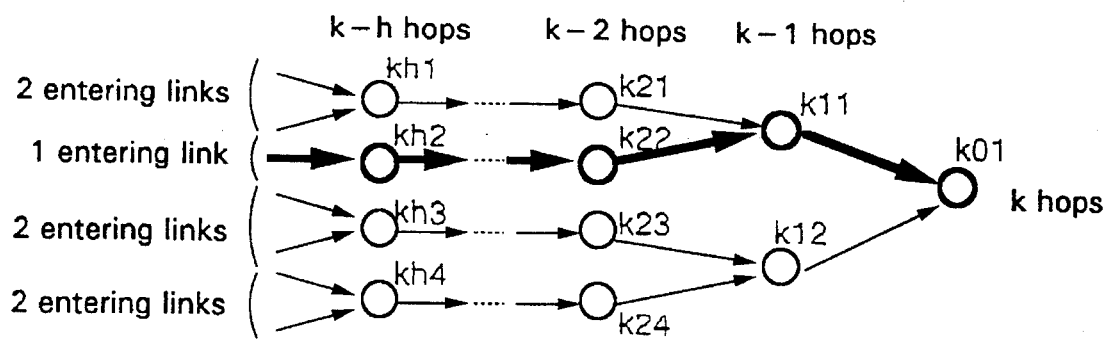
FIG. 25 serves to explain the operation of a ninth embodiment of this invention.

A ninth embodiment of this invention provides a method which, when searching for a passed node in step S30$_3$ of FIG. 16, selects a passed node when there are two or more ps which satisfy Equation 3, i.e., when there are two or more candidates for the passed node. In the eighth embodiment of this invention, the number of entering links connected to nodes reached in k−1 hops, the nodes being immediately previous to the node reached in k hops, were different. The ninth embodiment explains the selection process if the number of entering links are the same. FIG. 25 serves to explain the operation of a ninth embodiment of this invention.

In this ninth embodiment, when the number of entering links are the same, the candidate passed nodes are searched backwards until the number of entering links are different. In FIG. 25, this means first of all, going back to the passed nodes that are reached in k−2 hops, which come before the passed nodes reached in k−1 hops. When the search has been carried out for h hops backwards, the number of entering links connected to a passed node reached in k−h hops is the smallest, and therefore k11 is selected as the passed node reached in k−1 hops. Passed nodes are searched in similar manner starting from the k−1 hop, and because passed nodes k22, ..., kh2 will be selected, path kh2- ... -k22-k11-k01 will be determined when it has been ascertained that the number of entering links connected to a passed node reached in k-h hops is 1 and that this is the smallest.

When there are a plurality of candidates for passed nodes, as in this ninth embodiment of the invention, if the candidate passed nodes are searched backwards until the number of entering links differ, and the passed node with the smallest number of entering links is selected, the error between the number of disjoint paths according to this invention and the actual number of disjoint paths can be reduced.

Tenth Embodiment

Figure 26:
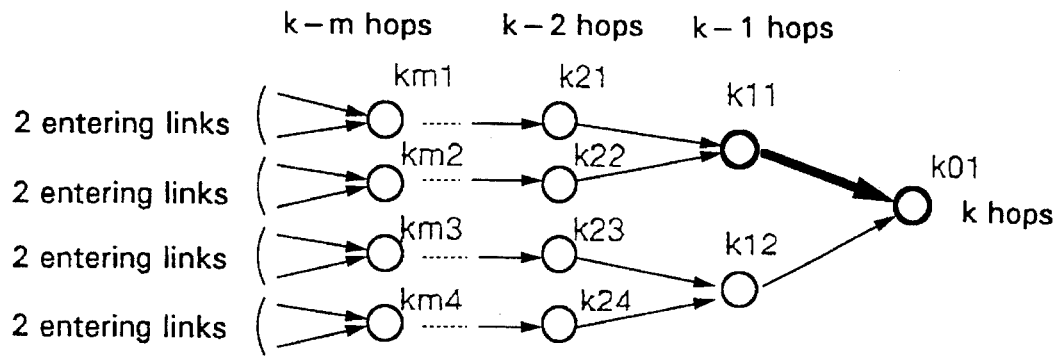
FIG. 26 serves to explain the operation of a tenth embodiment of this invention.

In the ninth embodiment of this invention, when there are a plurality of candidates for a passed node, the candidate passed nodes are searched backwards until the number of entering links are different. In a tenth embodiment of this invention, however, a limit m is preset for the number of hops searched backwards. When there are a plurality of candidates for a passed node, the candidate passed nodes are searched backwards until the number of entering links within m hops become different. If a candidate passed node with a different number of entering links is found within m hops, the operation is the same as in the ninth embodiment of this invention. However, FIG. 26 shows the situation where the number of entering links do not differ even after searching backwards for m hops, i.e., where the number of entering links connected to the passed nodes reached in k-m hops are all the same. FIG. 26 serves to explain the operation of this tenth embodiment of the invention. Here, the passed node reached in k−1 hops is k11 or k12, but because the probability of finding many other disjoint paths is thought to be the same whichever node is selected, either of these two nodes, e.g., node k11, is taken as the passed node.

When there are a plurality of candidates for a passed node, presetting a limit m for the number of hops to be searched backwards, as in this tenth embodiment of the invention, can reduce the time required for searching for a passed node.

Eleventh Embodiment

An eleventh embodiment of this invention provides a method wherein the number of hops to be searched backwards is preset to r, a backwards search is made over r hops, and the node selected as the passed node reached in k−1 hops, i.e., as the passed node immediately previous to the node reached in k hops, is the one for which the total number of entering links at k-r hops is smaller.

Figure 27:
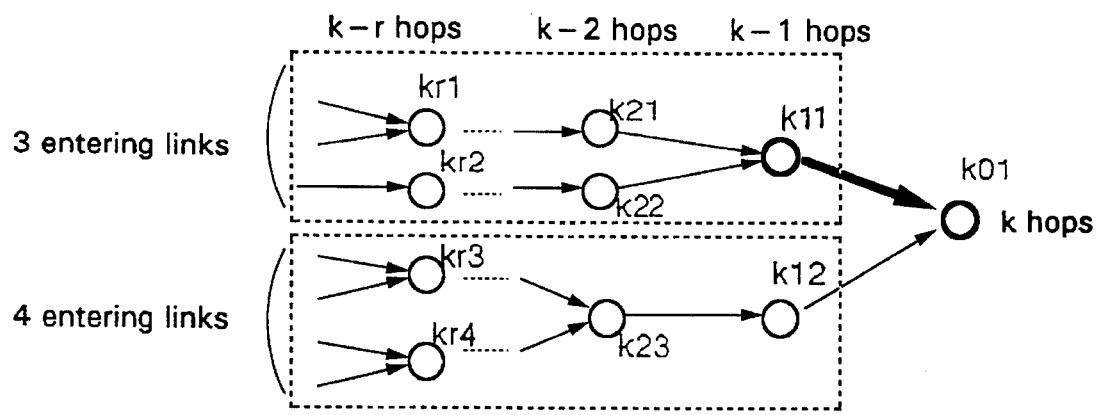
FIG. 27 serves to explain the operation of a eleventh embodiment of this invention.

This eleventh embodiment of the invention will be explained with reference to FIG. 27, which serves to explain the operation of this eleventh embodiment. In FIG. 27, the passed nodes reached in k-r hops that pertain to k11 are kr1 and kr2; while those reached in k-r hops that pertain to k12 are kr3 and kr4. It will also be seen that of the links connected to these nodes, a total of 3 pertain to node k11, while a total of 4 pertain to node k12. Therefore, node k11, the one with the smaller total number of entering links at k-r hops, is selected as the passed node reached in k−1 hops.

According to this eleventh embodiment of the invention, by presetting the number of hops to be searched backwards to r, searching backwards over r hops, and selecting as the passed node reached in k−1 hops, i.e., as the passed node immediately previous to the node reached in k hops, the node for which the total number of entering links at k-r hops is smaller, the error between the number of disjoint paths according to this invention and the actual number of disjoint paths can be reduced.

Twelfth Embodiment

Figure 28:
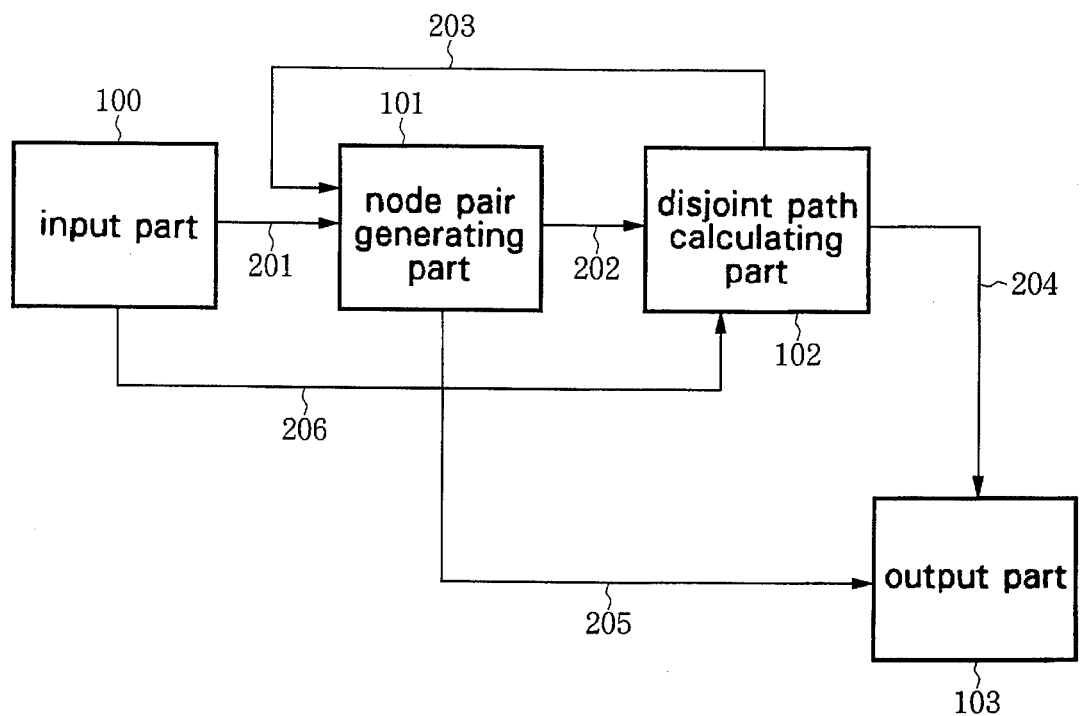
FIG. 28 is a block diagram of a routing device according to a twelfth embodiment of this invention.
Figure 29:
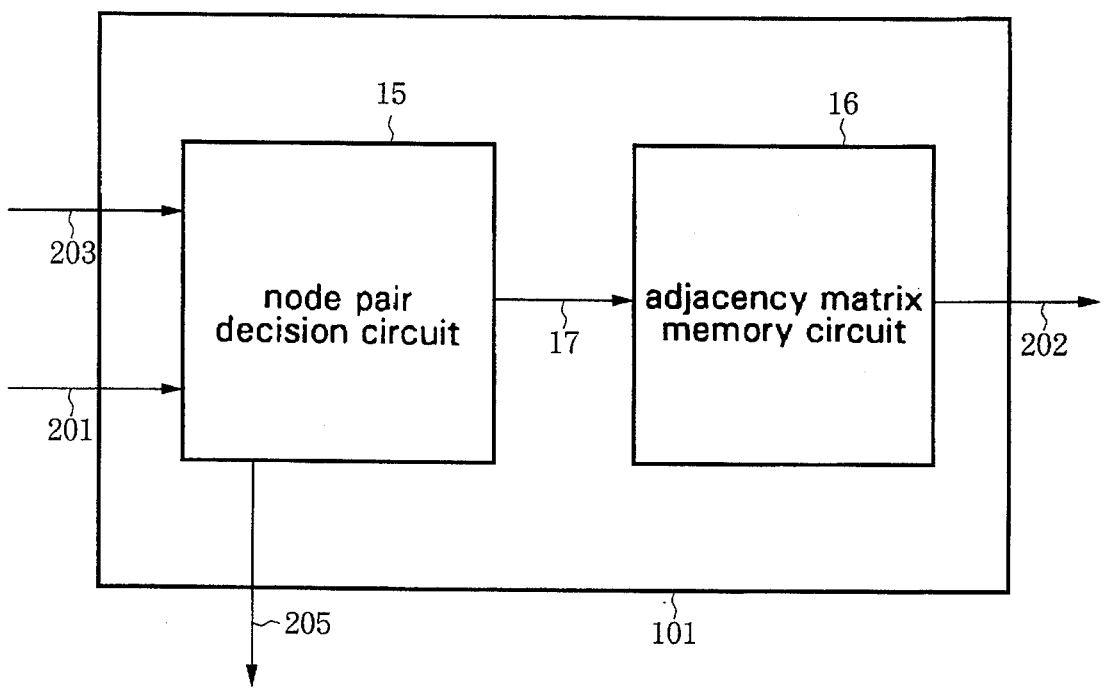
FIG. 29 is a block diagram of a node pair generating part according to a twelfth embodiment of this invention.
Figure 30:
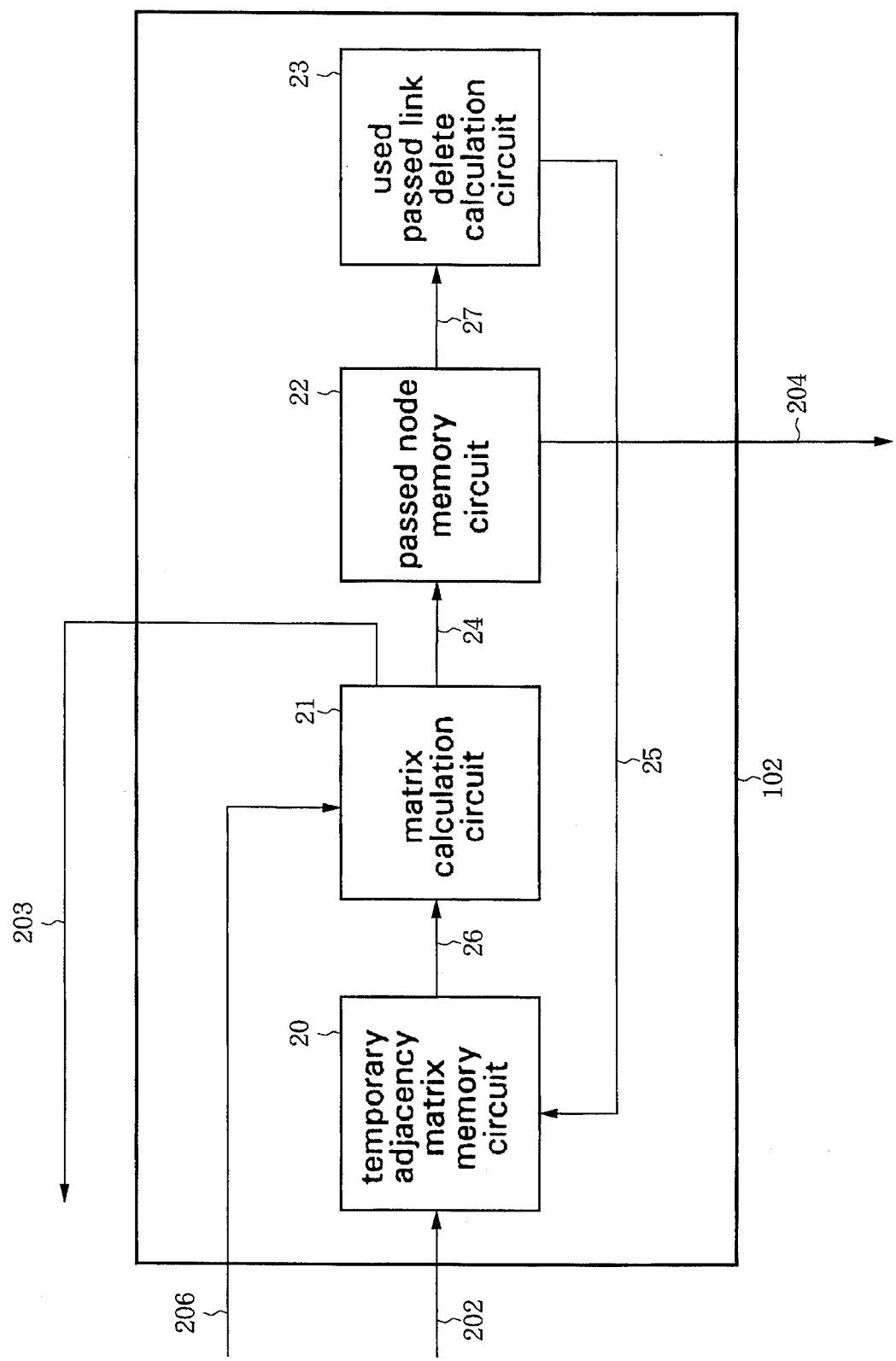
FIG. 30 is a block diagram of a disjoint path calculating part according to a twelfth embodiment of this invention.

A twelfth embodiment of this invention pertains to a device for calculating link disjoint paths. This twelfth embodiment will be explained with reference to FIGS. 28–30. FIG. 28 is a block diagram showing a routing device according to the twelfth embodiment. FIG. 29 is a block diagram showing a node pair generating part 101 according to the twelfth embodiment. FIG. 30 is a block diagram showing disjoint path calculating part 102 according to the twelfth embodiment. In the routing device (see FIG. 28), when the communication network topology and the hop limit L have been given, link disjoint paths can be obtained. This twelfth embodiment of the invention is an embodiment of a device which calculates link disjoint paths on the basis of the method given in the first embodiment of this invention.

The communication network topology (i.e., the adjacency matrix) and the hop limit L are input to input part 100. The adjacency matrix and a control signal indicating the start of the calculation are sent to node pair generating part 101 via line 201. The hop limit L is sent to disjoint path calculating part 102 via line 206.

In node pair generating part 101 (see FIG. 29), the adjacency matrix that has been sent via line 201 is stored in adjacency matrix memory circuit 16 after passing through node pair decision circuit 15 and line 17. As a result of the control signal indicating the start of the calculation, which has been sent via line 201, a certain pair of nodes is selected in node pair decision circuit 15 (e.g., nodes i and j), and information relating to this node pair is sent to disjoint path calculating part 102 by way of line 17, adjacency matrix memory circuit 16 and line 202, and at the same time the adjacency matrix that has been stored in adjacency matrix memory circuit 16 is copied and sent to disjoint path calculating part 102 via line 202.

In disjoint path calculating part 102 (see FIG. 30), the copied adjacency matrix which has been sent via line 202 is stored in temporary adjacency matrix memory circuit 20. The node pair information (nodes i and j) sent via line 202 is sent to matrix calculation circuit 21. The temporary adjacency matrix is sent from temporary adjacency matrix memory circuit 20 to matrix calculation circuit 21 via line 26. Hop limit L is sent to matrix calculation circuit 21 from line 206. Matrix calculation circuit 21 performs power calculations until element (i,j) of a power of the temporary adjacency matrix becomes equal to or greater than 1, or until the $L^{th}$ power of the temporary adjacency matrix is calculated (where L is the hop limit). If the $L^{th}$ power has been calculated and element (i,j) has still not become equal to or greater than 1, matrix calculation circuit 21 sends a control signal to node pair generating part 101 via line 203, and a new node pair is produced in node pair decision circuit 15 (see FIG. 29). However, if calculation of disjoint paths between all nodes has been completed, node pair decision circuit 15 sends a calculation finish signal to output part 103 via line 205 (see FIG. 28). If element (i,j) of the result of a power calculation up to and including the $L^{th}$ power has become equal to or greater than 1, matrix calculation circuit 21 notifies used passed link delete calculation circuit 23 via line 24, passed node memory circuit 22, and line 27. Passed node memory circuit 22 stores passed nodes information matrices that have been formed in the calculation process in matrix calculation circuit 21 and which were illustrated in the second embodiment of this invention. Used passed link delete calculation circuit 23 identifies passed links on the basis of the passed node memory circuit and, via line 25, changes elements of the temporary adjacency matrix corresponding to these passed links from "1" to "0", said matrix being stored in temporary adjacency matrix memory circuit 20. Information relating to the used path is sent from passed node memory circuit 22 to output part 103 via line 204.

If the calculation of disjoint path calculating part 102 is completed, the processing returns to node pair generating part 101 via line 203 and is repeated until the calculation of disjoint paths between all node pairs has been finished. This completes the explanation of the routing device. If link disjoint path calculation is performed using a device according to this invention, although it is an approximation calculation, the actual number of link disjoint paths is never overestimated. Accordingly, a communication network can be designed with guaranteed reliability.

Because a device according to this invention is based on matrix calculation, rapid link disjoint path calculation can be performed by using a super-computer equipped with vector processors for the matrix calculation part.

Thirteenth Embodiment

Figure 31:
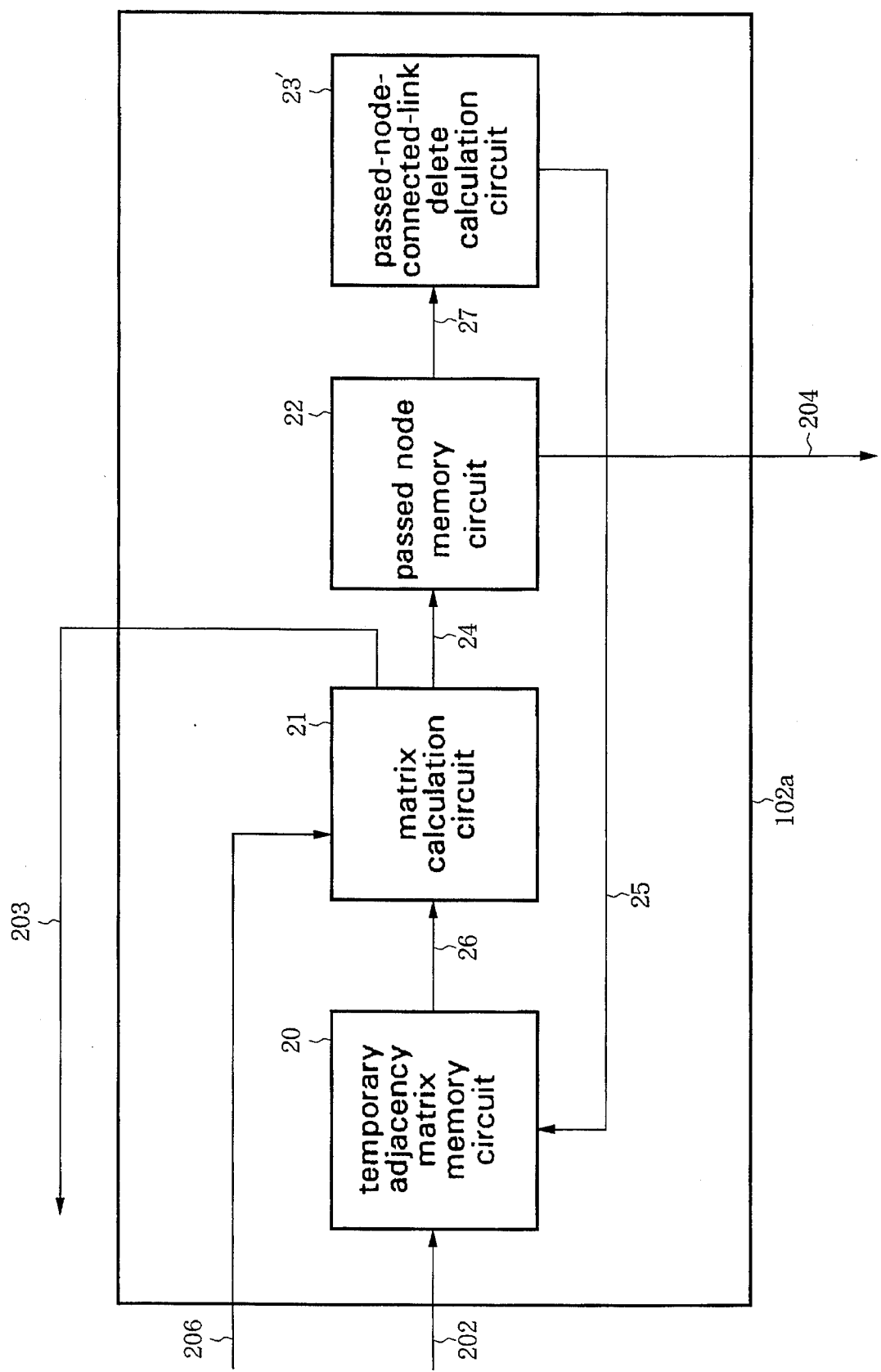
FIG. 31 is a block diagram of a disjoint path calculating part according to a thirteenth embodiment of this invention.

A thirteenth embodiment of this invention is an embodiment of a device for calculating node disjoint paths on the basis of the method given in the second embodiment. This thirteenth embodiment of the invention is implemented using FIG. 28, FIG. 29 and FIG. 31. FIG. 31 is a block diagram showing the disjoint path calculating part according to this thirteenth embodiment, which differs from the twelfth embodiment in respect of this disjoint path calculating part 102a.

The specific difference is passed-node-connected-link delete calculation circuit 23' in FIG. 31. Passed-node-connected-link delete calculation circuit 23' identifies passed nodes on the basis of passed node memory circuit 22 and, via line 25, changes elements of the temporary adjacency matrix corresponding to links connected to these passed nodes from "1" to "0", said matrix being stored in temporary adjacency matrix memory circuit 20. In other words, if a passed node is m, all elements of row m of the temporary adjacency matrix that are "1" are changed to "0", and all elements of column m that are "1" are changed to "0".

The foregoing is the distinguishing feature of this thirteenth embodiment of the invention. Other parts are the same as in the twelfth embodiment. If node disjoint path calculation is performed using a device according to this invention, although it is an approximation calculation, the actual number of node disjoint paths is never overestimated. Accordingly, a communication network can be designed with guaranteed reliability.

Because a device according to this invention is based on matrix calculation, rapid node disjoint path calculation can be performed by using a super-computer equipped with vector processors for the matrix calculation part.

Fourteenth Embodiment

Figure 32:
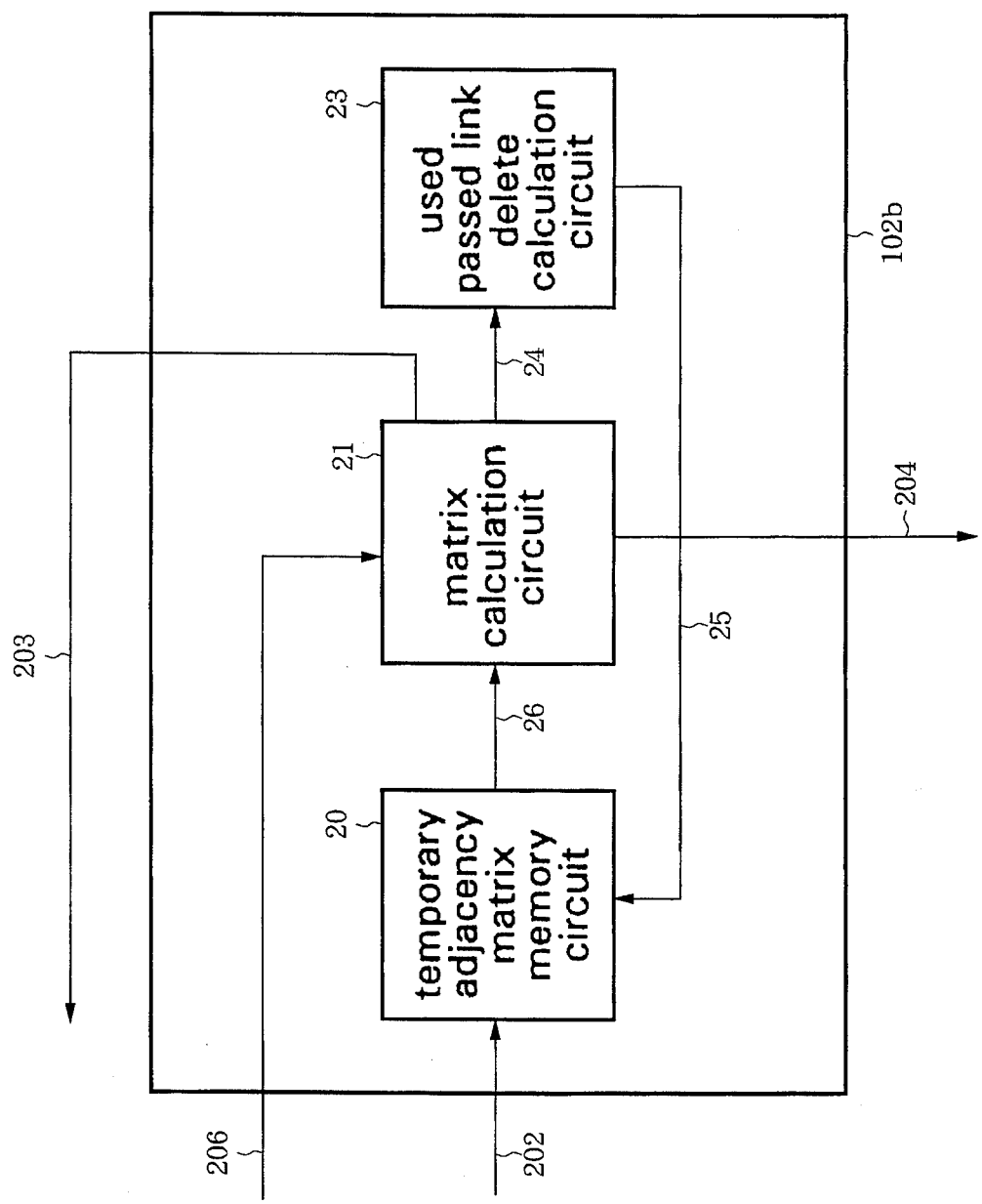
FIG. 32 is a block diagram of a disjoint path calculating part according to fourteenth embodiment of this invention.

A fourteenth embodiment of this invention is an embodiment of a device for calculating link disjoint paths on the basis of the method given in the third embodiment. This fourteenth embodiment is implemented using FIG. 28, FIG. 29 and FIG. 32. FIG. 32 is a block diagram showing disjoint path calculating part 102b according to this fourteenth embodiment, which is distinguished from the twelfth embodiment in that disjoint path calculating part 102b is different.

FIG. 32 is distinguished from FIG. 30 in that there is no passed node memory circuit 22. In this fourteenth embodiment of the invention, as was explained in the third embodiment, passed nodes are not stored in passed nodes information matrices. Instead, passed nodes are obtained by calculating the product $(A'^{k-1})$ of a power of the temporary adjacency matrix $(A'^k)$ and the inverse of the temporary adjacency matrix $(A'^{-1})$.

Accordingly, in this fourteenth embodiment of the invention, because passed nodes can be obtained by matrix calculation, it is unnecessary to store passed nodes as in the twelfth embodiment, and therefore memory circuits and other hardware can be eliminated.

Although this fourteenth embodiment of the invention applies to link disjoint paths, it can also be implemented in similar fashion for node disjoint paths by simply changing used passed link delete calculation circuit 23 shown in FIG. 32 to passed-node-connected-link delete calculation Circuit 23' shown in FIG. 31 and used in the thirteenth embodiment of this invention.

Fifteenth Embodiment

Figure 33:
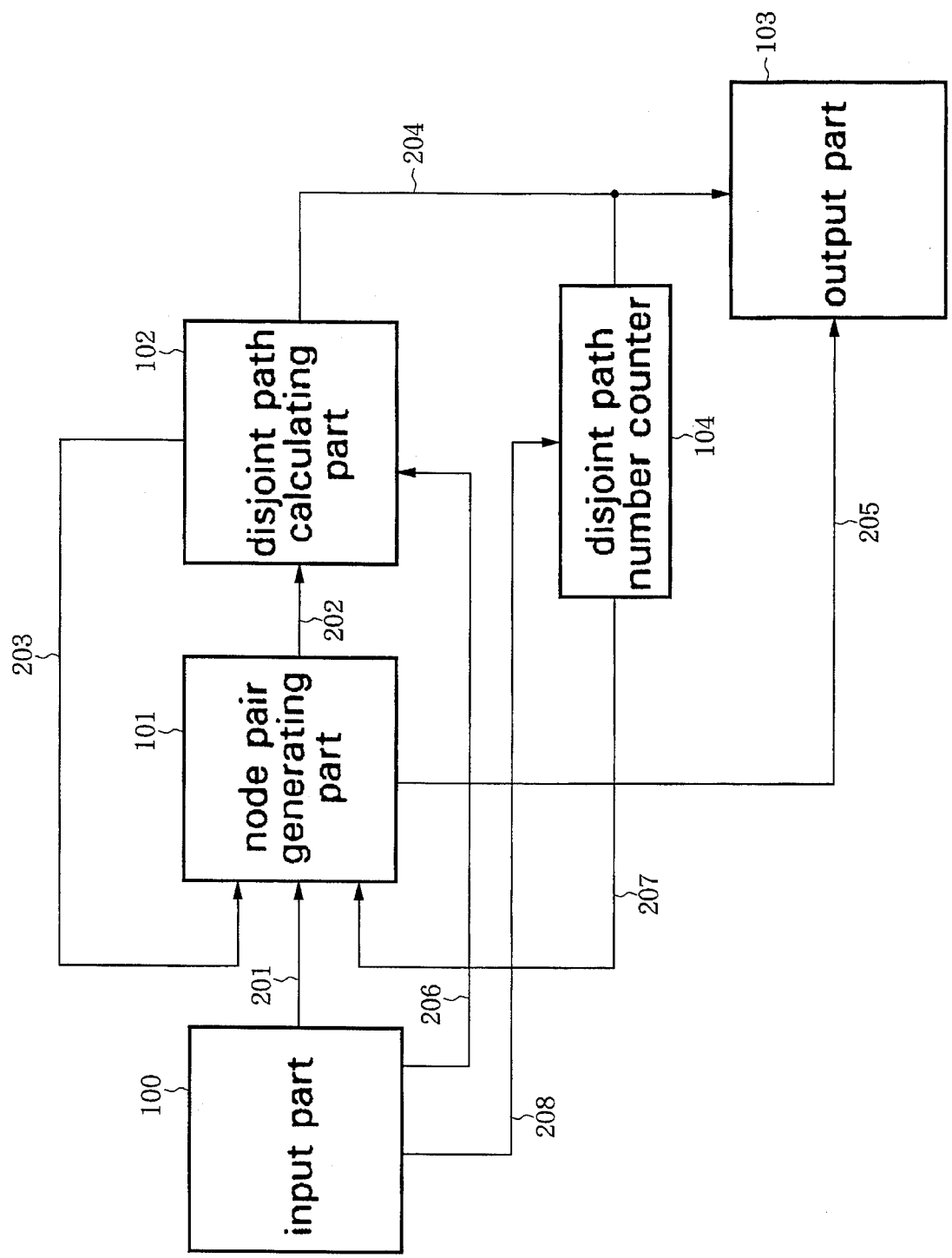
FIG. 33 is a block diagram of a routing device according to a fifteenth embodiment of this invention.

A fifteenth embodiment of this invention is an embodiment of a device for calculating link disjoint paths on the basis of the method given in the fourth embodiment of this invention. FIG. 33 is a block diagram showing a routing device according to this fifteenth embodiment of the invention, which is distinguished from the routing device according to the twelfth embodiment (see FIG. 28) in that it has a disjoint path number counter 104.

This fifteenth embodiment of the invention will be explained with reference to FIG. 33. The adjacency matrix, the hop limit L and the number of disjoint paths required between nodes are input to input part 100. The adjacency matrix and a control signal indicating the start of the calculation are sent to node pair generating part 101 via line 201. The hop limit L is sent to disjoint path calculating part 102 via line 206. The number of disjoint paths required between nodes is sent to disjoint path number counter 104 via line 208. The number of disjoint paths required between each pair of nodes is stored in disjoint path number counter 104.

The operation of node pair generating part 101 and disjoint path calculating part 102 is the same as in the first embodiment of this invention. The number of disjoint paths calculated by disjoint path calculating part 102 is sent to output part 103 and disjoint path number counter 104 via line 204. Disjoint path number counter 104 counts the calculated link disjoint paths between nodes, and if this is the same as the number of disjoint paths required between the nodes in question, it is unnecessary to search for any more link disjoint paths. Disjoint path number counter 104 therefore, sends a control signal to node pair generating part 101 via line 207, and link disjoint paths between new nodes are calculated. When the calculated number of link disjoint paths is smaller than the number of disjoint paths required between the nodes in question, the same calculation as in the first embodiment of this invention in continued in disjoint path calculating part 102.

In this fifteenth embodiment of the invention, comparison with the required number of disjoint paths in the disjoint path number counter shown in FIG. 33 means that it is unnecessary to calculate more link disjoint paths than are required, and therefore calculation time can be reduced in comparison with the first embodiment of this invention.

This fifteenth embodiment of the invention applies to link disjoint paths. However, if node disjoint paths are to be obtained, it can also be implemented in similar fashion for node disjoint paths by simply changing used passed link delete calculation circuit 23 shown in FIG. 32 to passed-node-connected-link delete calculation circuit 23 shown in FIG. 31 and used in the thirteenth-embodiment of this invention.

Sixteenth Embodiment

Figure 34:
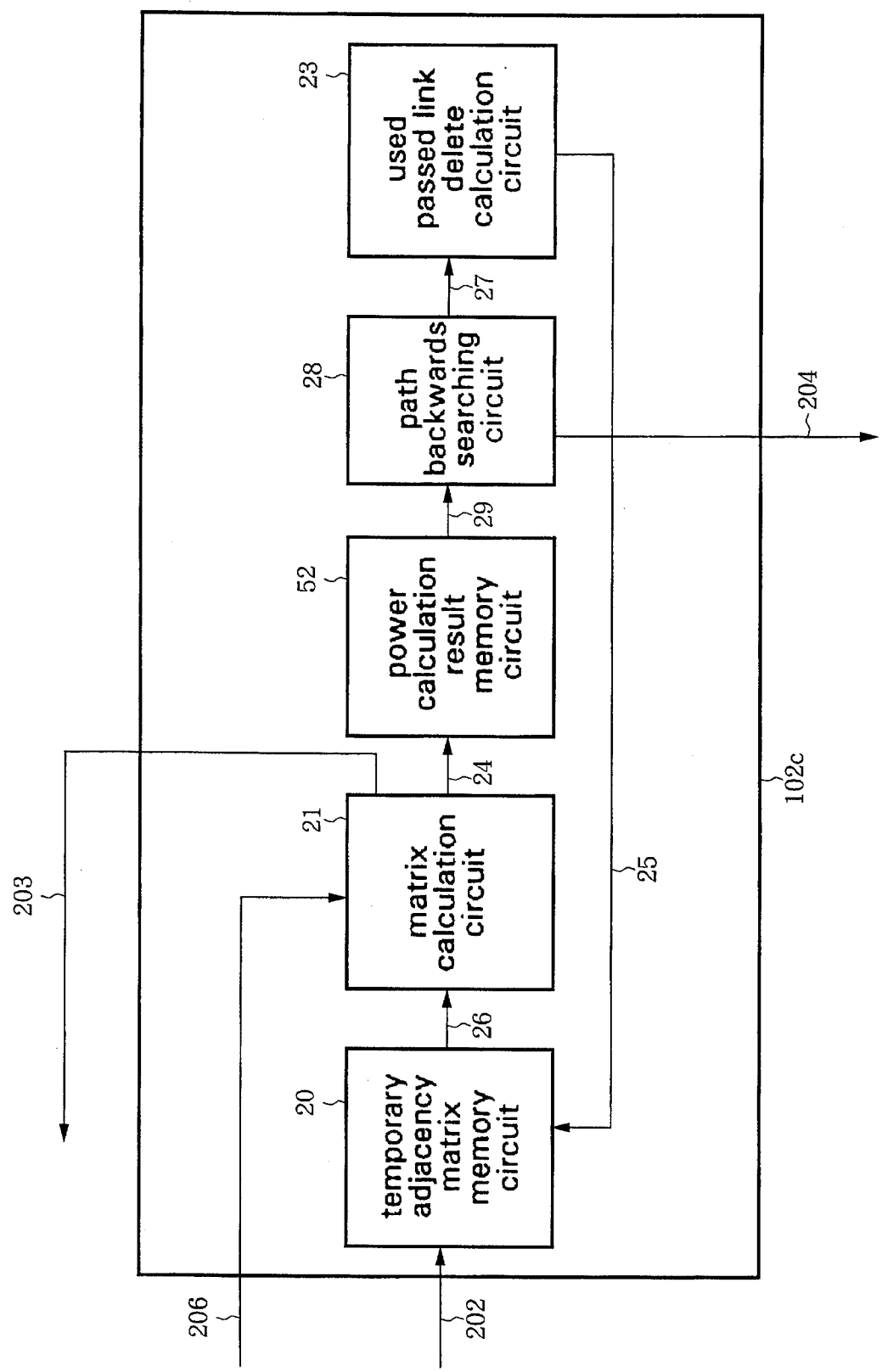
FIG. 34 is a block diagram of a disjoint path calculating part according to a sixteenth embodiment of this invention.

Next, a sixteenth embodiment of this invention will be explained with reference to FIG. 34, which is a block diagram of disjoint path calculating part 102 according to this sixteenth embodiment. Link disjoint paths can be obtained when the communication network topology and the hop limit L have been given to disjoint path calculating part 102 shown in FIG. 28. This sixteenth embodiment of the invention gives an example of disjoint path calculating part 102c which calculates link disjoint paths on the basis of the method given in the first embodiment of this invention.

The communication network topology (i.e., the adjacency matrix) and the hop limit L are input to input part 100 shown in FIG. 28. The adjacency matrix and a control signal indicating the start of the calculation are sent to node pair generating part 101 via line 201. The hop limit L is sent to disjoint path calculating part 102 via line 206.

In node pair generating part 101 shown in FIG. 29, the adjacency matrix that been sent via line 201 is stored in adjacency matrix memory circuit 16 after passing through node pair decision circuit 15 and line 17. As a result of the control signal indicating the start of the calculation, which has been sent via line 201, a certain pair of nodes is selected in node pair decision circuit 15 (e.g., nodes i and j), and information relating to this node pair is sent to disjoint path calculating part 102 by way of line 17, adjacency matrix memory circuit 16 and line 202, and at the same time the adjacency matrix that has been stored in adjacency matrix memory circuit 16 is copied and sent to disjoint path calculating part 102 via line 202.

In disjoint path calculating part 102c, the copied adjacency matrix which has been sent via line 202 is stored in temporary adjacency matrix memory circuit 20. The node pair information (nodes i and j) sent via line 202 is sent to matrix calculation circuit 21. The temporary adjacency matrix is sent from temporary adjacency matrix memory circuit 20 to matrix calculation circuit 21 via line 26. Hop limit L is sent to matrix calculation circuit 21 from line 206. Matrix calculation circuit 21 performs power calculations until element (i,j) of a power of the temporary adjacency matrix becomes equal to or greater than 1, or until the $L^{th}$ power of the temporary adjacency matrix is calculated (where L is the hop limit). This matrix calculation circuit 21 can be replaced with a device characterized in that only the row i elements of the power calculation are calculated. If the $L^{th}$ power has been calculated and element (i,j) has still not become equal to or greater than 1, matrix calculation circuit 21 sends a control signal to node pair generating part 101 via line 203, and a new node pair is produced in node pair decision circuit 15. However, if calculation of disjoint paths between all nodes has been completed, node pair decision circuit 15 sends a calculation finish signal to output part 103 via line 205. If element (i,j) of the result of a power calculation up to and including the $L^{th}$ power has become equal to or greater than 1, matrix calculation circuit 21 notifies path backwards-searching circuit 28 via line 24, power calculation result memory circuit 52 and line 29. Path backwards-searching circuit 28 determines paths from the origin node to the destination node in a backwards direction. Power calculation result memory circuit 52 stores the results of power calculations formed during the calculation process in matrix calculation circuit 21. Used passed link delete calculation circuit 23 identifies passed links on the basis of the path determined by path backwards-searching circuit 28 and, via line 25, changes elements of the temporary adjacency matrix corresponding to these passed links from "1" to "0", said matrix being stored in temporary adjacency matrix memory circuit 20. Information relating to the used path is sent from path backwards-searching circuit 28 to output part 103 via line 204.

If the calculation of disjoint path calculating part 102 is completed, the processing returns to node pair generating part 101 via line 203 and this procedure is repeated until the calculation of disjoint paths between all node pairs has been completed.

If link disjoint path calculation is performed using a device according to this invention, although it is an approximation calculation, the actual number of link disjoint paths is never overestimated. Accordingly, a communication network can be designed with guaranteed reliability.

Because a circuit according to this invention is based on matrix calculation, rapid link disjoint path calculation can be performed by using a super-computer equipped with vector processors for the matrix calculation part.

Seventeenth Embodiment

Figure 35:
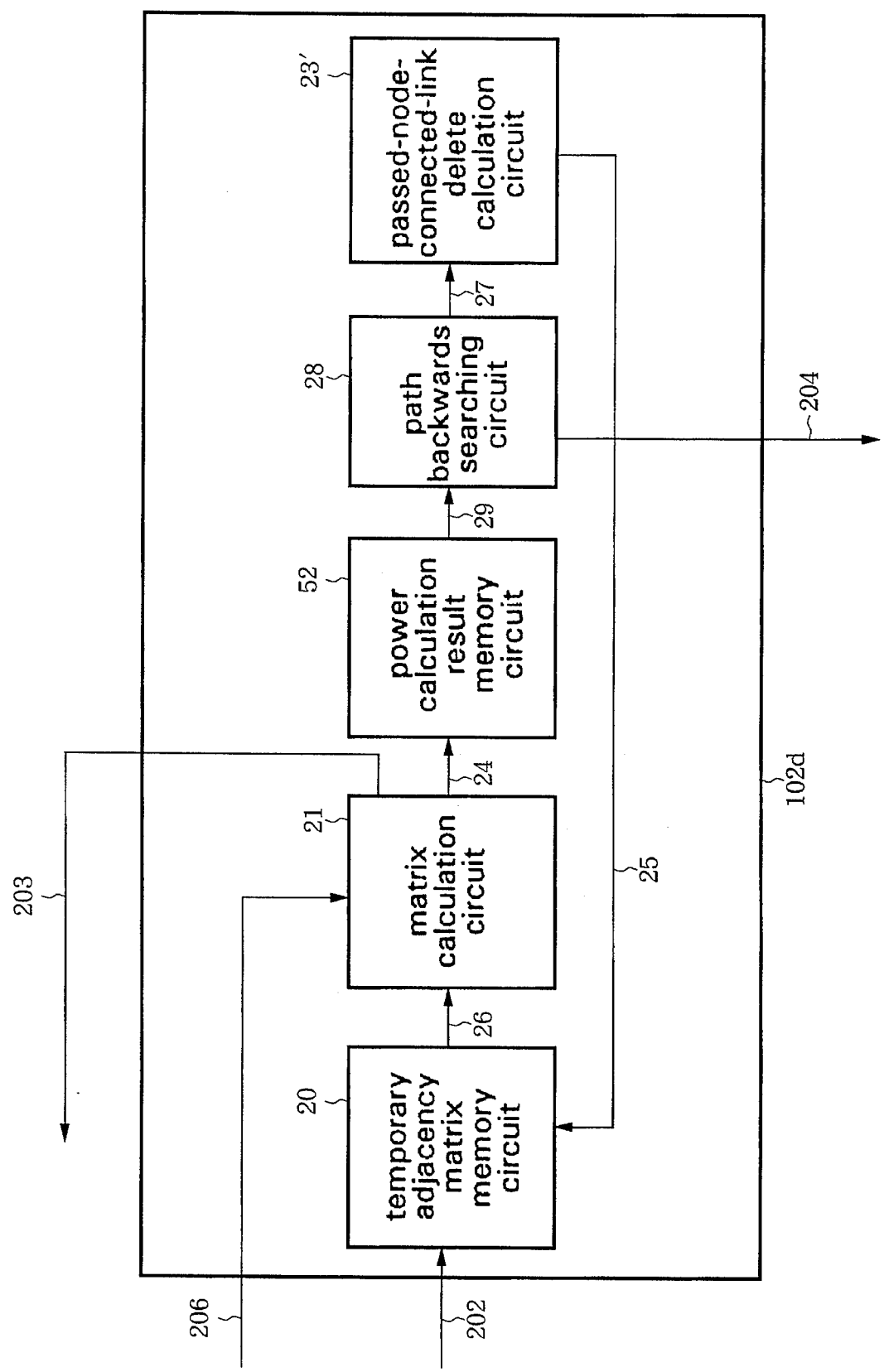
FIG. 35 is a block diagram of a disjoint path calculating part according to a seventeenth embodiment of this invention.

Next, a seventeenth embodiment of this invention will be explained with reference to FIG. 35, which is a block diagram of disjoint path calculating part 102d according to this seventeenth embodiment. Link disjoint paths can be obtained when the communication network topology and the hop limit L have been given to disjoint path calculating part 102 shown in FIG. 28. This seventeenth embodiment of the invention gives an example of disjoint path calculating part 102d which calculates node disjoint paths on the basis of the method given in the second embodiment of this invention. Passed-node-connected-link delete calculation circuit 23' identifies passed nodes on the basis of a passed node memory circuit which, though not illustrated, is contained in this passed-node-connected-link delete calculation circuit 23'. Then, via line 25, it changes elements of the temporary adjacency matrix corresponding to links connected to these passed nodes from "1" to "0", said matrix being stored in temporary adjacency matrix memory circuit 20. In other words, if a passed node is m, all elements of row m of the temporary adjacency matrix that are "1" are changed to "0", and all elements of column m that are "1" are changed to "0".

The foregoing is the distinguishing feature of this seventeenth embodiment of the invention. Other parts are the same as in the sixteenth embodiment. If node disjoint path calculation is performed using a device according to this invention, although it is an approximation calculation, the actual number of node disjoint paths is never overestimated. Accordingly, a communication network can be designed with guaranteed reliability.

Because a device according to this invention is based on matrix calculation, rapid node disjoint path calculation can be performed by using a super-computer equipped with vector processors for the matrix calculation part.

Eighteenth Embodiment

Next, an eighteenth embodiment of this invention will be explained with reference to FIG. 36, which is a block diagram of path backwards-searching circuit 28 according to this eighteenth embodiment. If element (i,j) of the result of a power calculation up to and including the $L^{th}$ power has become equal to or greater than 1, matrix calculation circuit 21 of FIG. 34 notifies path backwards-searching circuit 28 via line 24, power calculation result memory circuit 52 and line 29. The result of the power calculation is sent from power calculation result memory circuit 52 via line 29. Path backwards-searching circuit 28 determines paths from the origin node to the destination node in a backwards direction.

Figure 36:
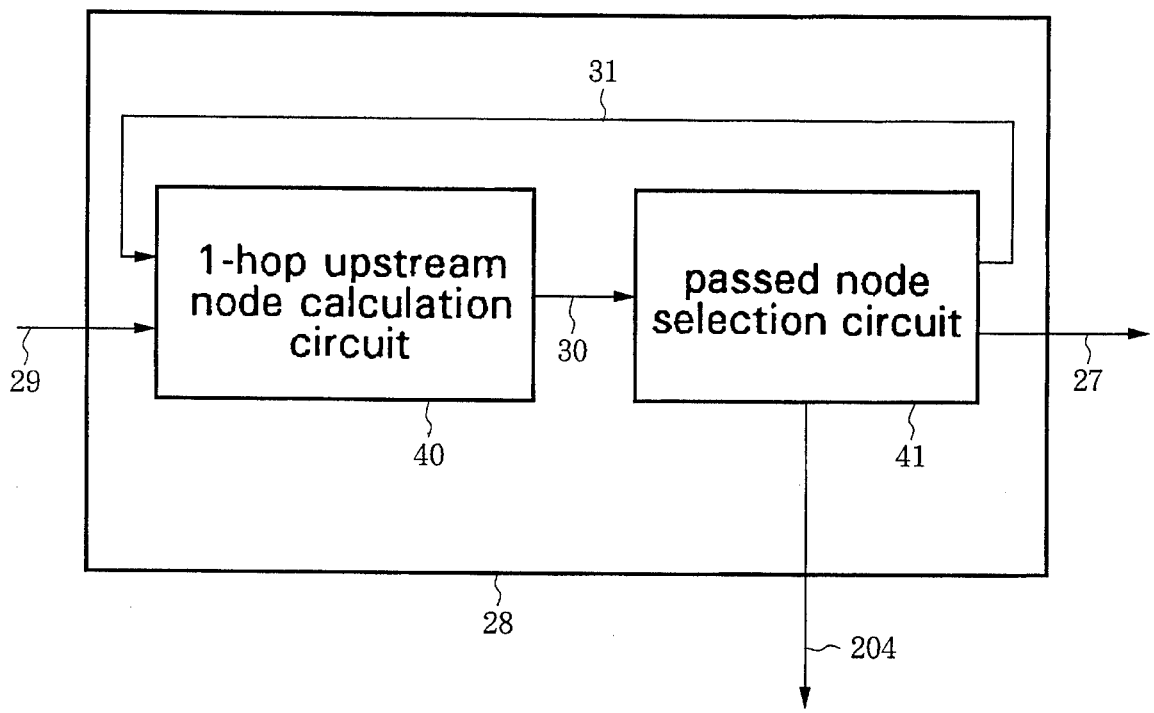
FIG. 36 is a block diagram of a backwards path searching circuit according to an eighteenth embodiment of this invention.

In FIG. 36, candidates for a passed node one hop previous to the destination node are first of all obtained by means of 1-hop upstream node calculation circuit 40. The method for obtaining passed nodes one hop back is shown in FIG. 2 in connection with the first embodiment of this invention. Passed node selection circuit 41 selects one passed node from the passed node candidates that have been obtained, and if this passed node is not the origin node, the processing returns to 1-hop upstream node calculation circuit 40 by way of line 31, whereupon passed nodes one hop previous to the obtained passed node are obtained. The same operations are repeated until the origin node is selected by passed node selection circuit 41. If the origin node is selected, information relating to the passed nodes in question is sent via line 27 to used passed link delete calculation circuit 23 of FIG. 34 or to passed-node-connected-link delete calculation circuit 23' of FIG. 35. In addition, passed node selection circuit 41 sends path information to output part 103 via line 204.

If link disjoint path calculation or node disjoint path calculation is carried out using a device according to this eighteenth embodiment of the invention, paths between origin and destination nodes can be searched reliably, and therefore the actual number of disjoint paths is never overestimated, with the result that communication networks can be designed with guaranteed reliability.

Nineteenth Embodiment

Next, a nineteenth embodiment of this invention will be explained with reference to FIG. 37, which is a block diagram of a device according to this nineteenth embodiment. Path backwards-searching circuit 28a can be used in the sixteenth embodiment of this invention (see FIG. 34) and in the seventeenth embodiment of this invention (see FIG. 35). The path back-wards-searching circuit of FIG. 37 is a device which implements the method described in the twelfth embodiment of this invention.

Figure 37:
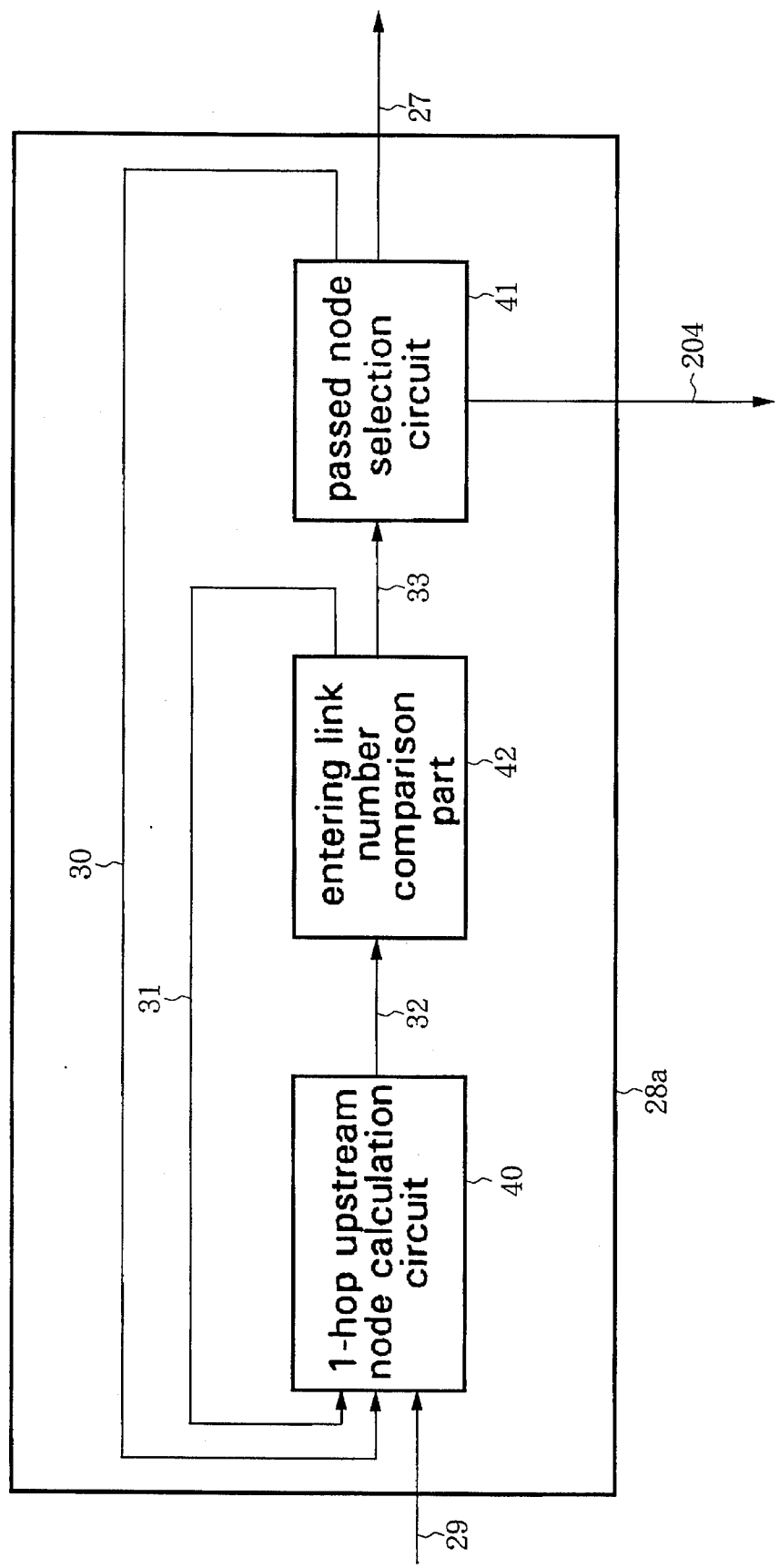
FIG. 37 is a block diagram of a device according to a nineteenth embodiment of this invention.

In FIG. 37, the operation up to 1-hop upstream node calculation circuit 40 by way of line 29 is the same as in the eighteenth embodiment of this invention. Candidates for a passed node one hop previous to the destination node are first of all obtained by means of 1-hop upstream node calculation circuit 40. The method for obtaining passed nodes one hop back is shown in FIG. 2 in connection with the first embodiment of this invention. The passed node candidates obtained are sent to entering link number comparison part 42 via line 32. Entering link number comparison part 42 compares the number of entering links connected to the passed node candidates that have been obtained. If there is one passed node that has the smallest number of entering links, this passed node with the smallest number of entering links is selected by passed node selection circuit 41 via line 33. If it is found in entering link number comparison part 42 that there are a plurality of passed nodes with the smallest number of entering links, the passed nodes that are one hop further back again are obtained via line 31 in respect of the plurality of passed nodes with the smallest number of entering links. The number of entering links of the passed nodes in question are then compared by entering link number comparison part 42, and this operation is performed until a single passed node that has the smallest number of entering links is obtained, or until the origin node is reached. Passed node selection circuit 41, which receives the results of these operations via line 33, selects the passed node with the smallest number of entering links, whereupon a path from the destination node to the passed node in question is selected. If the passed node in question is not the origin node, it is sent to 1-hop upstream node calculation circuit 40 via line 30 and the same operations are performed until the origin node is selected by passed node selection circuit 41. If the origin node is selected, information relating to the passed nodes in question is sent via line 27 to used passed link delete calculation circuit 23 shown in FIG. 34 or to passed-node-connected-link delete calculation circuit 23' shown in FIG. 35. Passed node selection circuit 41 also sends path information to output part 103 via line 204.

If link disjoint path calculation or node disjoint path calculation is performed by means of a device according to this nineteenth embodiment of the invention, paths between origin and destination nodes can be searched reliably, and therefore the actual number of disjoint paths is never overestimated, with the result that communication networks can be designed with guaranteed reliability. Furthermore, because passed nodes are selected by comparing number of entering links, the error involved in the calculation of the number of disjoint paths can be reduced.

Twentieth Embodiment

Figure 38:
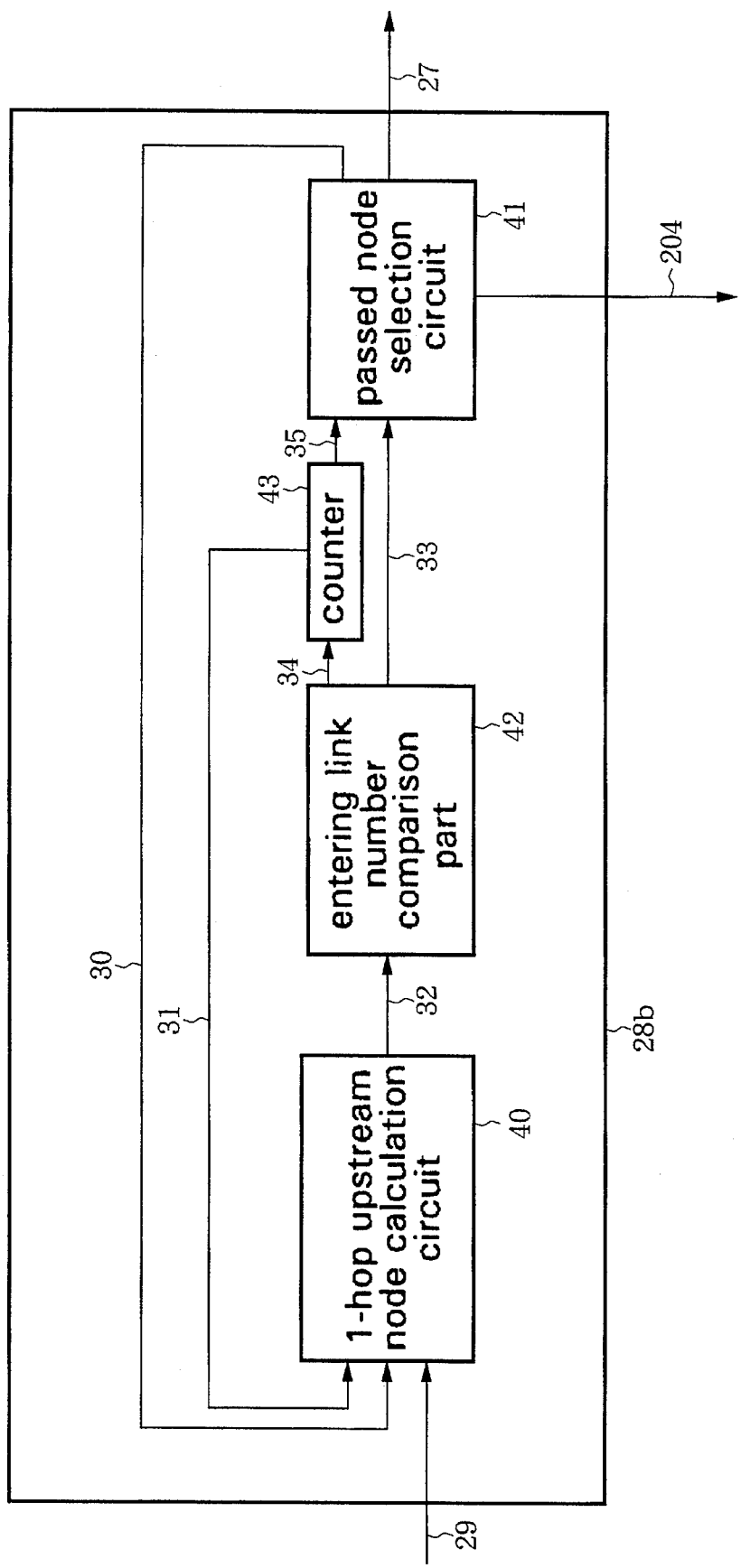
FIG. 38 is a block diagram of a device according to a twentieth embodiment of this invention.

Next, a twentieth embodiment of this invention will be explained with reference to FIG. 38, which is a block diagram of a device according to this twentieth embodiment. Path backwards-searching circuit 28b can be used in the sixteenth embodiment of this invention and in the seventeenth embodiment of this invention. The path backwards-searching circuit according to this twentieth embodiment is a device which implements the method described in the thirteenth embodiment of this invention. This twentieth embodiment of the invention differs from the nineteenth embodiment in that it has counter 43. When there are a plurality of passed nodes with the smallest number of entering links in entering link number comparison part 42, the search back to previous nodes is repeated until there is a single passed node with the smallest number of entering links or until the origin node is reached. A limit m is preset for the number of hops to be searched backwards. When there are a plurality of passed nodes with the smallest number of entering links, counter 43 is incremented by 1 via line 34. Note that counter 43 is reset beforehand to "0" when there is an input from line 29 to 1-hop upstream node calculation circuit 40, or when a signal from line 30 is input to 1-hop upstream node calculation circuit 40. When counter 43 has counted up to m, information relating to a plurality of candidate passed nodes is sent to passed node selection circuit 41, one suitable passed node is selected by passed node selection circuit 41, and a path from the destination node to the relevant passed node is selected. If there is one passed node with the smallest number of entering links in entering link number comparison part 42, even though counter 43 has not yet counted up to m, this passed node is sent via line 33 to passed node selection circuit 41. The passed node that is nearest to the destination node and that has been selected by passed node selection circuit 41 is taken as the passed node and is transferred via line 30 to 1-hop upstream node calculation circuit 40. Subsequent operations are the same as in the nineteenth embodiment of this invention.

When there are a plurality of candidates for a passed node, presetting a limit m for the number of hops to be searched backwards, as in this twentieth embodiment of the invention, can reduce the time required for searching backwards for passed nodes.

Twenty-first Embodiment

Figure 39:
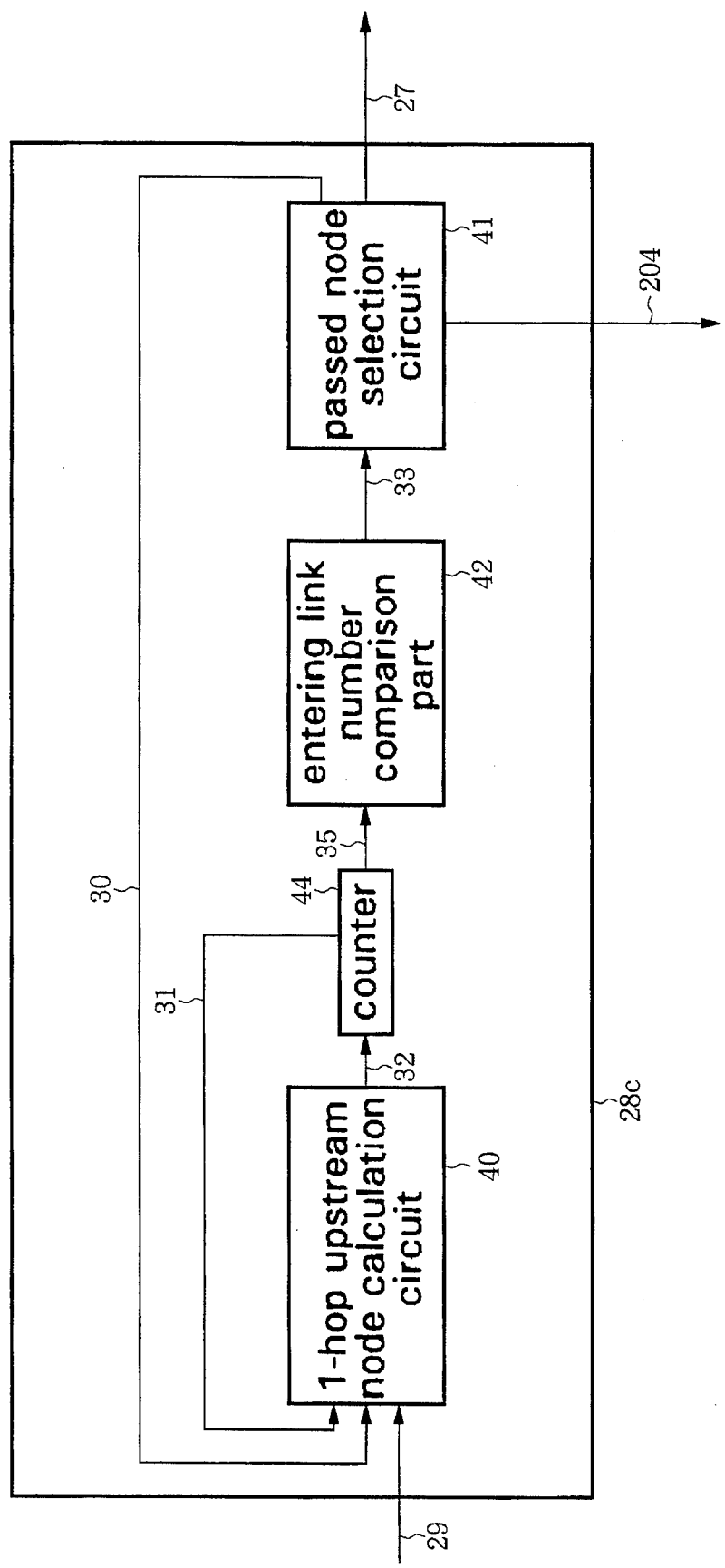
FIG. 39 is a block diagram of a device according to a twenty-first embodiment of this invention.

Next, a twenty-first embodiment of this invention will be explained with reference to FIG. 39, which is a block diagram of a device according to this twenty-first embodiment. Path backwards-searching circuit 28c according to this twenty-first embodiment of the invention is a device for implementing the method described in the fourteenth embodiment. This twenty-first embodiment differs from the nineteenth embodiment in that it has counter 44. In this twenty-first embodiment of the invention, the number of hops that are searched backwards is preset to r hops. After the operation of 1-hop upstream node calculation circuit 40, counter 44 is incremented by 1 via line 32. Note that counter 44 is reset beforehand to "0" when there is an input from line 29 to 1-hop upstream node calculation circuit 40, or when a signal from line 30 is input to 1-hop upstream node calculation circuit 40. The loop comprising 1-hop upstream node calculation circuit 40, line 32, counter 44 and line 31 is repeated until the set value r is reached. When counter 44 has been incremented to r, information is transferred via line 35 to entering link number comparison part 42. As was explained in the eleventh embodiment of this invention with reference to FIG. 27, link entering number comparison part 42 compares the total number of entering links for all the passed node candidates at k-r hops belonging to the passed nodes reached in k-1 hops, i.e., the nodes immediately previous to the node reached in k hops. Passed node selection circuit 41 selects the passed node reached in k-1 hops that has the smallest total number of these entering links. If there are a plurality of applicable nodes, it selects a suitable k-1 hop passed node. The passed node reached in k-1 hops that has been selected by passed node selection circuit 41 is made the new passed node, and is transferred to 1-hop upstream node calculation circuit 40 via line 30. Subsequent processing is the same as in the nineteenth embodiment of this invention. In this twenty-first embodiment of the invention, when there are a plurality of candidates for a passed node, by presetting the number of hops to be searched backwards to r, the error between the number of disjoint paths according to this invention and the actual number of disjoint paths can be reduced.

Figure 40:
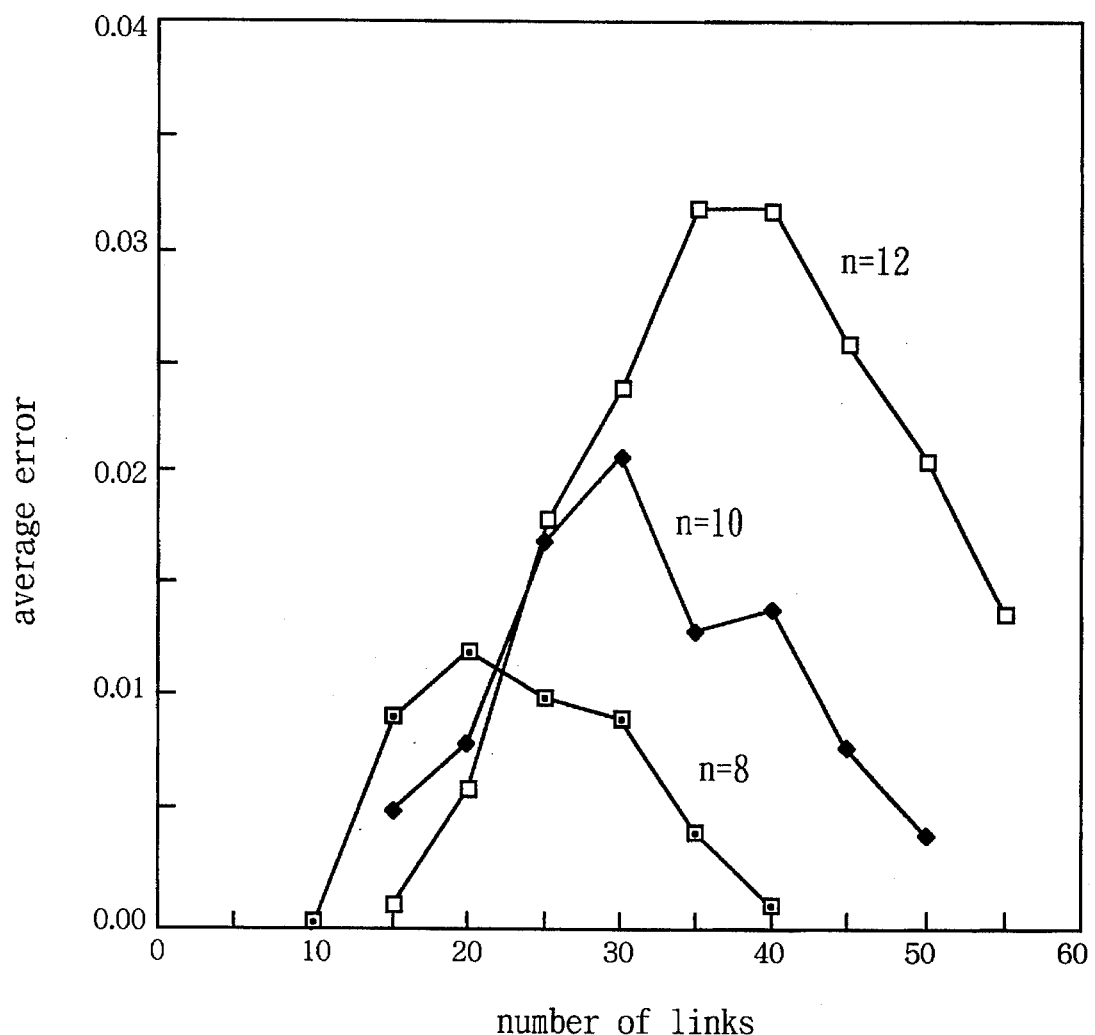
FIG. 40 is a diagram showing errors in the method for calculating the number of link disjoint paths according to this invention.

Although the method according to this invention is an approximation calculation, the actual number of link disjoint paths or node disjoint paths is never overestimated. Accordingly, a communication network can be designed with guaranteed reliability. FIG. 40 shows errors due to the link disjoint path number calculation method according to this invention, with number of links plotted along the horizontal axis and average error plotted along the vertical axis. The actual number of link disjoint paths and the number of disjoint paths according to this invention were calculated for 40 randomly given adjacency matrices with a fixed number of nodes and links, and the average of all the errors in the calculated number of disjoint paths was taken as the average error. The error was invariably positive and the maximum average error did not exceed 3.3%. The error is the difference of the actual number of disjoint paths and the number of disjoint paths calculated by the present invention divided by the actual number of disjoint paths.

Figure 41:
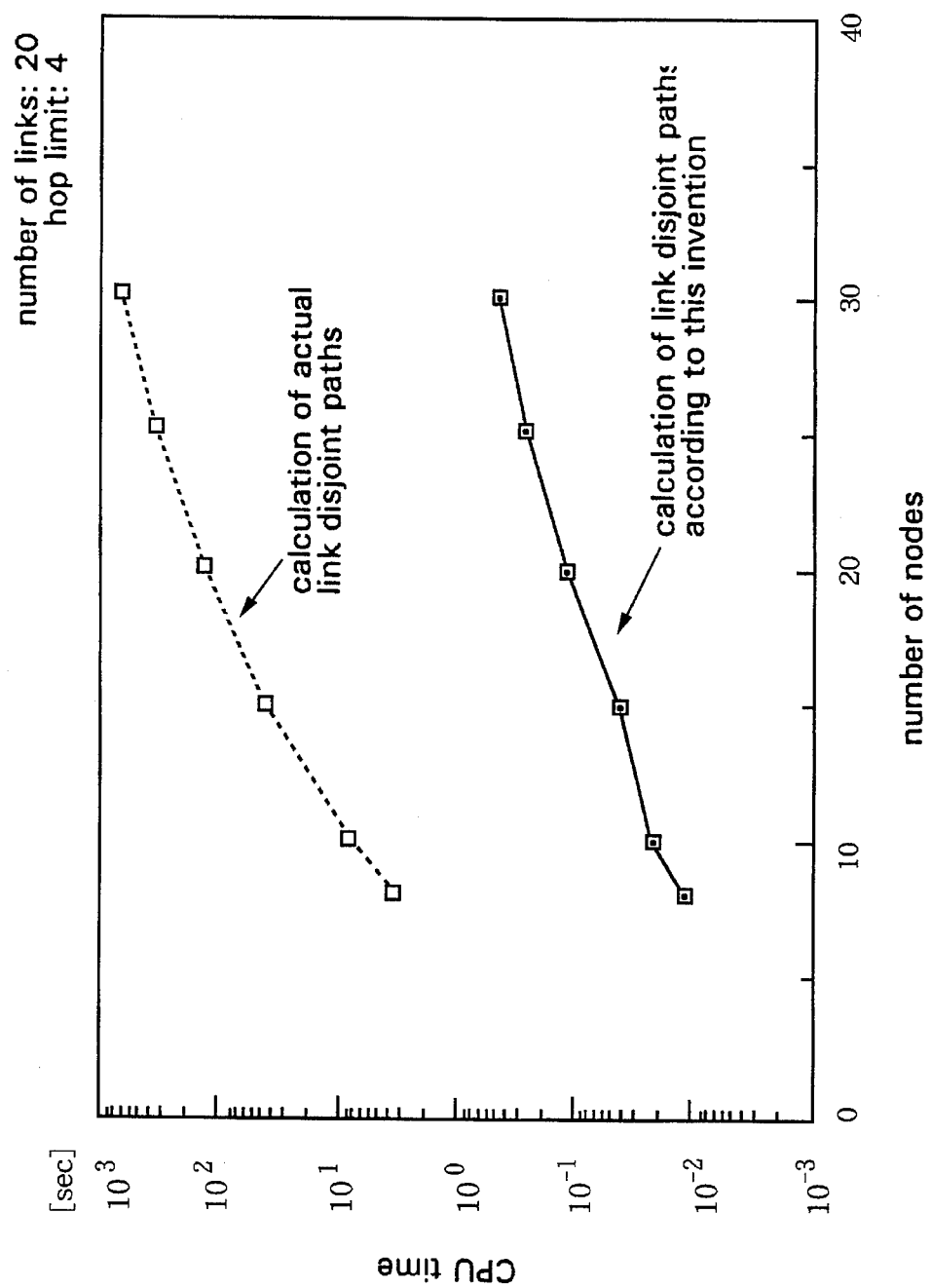
FIG. 41 is a graph that compares the time required for link disjoint path calculation.

Because the method according to this invention is based on matrix calculation, rapid calculation will be possible by using a super-computer equipped with vector processors. FIG. 41 gives a comparison of times required for link disjoint path calculation, with the number of nodes plotted along the horizontal axis and CPU time plotted along the vertical axis. A Sun SS10 was used for the calculation. FIG. 41 shows that when there are for example 30 nodes, the time required for link disjoint path calculation according to this invention was reduced to approximately one thousandth of that required to calculate the actual link disjoint paths.

While the present invention has been described in conjunction with what is presently considered to be the most practical and preferred embodiments, it is to be understood that the invention is not limited to the disclosed embodiments, but on the contrary, is intended to cover various modifications and equivalent arrangements included within the scope of the appended claims.

What is claimed is:

1. A routing method for determining communication paths between nodes in a communication network having a plural number of nodes connected by links, wherein a number from 1 to N is assigned to each node in said communication network, and wherein an upper hop limit is set for a number of links that are to be passed by transmitted data, said routing method comprising the steps of:

establishing an N×N adjacency matrix, wherein for each element in said adjacency matrix there exists a row number i and a column number j, each of which corresponds to one of said nodes in said communication network, wherein each element in said adjacency matrix is set to a first value if one of said links connects said node corresponding to said row number i and said node corresponding to said column number j associated with that element;

copying said adjacency matrix to a temporary adjacency matrix;

determining, based on said temporary adjacency matrix, whether there is at least one path between desired nodes in said communication network in which a number of nodes in said path does not exceed said upper hop limit;

calculating higher powers of said temporary adjacency matrices if said at least one path does not exist, so long as a number of higher powers of said temporary adjacency matrices does not exceed said upper hop limit, and determining whether there is at least one path between said desired nodes in said communication network in which said number of nodes in said path does not exceed said upper hop limit based said higher powers of said temporary adjacency matrix;

selecting elements in said temporary adjacency matrix corresponding to links in said communication network that are included in said at least one path, if is it established that said at least one path exists;

deleting said selected elements from said temporary adjacency matrix by altering a value of said selected elements from said first value; and repeating said determining, establishing, selecting and deleting steps using a matrix resulting from a preceding deleting step as a new temporary adjacency matrix until there are no paths between said desired nodes in which a number of nodes traversed by said path is within said upper limit.

2. A routing method as set forth in claim 1, wherein matrices associated with said higher powers of said temporary adjacency matrix serve as passed nodes information matrices, and if said at least one path between said desired nodes is determined to exist, said routing method further comprises a step of determining a route for said at least one path between said desired nodes based on said matrices associated with said higher powers of said temporary adjacency matrix.

3. A routing method as set forth in claim 1, wherein if said at least one path between said desired nodes is determined to exist, said routing method further comprises the step of determining a route for said at least path between said desired nodes by:

obtaining an immediately previous passed node in said route from a product of a higher power of said temporary adjacency matrix and an inverse of said temporary adjacency matrix;

using said product as a new higher power of said temporary adjacency matrix and repeating said obtaining step to obtain additional nodes in said route.

4. A routing method as set forth in claim 1, wherein said value of said selected elements of said temporary adjacency matrix that correspond to said links in said connection network are deleted by changing said value of said selected elements from said first value to a second value.

5. A routing method as set forth in claim 4, wherein said deleting step includes deleting one link in said connection network which forms a part of said at least one path between desired nodes, if it is determined that said at least one path between desired nodes exists.

6. A routing method as set forth in claim 4, wherein said deleting step includes deleting all links in said connection network corresponding to said at least one path between desired, if it is determined that said at least one path between desired nodes exists.

7. A routing method as set forth in claim 1, further comprising the steps of:

setting a predetermined number for said at least one path between desired nodes in said communication network; and terminating said repeating step if said number of paths between desired nodes reaches said predetermined number.

8. A routing method as set forth in claim 1, further comprising the steps of:

storing a process for establishing said higher powers of said temporary adjacency matrix, and if said at least one path between desired nodes is determined to exist in said establishing step based on said higher powers of said temporary adjacency matrix, a route of said at least one path between desired nodes is determined by obtaining an immediately previous passed node using an immediately previous higher power calculation result and said temporary adjacency matrix; again obtaining an immediately previous passed node using said immediately previous higher power calculation result for this passed node and said temporary adjacency matrix; and repeating said obtaining procedures until all passed nodes in said route have been determined.

9. A routing method as set forth in claim 1, wherein said step of establishing higher powers of said temporary adjacency matrices whereby paths between node i and node j are calculated, is performed for elements of row i only.

10. A routing method as set forth in claim 8, further comprising a step of storing only a process for establishing said higher powers for row i elements.

11. A routing method as set forth in claim 8, wherein, if there are two or more nodes suitable for selection as said immediately previous passed node, a node having a fewest entering links connected thereto is selected.

12. A routing method as set forth in claim 11, wherein, if there are two or more nodes suitable for selection as said immediately previous passed node and a number of entering links connected to these nodes is equal, any node from among said suitable nodes is selected.

13. A routing method as set forth in claim 11 or 12, wherein said routes of said paths between said desired nodes are determined for each predetermined hop limit.

14. A routing method as set forth in claim 8, wherein, if there are two or more paths reaching from an origin node to a destination node, a path with a smallest total number of entering links for its passed nodes is selected.

15. A routing method as set forth in claim 14, wherein said routes of said paths are selected for each predetermined hop limit.

16. A routing device for determining paths between nodes in a communication network having a plural number of nodes connected by links, and wherein an upper hop limit is set for the number of links that are to be passed by transmitted data; said routing device comprising:

means for establishing an adjacency matrix, wherein for each element in said adjacency matrix there exists a row number i and a column number j, each of which corresponds to a node in said communication network, wherein an element in said matrix is set to a first value if there is a link connecting said node corresponding to said row number i and said node corresponding to said column number j associated with that element;

means for copying said adjacency matrix to a temporary adjacency matrix;

means for determining, based on said temporary adjacency matrix, whether there is at least one path between desired nodes in said communication network in which a number of nodes traversed by said path does not exceed said upper hop limit;

means for calculating higher powers of said temporary adjacency matrices if said at least one path does not exist, so long as a number of said higher powers of said temporary adjacency matrices does not exceed said upper hop limit, and determining whether there is at least one path between said desired nodes in said communication network in which said number of nodes in said path does not exceed said upper hop limit based on information in said higher powers of said temporary adjacency matrix;

means for selecting elements in said temporary adjacency matrix corresponding to links in said communication network that are included in said at least one path, if is it established that said at least one path exists;

means for deleting said selected elements from said temporary adjacency matrix by altering a value of said selected elements from said first value; and means for repeating operations performed by said determining, establishing, selecting and deleting means, wherein a matrix resulting from a preceding operation of said deleting means is used as a new temporary adjacency matrix until there are no paths between said desired nodes in which a number of nodes traversed by said path is within said upper hop limit.

17. A routing device as set forth in claim 16, further comprising:

means for storing passed node information in accordance with matrices corresponding to each higher power of said temporary adjacency matrix; and means for determining a route of said path between said desired nodes in accordance with information in said storing means, if an existence of said path between desired nodes has been established.

18. A routing device as set forth in claim 16, further comprising means for determining said route of said at least one path, if an existence of said at least one path between desired nodes has been established, by obtaining an immediately previous passed node from a product of a current higher power calculation result and an inverse of said temporary adjacency matrix; using said product as a new higher power calculation result and again obtaining an immediately previous passed node from said product of said new higher power calculation result and said inverse of said temporary adjacency matrix; and repeating this procedure until all passed nodes in said route have been determined.

19. A routing device as set forth-in claim 16, wherein said means for inputting an adjacency matrix also changes said value of elements of said temporary adjacency matrix that correspond to said selected links that are to be deleted to a second value.

20. A routing device as set forth in claim 19, wherein said selected links are links which form part of said path between desired nodes, an existence of which has been determined by said means for deciding.

21. A routing device as set forth in claim 19, wherein said selected links include all links connected to nodes contained within said path between desired nodes, an existence of which has been determined by said means for deciding.

22. A routing device as set forth in claim 16, wherein said repeating means includes:

means for setting a required number of said paths to a predetermined number; and means for stopping operation of said repeating means in accordance with said required number of paths set by this setting means.

23. A routing device as set forth in claim 16, further comprising:

means for storing a process for establishing said higher powers; and means for, if the existence of said at least one path between desired nodes has been established, determining a route of said at least one path by: obtaining an immediately previous passed node using an immediately previous higher power calculation result and said temporary adjacency matrix; again obtaining an immediately previous passed node using said immediately previous higher power calculation result for this passed node and said temporary adjacency matrix; and repeating said obtaining procedures until all passed nodes in said route have been determined.

24. A routing device as set forth in claim 16, wherein said higher power calculation, whereby paths between node i and node j are calculated, is performed for row i elements only.

25. A routing device as set forth in claim 23, further comprising means for storing a process for said higher power calculation for row i elements only.

26. A routing device as set forth in claim 23, further comprising means for selecting a node with a fewest entering links connected thereto, if there are two or more nodes suitable for selection as said immediately previous passed node.

27. A routing device as set forth in claim 26, further comprising means for, if there are two or more suitable nodes for selection as said immediately previous passed node and a number of entering links connected to said suitable nodes is equal, selecting any one of these suitable nodes.

28. A routing device as set forth in claims 26 or 27, wherein said routes of said paths are determined for each predetermined hop number.

29. A routing device as set forth in claim 16, further comprising means for, if there are two or more paths reaching from an origin node to a destination node, selecting a path with a smallest total number of entering links for its passed nodes.

30. A routing device as set forth in claim 29, wherein said routes of said paths are selected for each predetermined hop number.

* * * * *

UNITED STATES PATENT AND TRADEMARK OFFICE
CERTIFICATE OF CORRECTION

PATENT NO. : 5,577,030
DATED : June 25, 1996
INVENTOR(S) : Oki, et al

It is certified that error appears in the above-indentified patent and that said Letters Patent is hereby corrected as shown below:

On the title page, item [30]    Foreign Application Priority Data

Aug 31, 1994 [JP]   Japan ...... 6-207504
      Feb 21, 1995 [JP]   Japan ...... 7-032590
      Jul 21, 1995 [JP]   Japan ...... 7-185971

Signed and Sealed this

Twenty-ninth Day of April, 1997

*Attest:*

BRUCE LEHMAN

*Attesting Officer*      Commissioner of Patents and Trademarks